(12) United States Patent
Endo

(10) Patent No.: US 8,933,995 B2
(45) Date of Patent: Jan. 13, 2015

(54) IMAGE CAPTURING DEVICE AND IMAGE CAPTURING METHOD

(71) Applicant: FUJIFILM Corporation, Tokyo (JP)

(72) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 207 days.

(21) Appl. No.: 13/714,065

(22) Filed: Dec. 13, 2012

(65) Prior Publication Data

US 2013/0107017 A1 May 2, 2013

Related U.S. Application Data

(63) Continuation of application No. PCT/JP2011/064620, filed on Jun. 27, 2011.

(30) Foreign Application Priority Data

Jun. 30, 2010 (JP) .................................. 2010-150316
Feb. 4, 2011 (JP) .................................. 2011-023213

(51) Int. Cl.
*H04N 15/00* (2006.01)
*H04N 13/02* (2006.01)
(Continued)

(52) U.S. Cl.
CPC .............. *H04N 13/0217* (2013.01); *G03B 7/08* (2013.01); *G03B 11/00* (2013.01); *G03B 35/08* (2013.01); *H04N 5/23212* (2013.01); *H04N 5/238* (2013.01)
USPC ........................................... 348/49; 600/111

(58) Field of Classification Search
CPC .......... G03B 7/08; G03B 11/00; G03B 35/08; H04N 13/0217; H04N 5/23212; H04N 5/238

USPC ............................................................ 348/49
See application file for complete search history.

(56) References Cited

U.S. PATENT DOCUMENTS 6,233,003 B1    5/2001 Ono
6,682,478 B2*   1/2004 Nakamura .................... 600/111
(Continued)

FOREIGN PATENT DOCUMENTS

JP          8-69063 A       3/1996
JP          10-42314 A      2/1998
(Continued)

OTHER PUBLICATIONS

International Search Report issued in PCT/JP2011/064620, dated Jul. 26, 2011.

*Primary Examiner* — Hee-Yong Kim
(74) *Attorney, Agent, or Firm* — Birch, Stewart, Kolasch & Birch, LLP

(57) ABSTRACT

The quality of a planar image is improved while maintaining the parallax of a stereoscopic image. An image capturing device includes an imaging element that performs photoelectric conversion on respective light fluxes passing through different regions of a single pickup lens. The image capturing device includes a neutral density filter an AE control unit that acquires subject brightness, and a diaphragm control unit that, in a case of the stereoscopic pickup, controls whether or not to reduce the amount of light which reaches the imaging element using the neutral density filter based on the subject brightness, and that, in a case of the plane pickup, causes a diaphragm value of the diaphragm to be greater than a diaphragm value in the case of the stereoscopic pickup while setting the light extinction filter to a non-insertion state.

33 Claims, 47 Drawing Sheets

(51) Int. Cl.

| | | |
|---|---|---|
| *A61B 1/04* | (2006.01) | |
| *G03B 7/08* | (2014.01) | |
| *G03B 11/00* | (2006.01) | |
| *G03B 35/08* | (2006.01) | |
| *H04N 5/232* | (2006.01) | |
| *H04N 5/238* | (2006.01) | |

(56) References Cited

U.S. PATENT DOCUMENTS 7,019,780 B1  3/2006  Takeuchi et al.

2011/0122233 A1*  5/2011  Kasai et al. .................. 348/49
2012/0057000 A1   3/2012  Rohaly et al.

FOREIGN PATENT DOCUMENTS

| JP | 2000-134641 A | 5/2000 |
| JP | 2001-61165 A | 3/2001 |
| JP | 2001-222083 A | 8/2001 |
| JP | 2002-369223 A | 12/2002 |
| JP | 2008-187385 A | 8/2008 |
| JP | 2008-299184 A | 12/2008 |
| JP | 2009-168995 A | 7/2009 |
| JP | 2009-527007 A | 7/2009 |

* cited by examiner

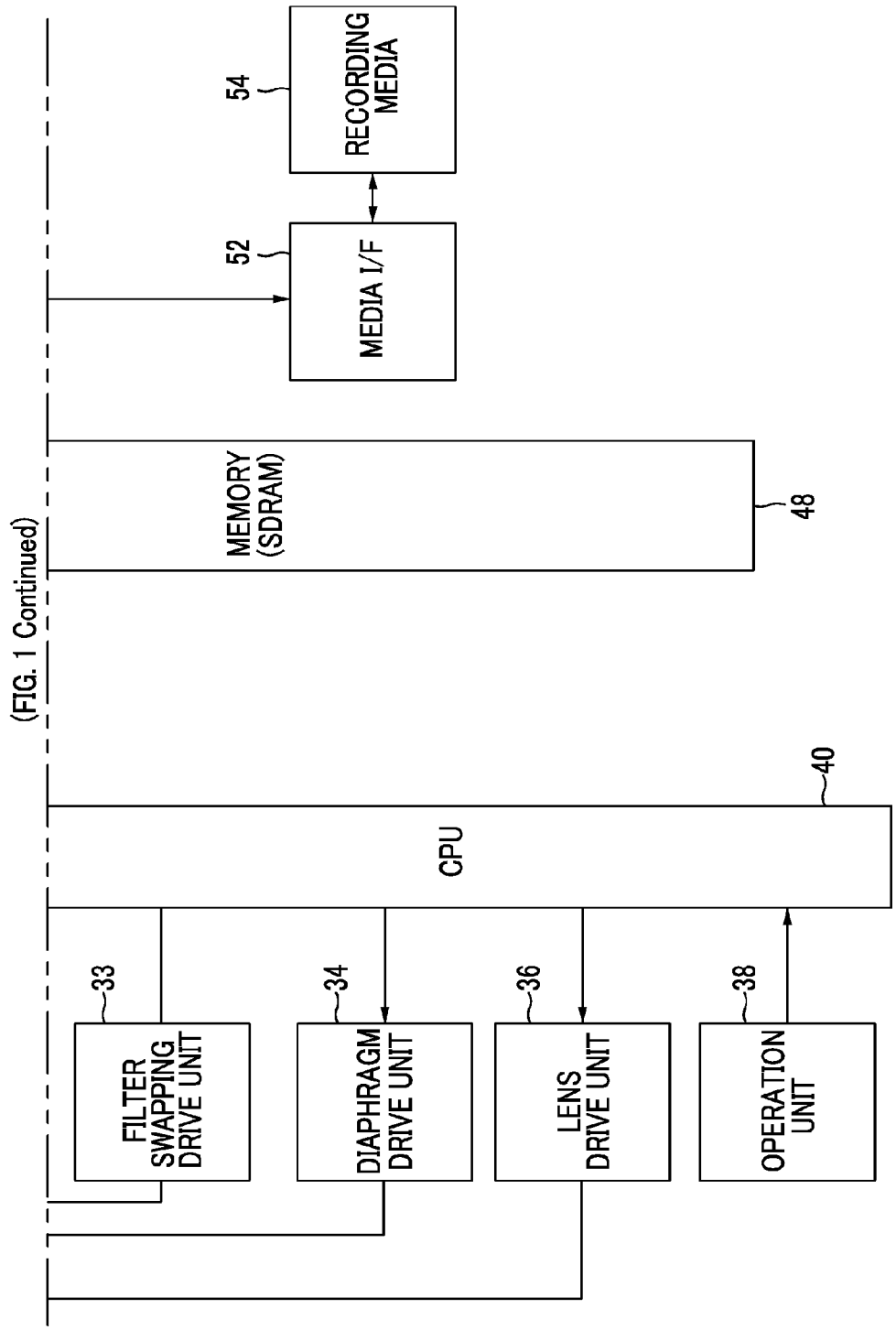

(MAIN PIXEL)

(SUB PIXEL)

NORMAL PIXEL

PHASE DIFFERENCE PIXEL

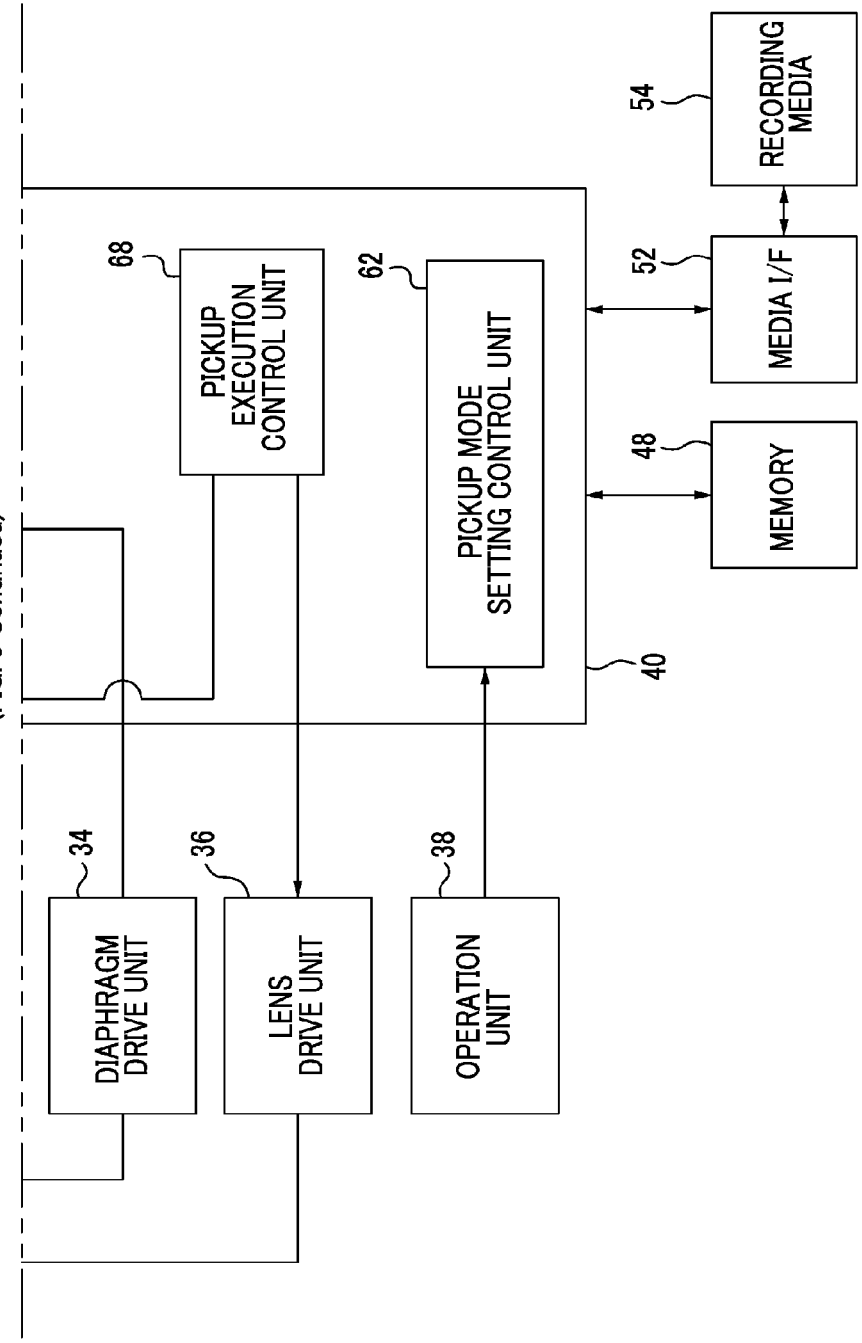

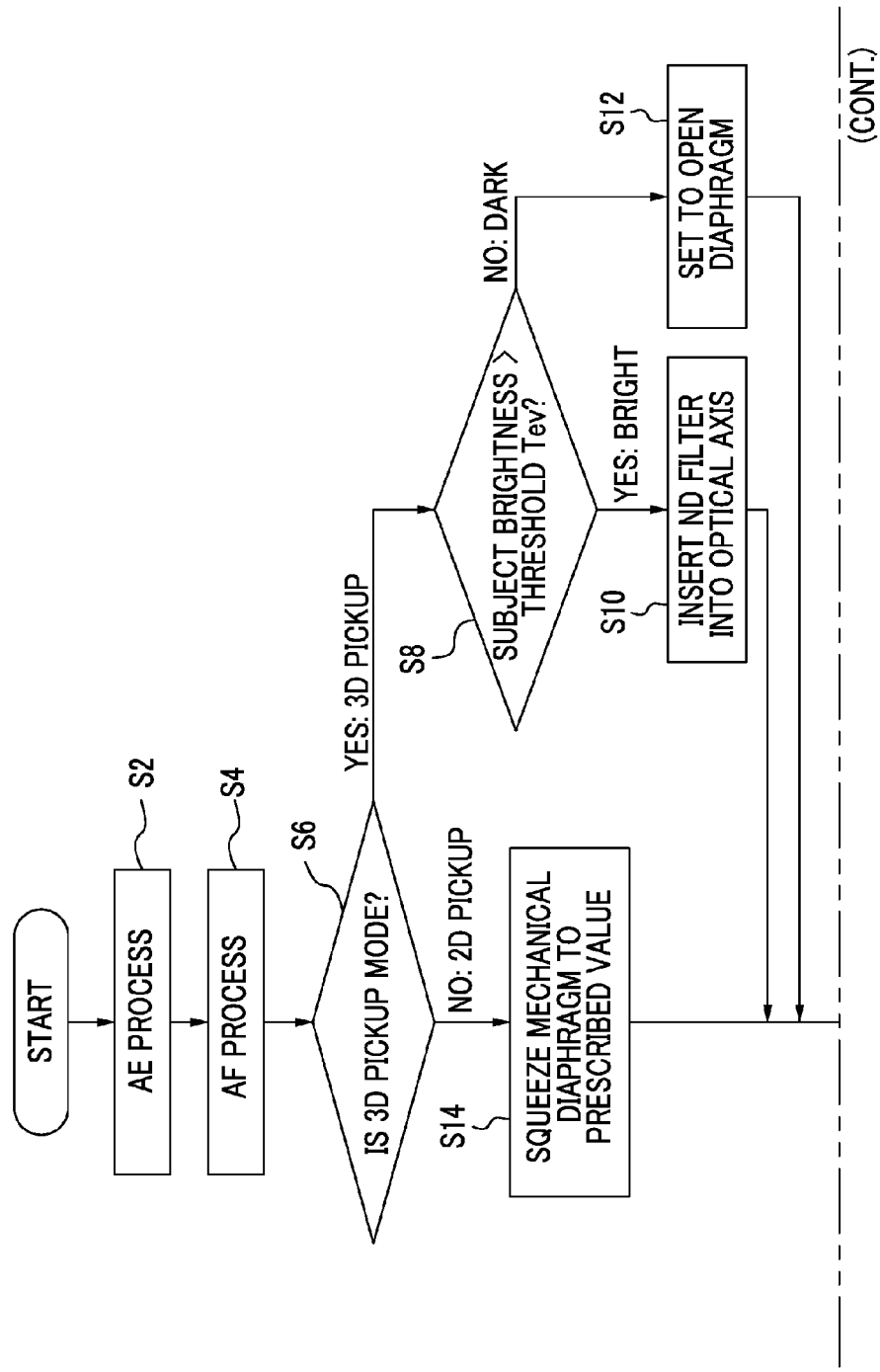

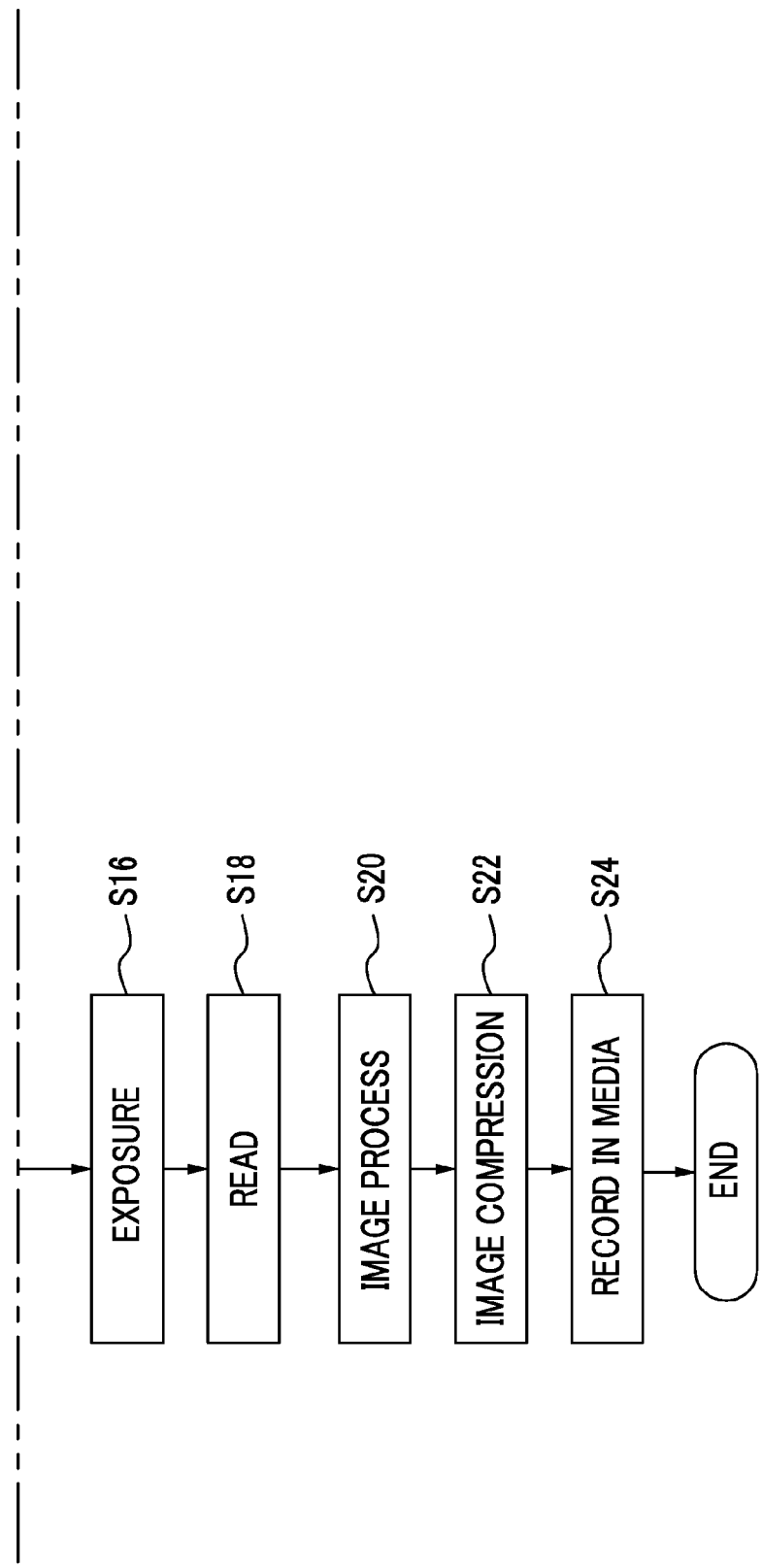

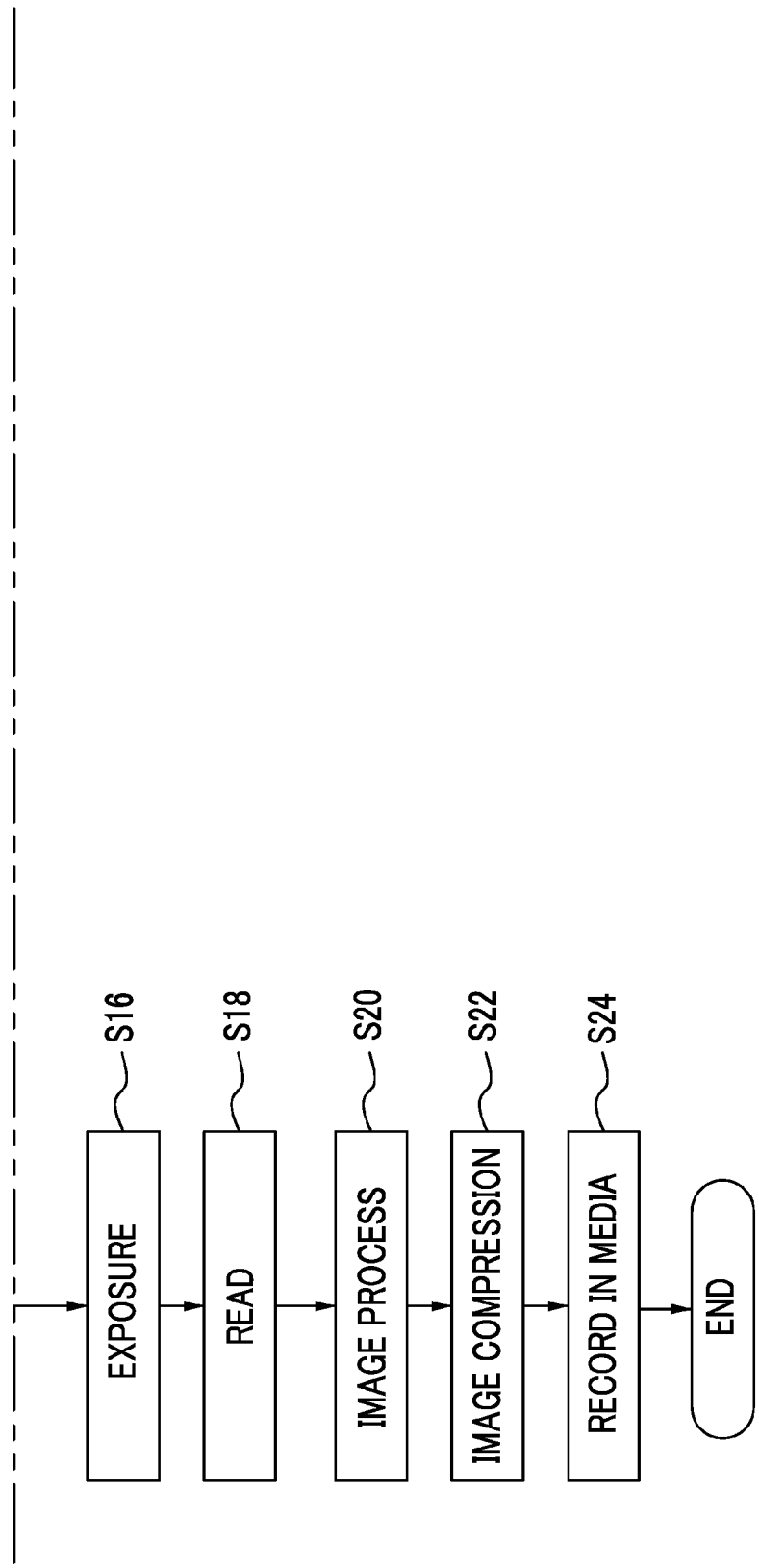

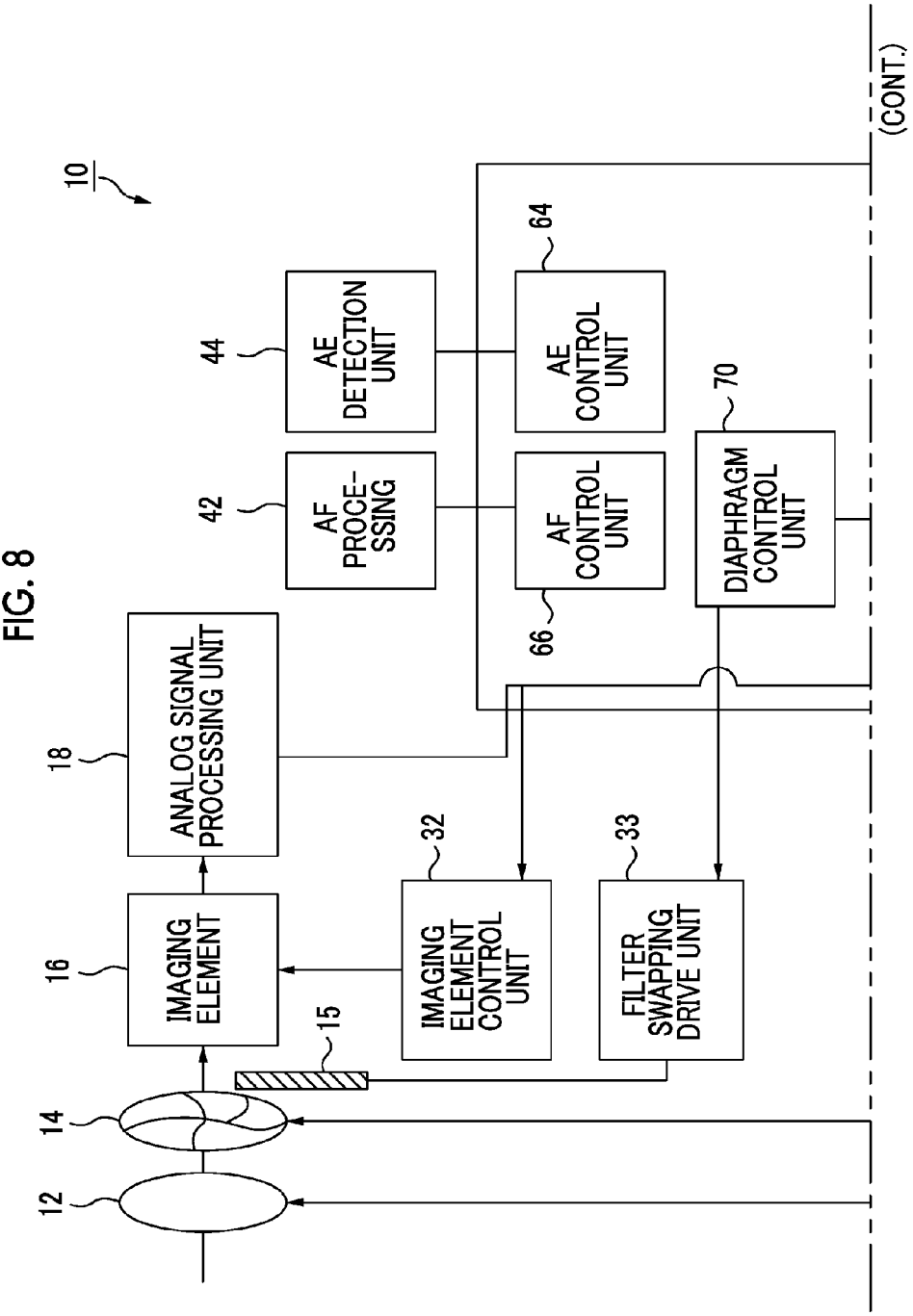

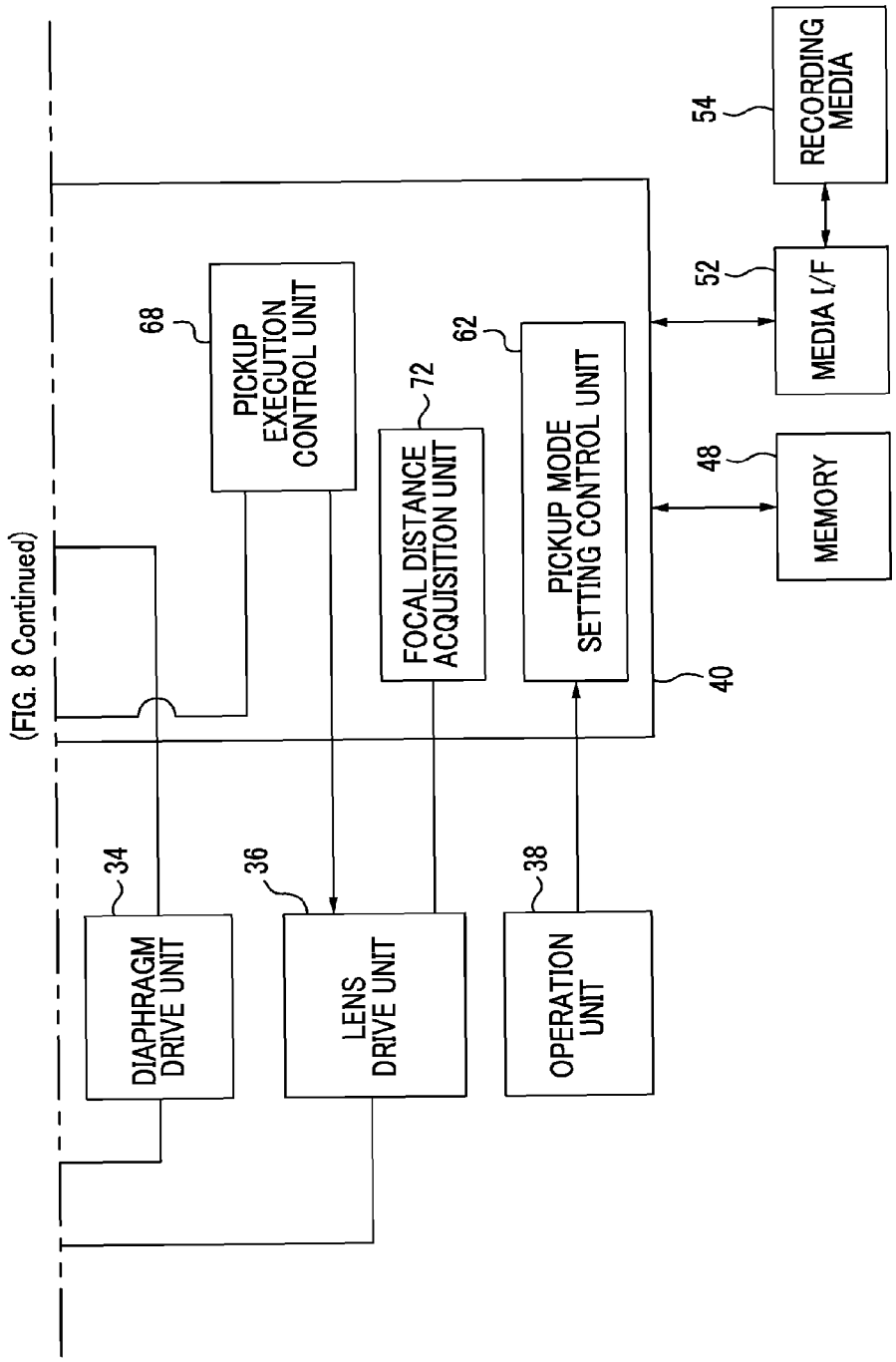

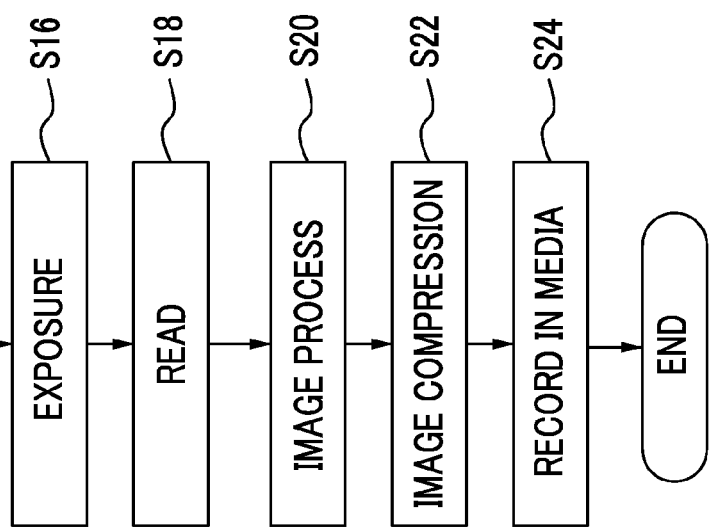
(FIG. 9 Continued)

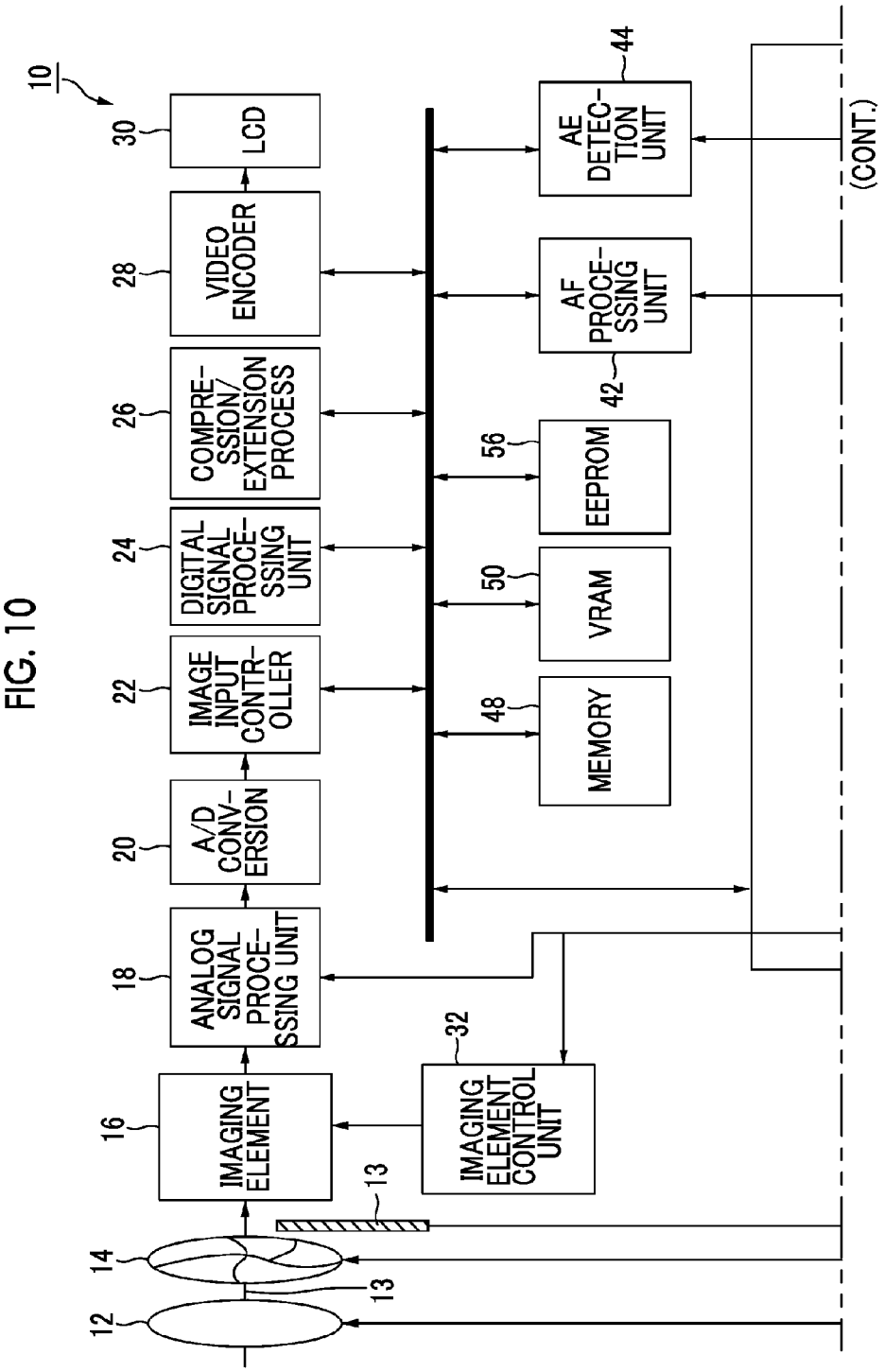

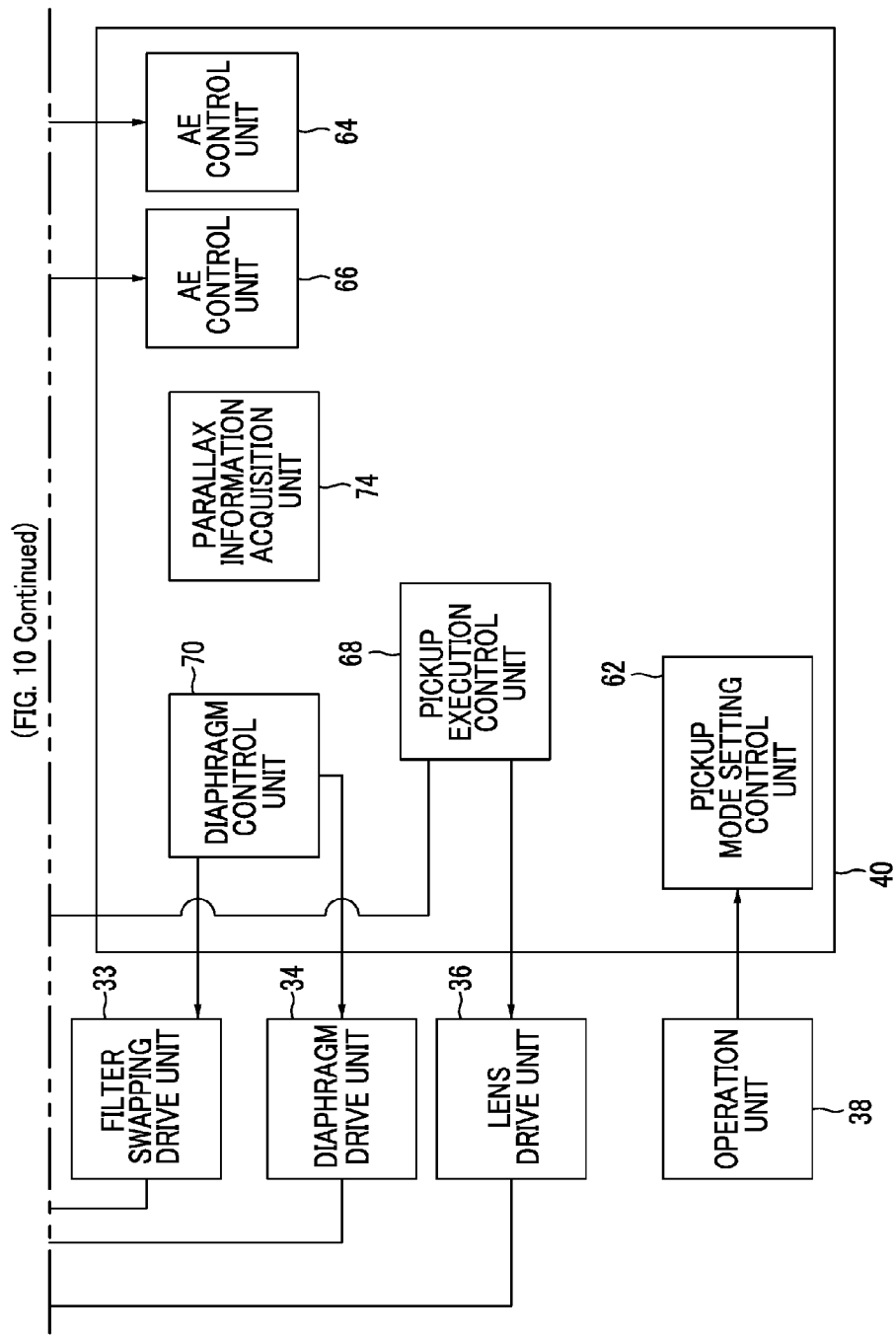

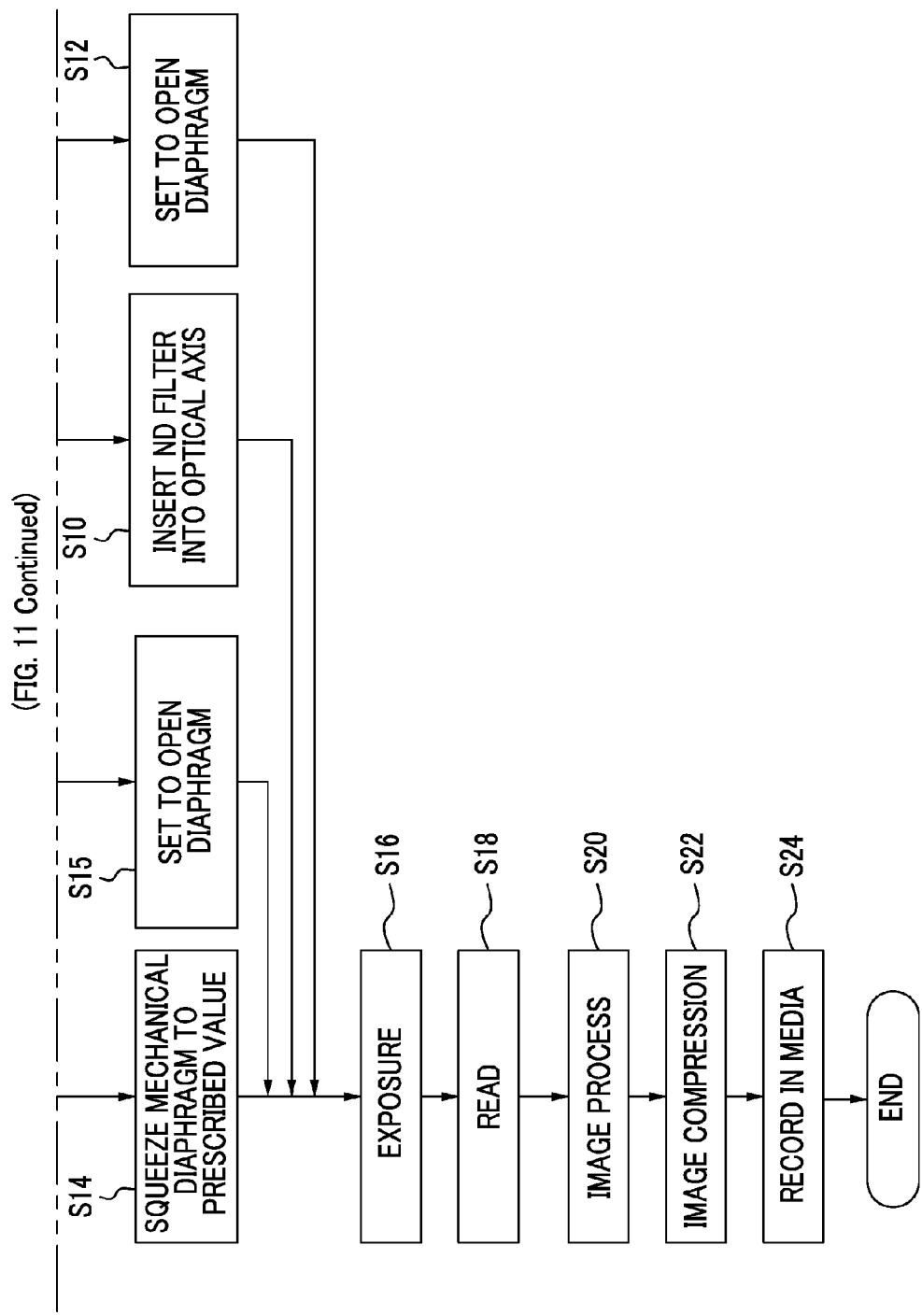

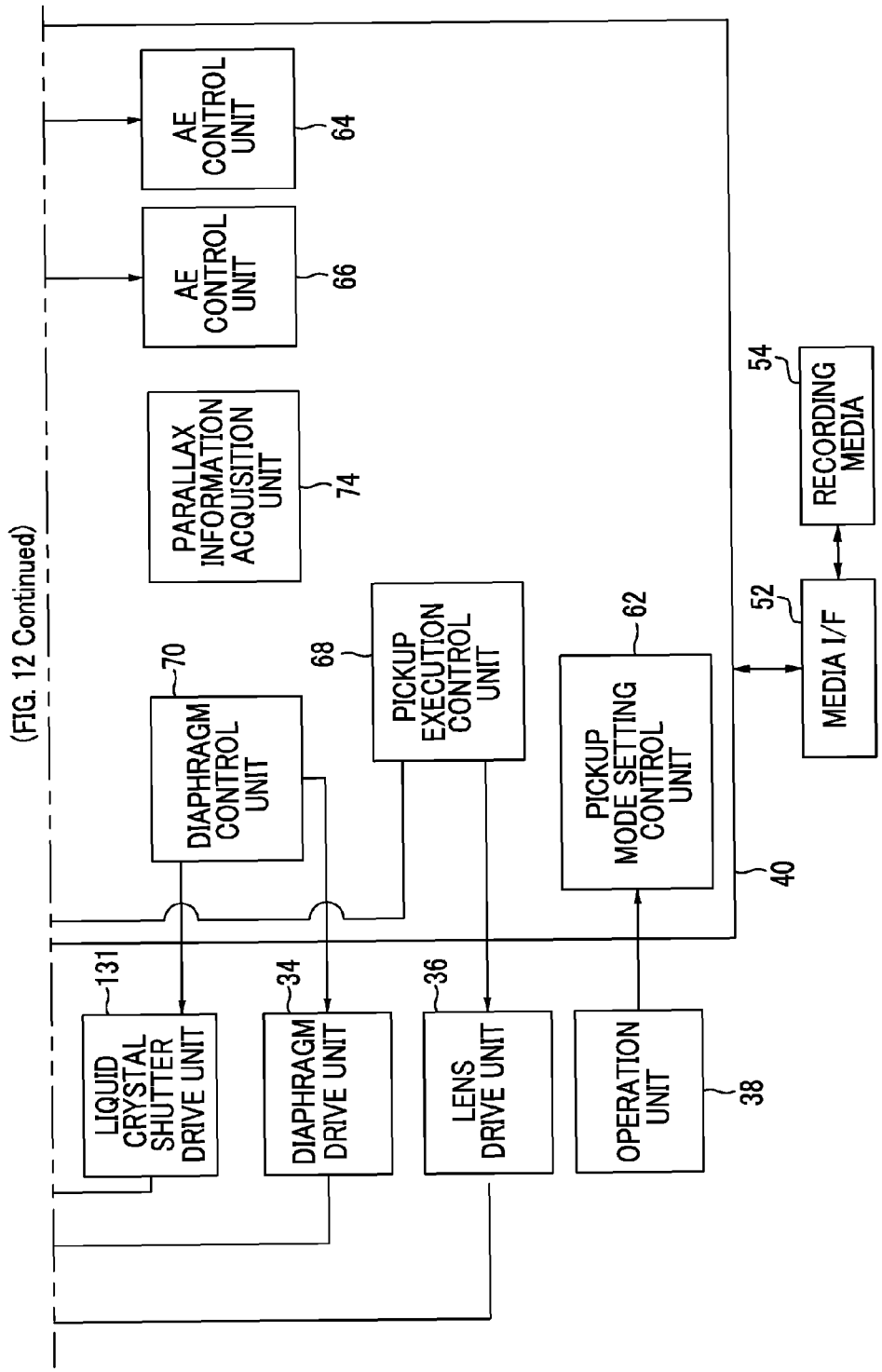

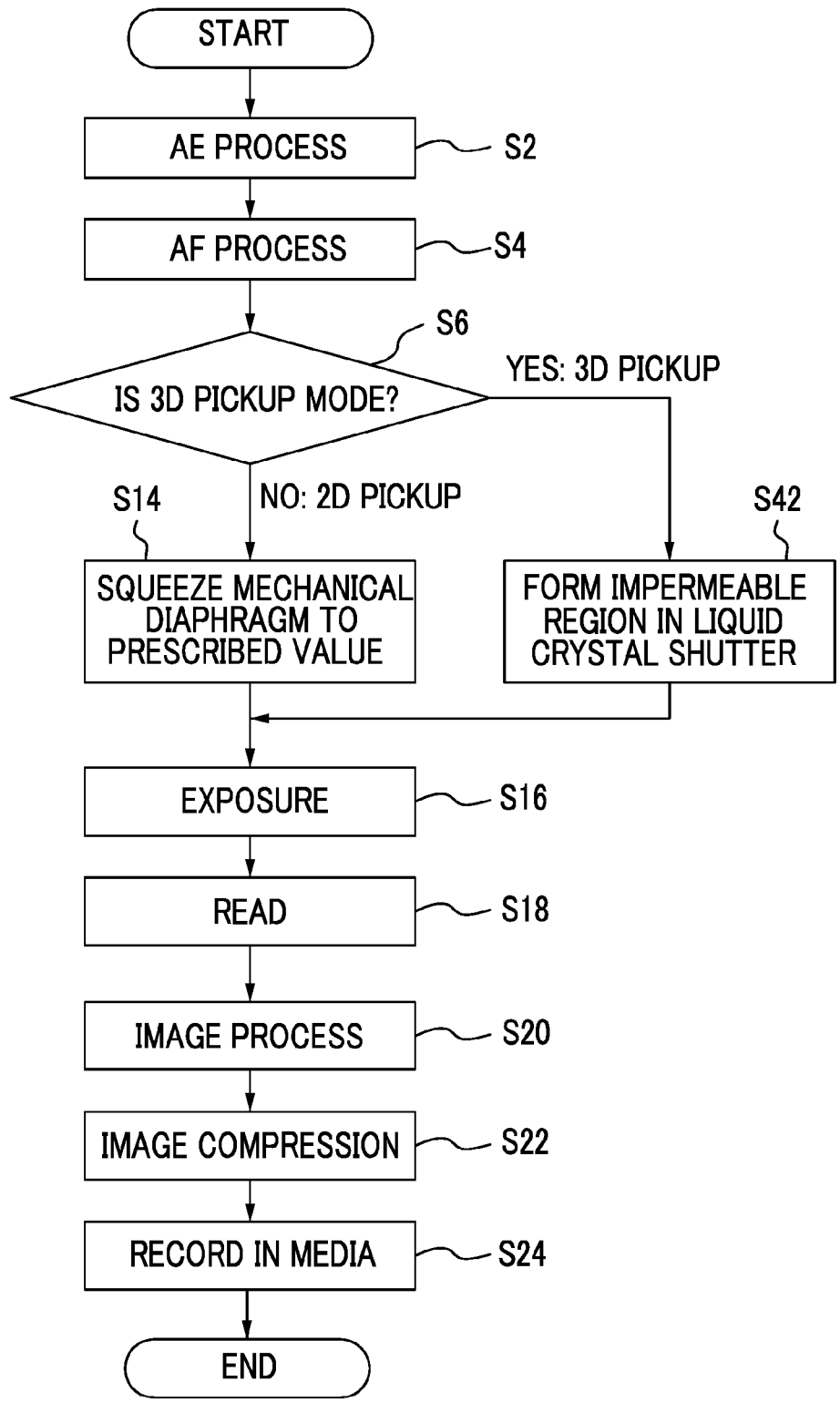

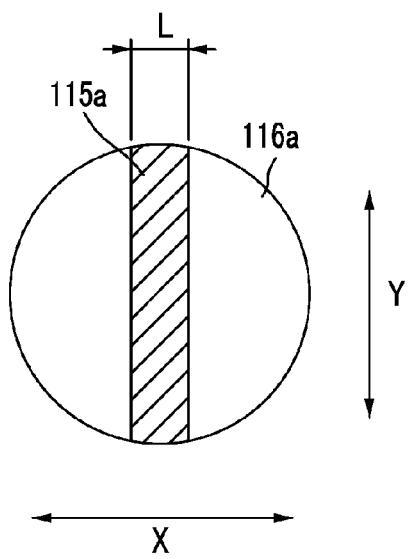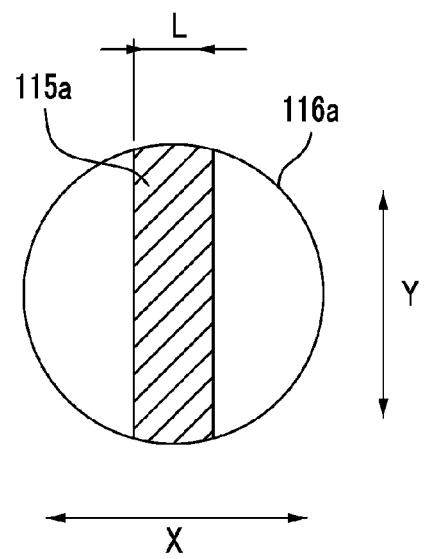

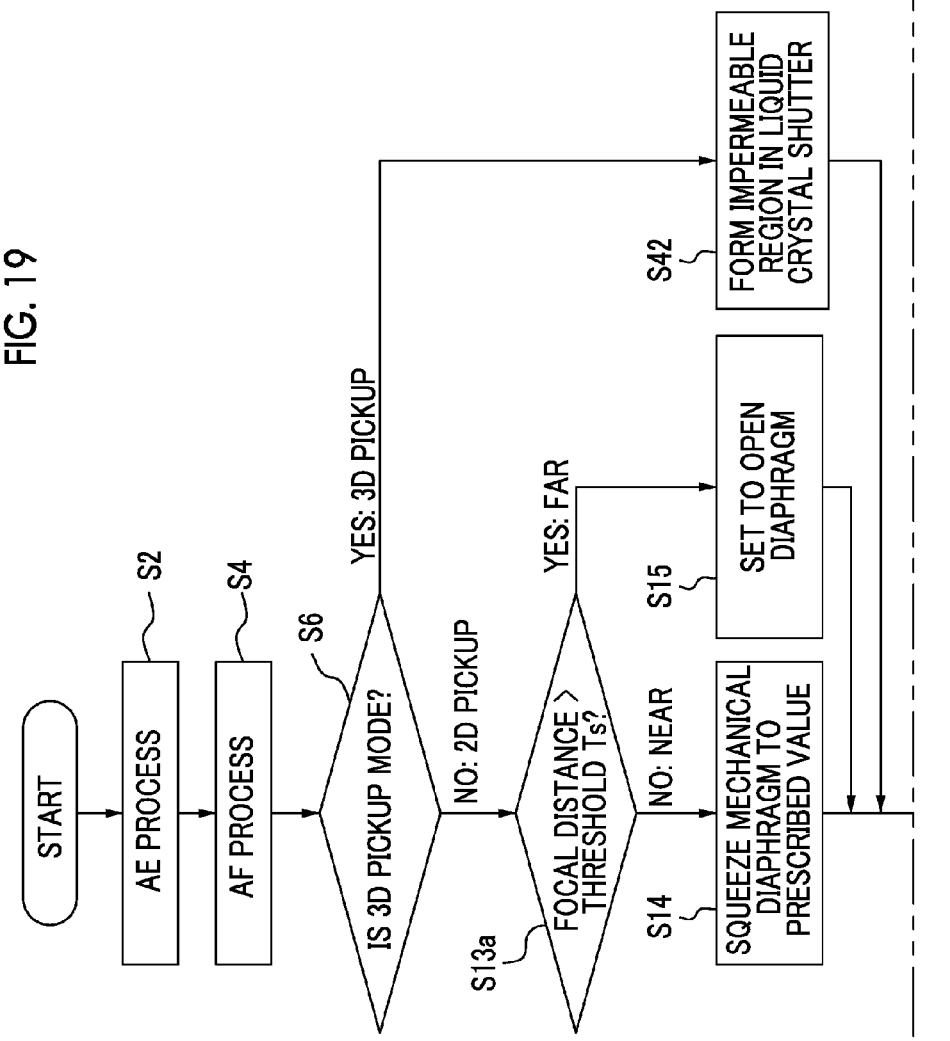

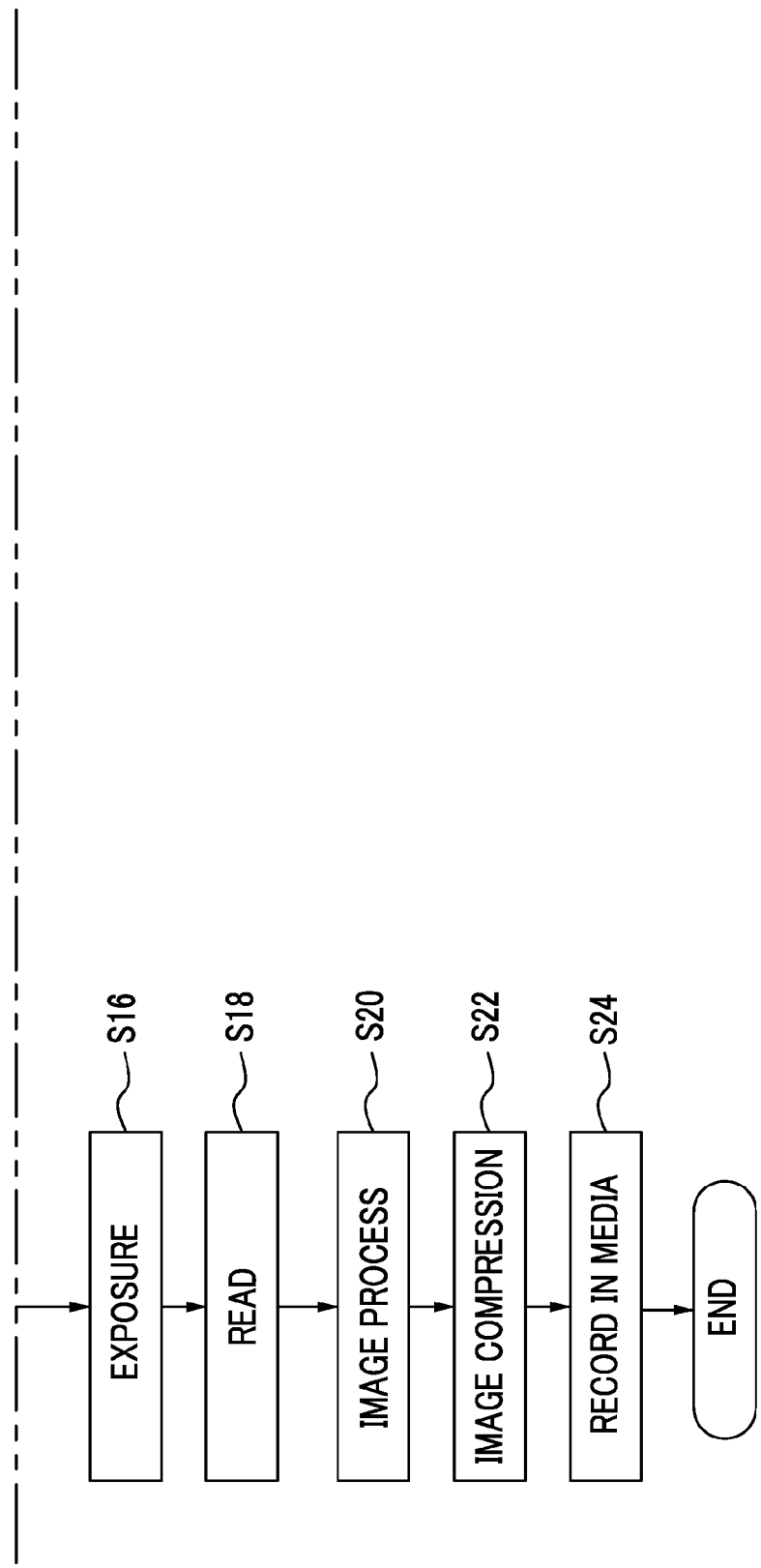

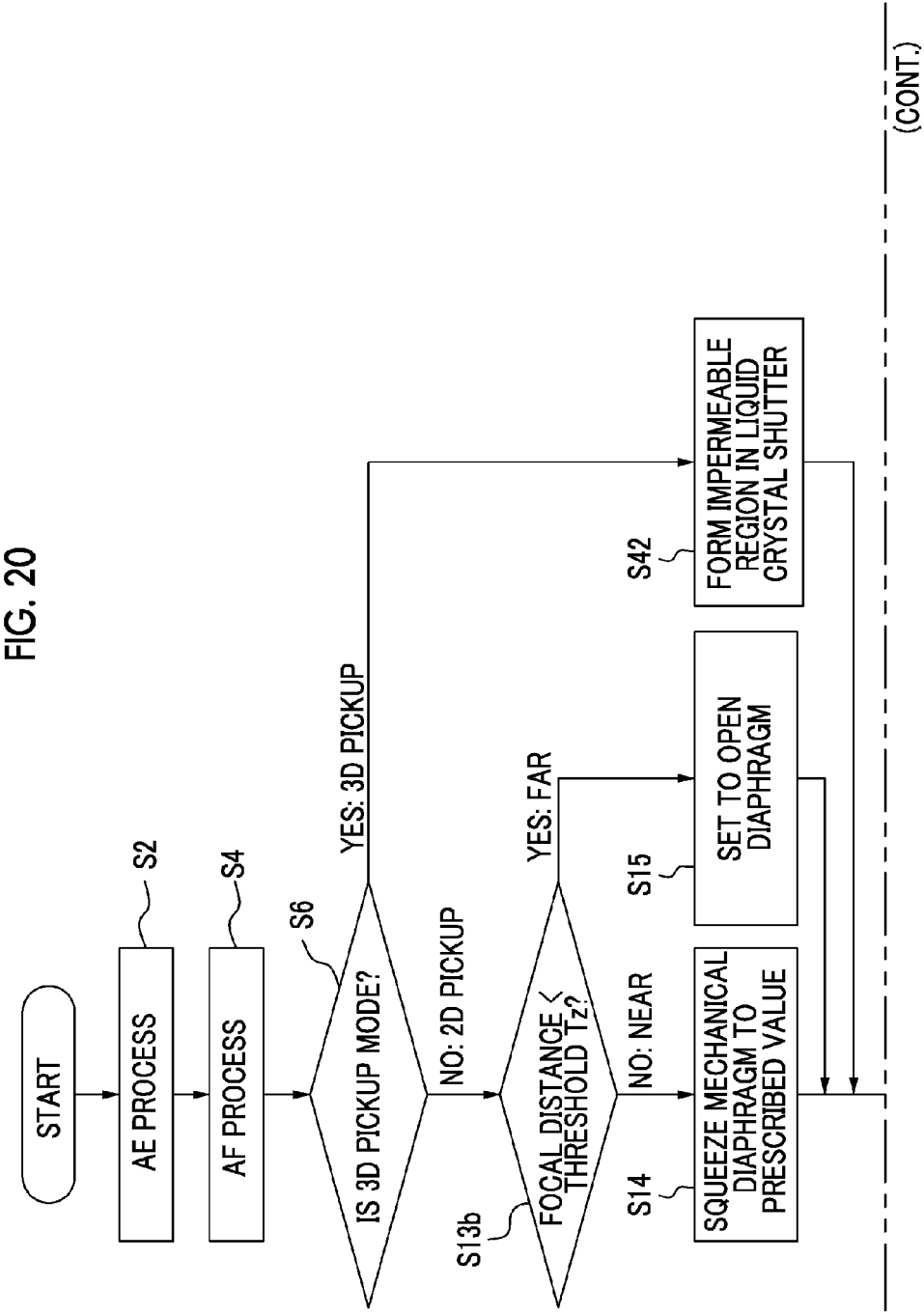

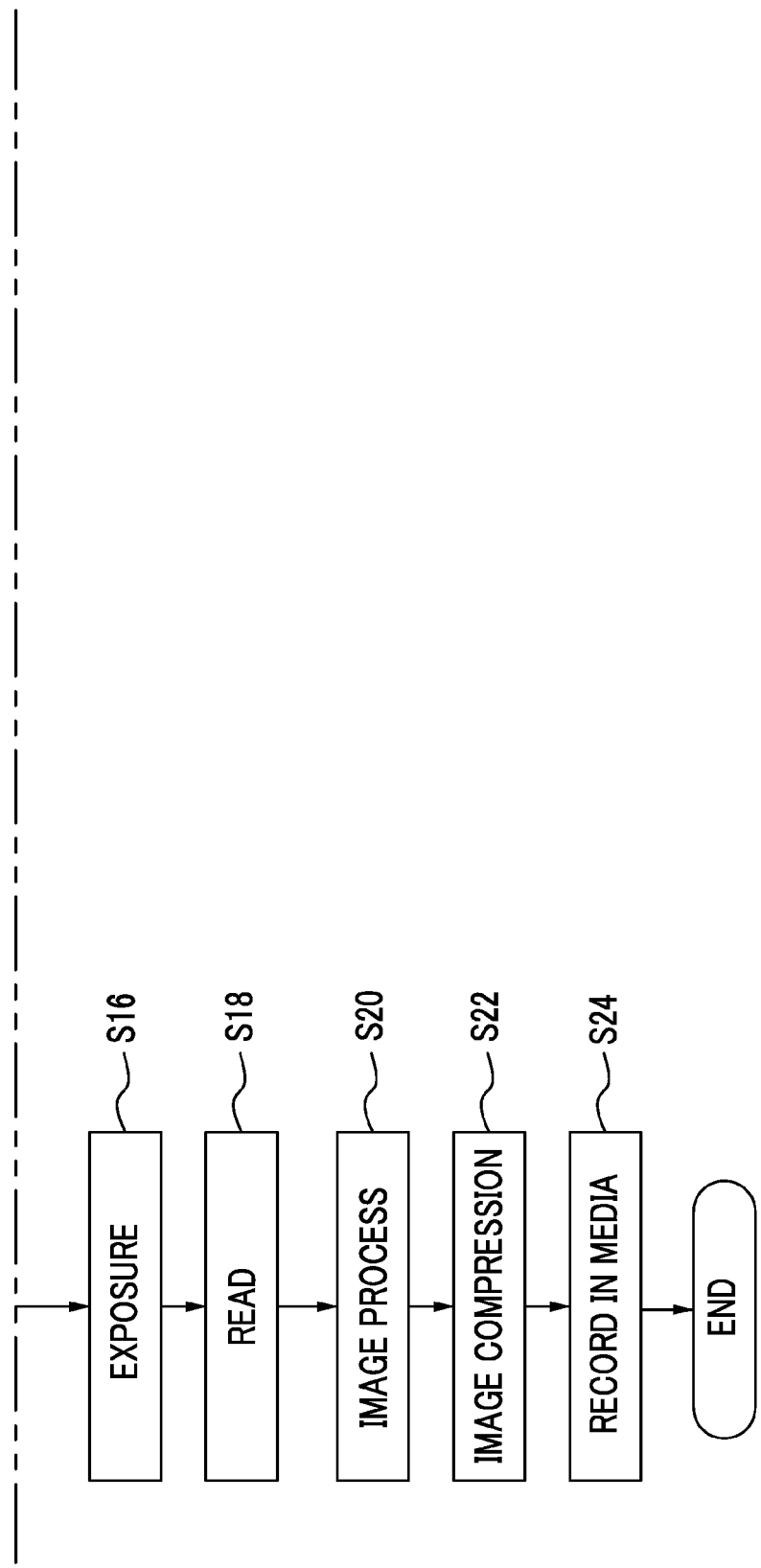

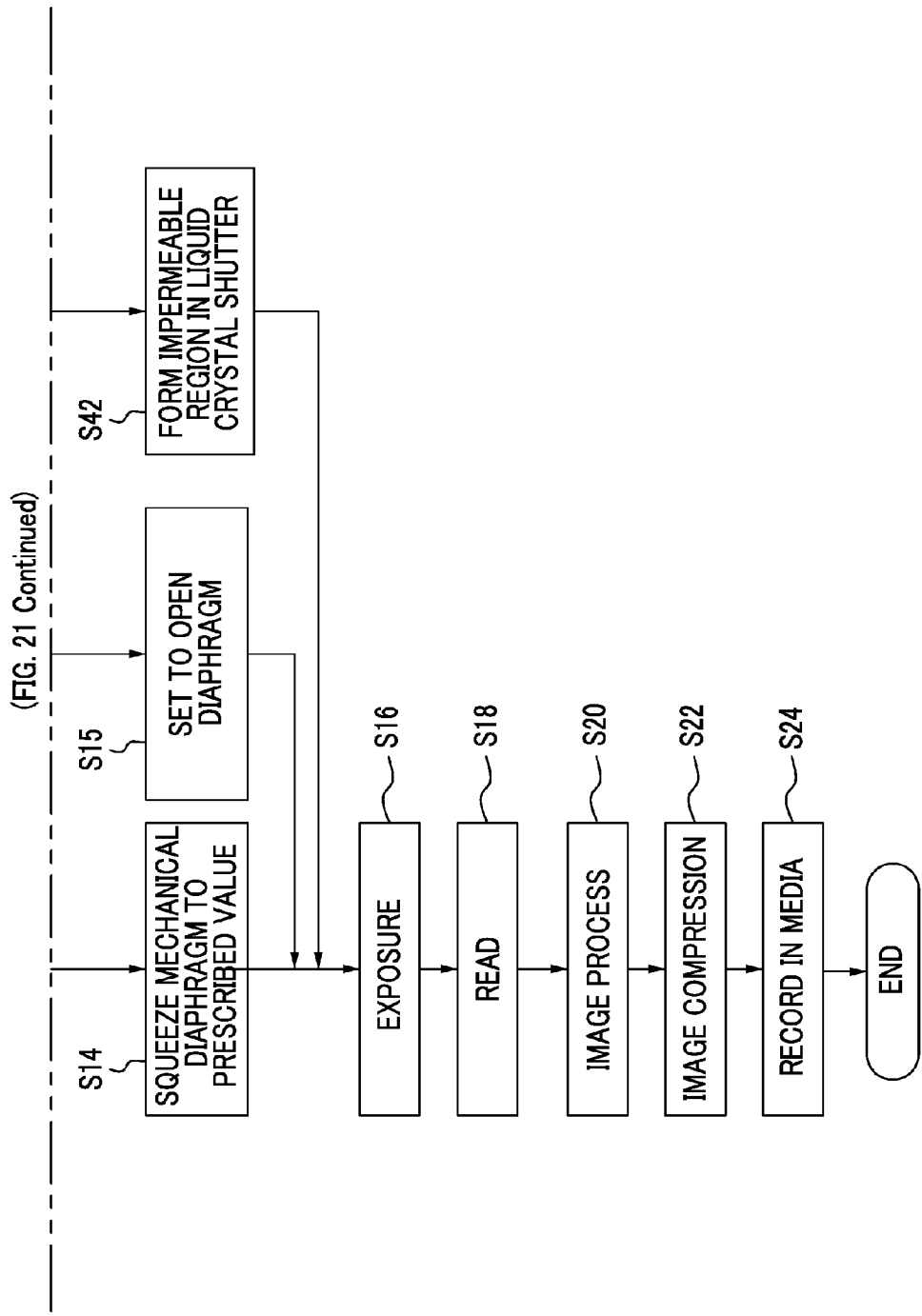

FIG. 28A

| R | R | G | G |
|---|---|---|---|
| G | G | B | B |

FIG. 28B

| R | R |
|---|---|
| R | G |
| G | B |
| G | B |

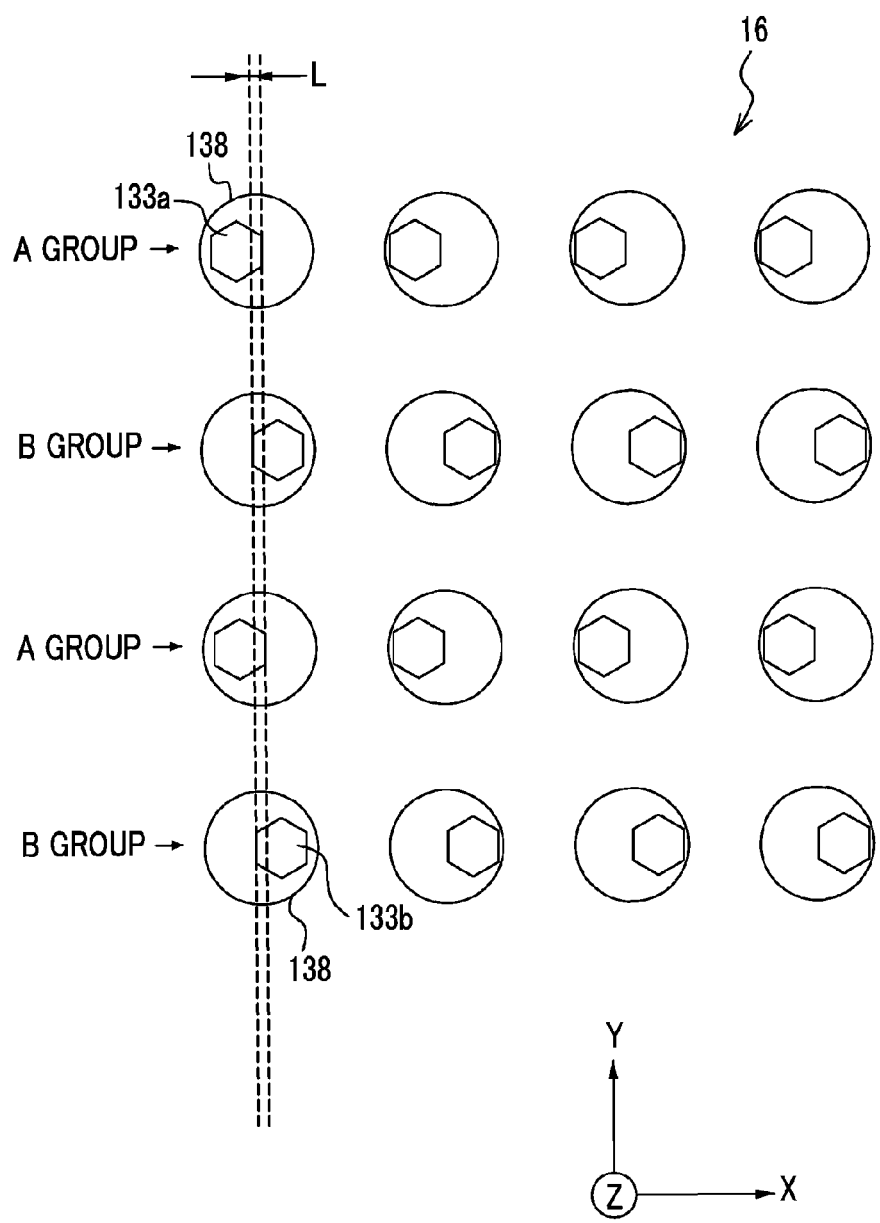

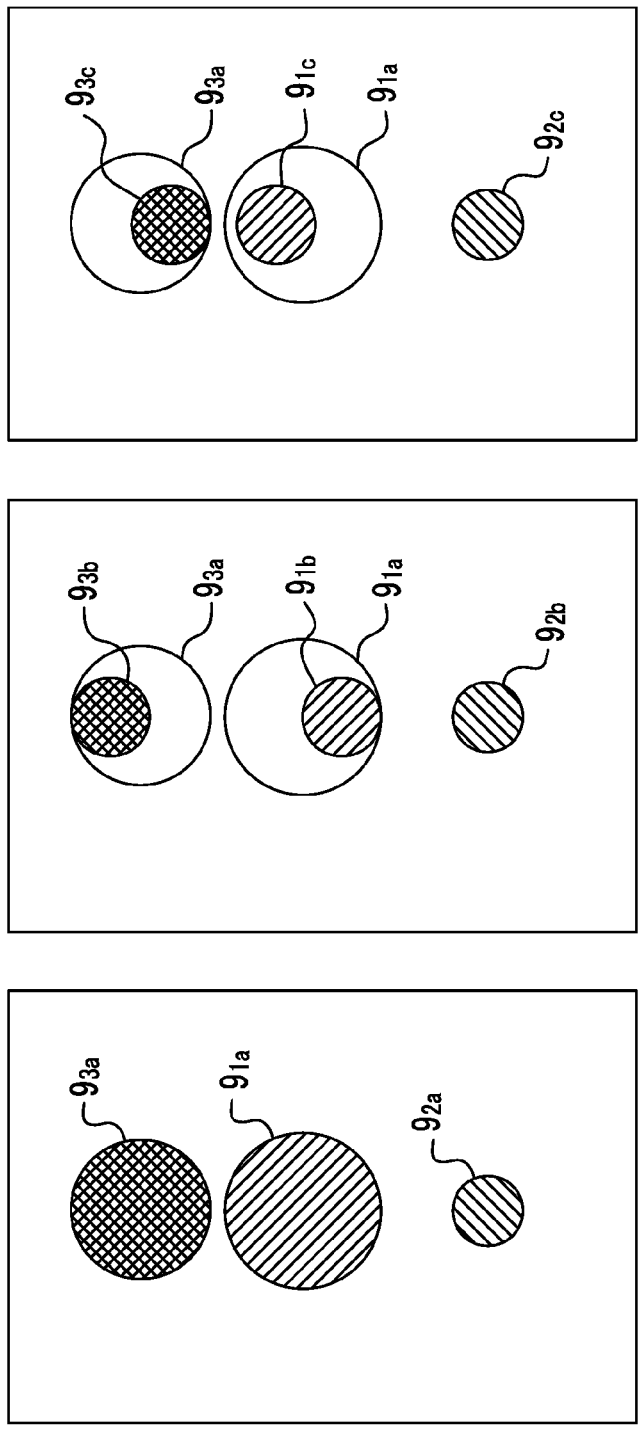

IMAGE CAPTURING DEVICE AND IMAGE CAPTURING METHOD

CROSS REFERENCE TO RELATED APPLICATIONS

This application is a Continuation of PCT International Application No. PCT/JP2011/064620 filed on Jun. 27, 2011, which claims priority under 35 U.S.C. §119(a) to Patent Application No. 2010-150316 filed in Japan on Jun. 30, 2010 and to Patent Application No. 2011-023213 filed in Japan on Feb. 4, 2011, all of which are hereby expressly incorporated by reference into the present application.

BACKGROUND OF THE INVENTION

1. Field of the Invention

The present invention relates to an image capturing device and an image capturing method which can generate a stereoscopic image including planar images viewed from multiple viewpoints using a single optical pickup system.

2. Description of the Related Art

In the related art, an image capturing device is known which can generate a stereoscopic image including planar images viewed from multiple viewpoints using a single optical pickup system.

JP2009-527007T discloses a configuration in which a single optical pickup system is provided and pupil division is performed by rotating a diaphragm, thereby generating a stereoscopic image.

JP2009-168995A discloses a configuration in which polarizing elements are provided and light is received using an imaging element for each light path, thereby acquiring phase information using a single optical pickup system.

JP1998-42314A (JP-H10-42314A) discloses an image capturing device which includes a single optical pickup system and an imaging element in which a first pixel group and a second pixel group are arranged to perform photoelectric conversion on light fluxes passing through different regions of the single optical pickup system, and which generates a stereoscopic image including a planar image acquired using the first pixel group and a planar image acquired using the second pixel group.

JP2008-299184A discloses a configuration in which the output of a first pixel is added to the output of a second pixel in the image capturing device disclosed in JP1998-42314A (JP-H10-42314A).

JP2008-187385A discloses a configuration in which exposure control is performed in cycles set for a 2D moving image and a 3D moving image in a compound eye image capturing device including a plurality of optical pickup systems. Since depth is not changed in the 3D moving image pickup, a machine diaphragm is not moved as much as possible.

SUMMARY OF THE INVENTION

However, in the image capturing device (hereinafter, referred to as "monocular 3D image capturing device") which is capable of generating a stereoscopic image including planar images viewed from multiple viewpoints using a single optical pickup system, a step-shaped pattern is generated in a non-focused section part of a high-resolution planar image when a high-resolution image is generated based on the planar images viewed from the multiple viewpoints. The structure of such a step-shaped pattern will be described below.

First, a case in which three subjects 91, 92, and 93 are imaged using a monocular image capturing device which does not perform pupil division will be described with reference to FIG. 33A. From among three images 91a, 92a, and 93a, the images of which are formed on the imaging element 16, only the image 92a of the subject 92 on a focusing plane D comes into focus on the imaging element 16. A distance of the subject 91 from the pickup lens 12 is greater than the focusing plane D, and the focusing image 91d thereof is formed at a position which is closer to the pickup lens 12 than the imaging element 16, thus the image 91a of the subject 91 is out of focus and becomes a dimmed image, that is, a blurred image. In addition, a distance of the subject 93 from the pickup lens 12 is less than a distance from the focusing plane D, a focusing image 93d is formed at a position which is farther than the imaging element 16 from the pickup lens 12, and the image 93a of the subject 93 is also out of focus and becomes a blurred image.

Subsequently, a case in which the three subjects 91, 92, and 93 are imaged using the monocular 3D image capturing device which performs pupil division will be described. The monocular 3D image capturing device of this example has a state in which the pupil of the pickup lens 12 is restricted to only an upper side using a shutter 95 as shown in FIG. 33B, and a state in which the pupil of the pickup lens 12 is restricted to only a lower side as shown in FIG. 33C. The blur amount (the amount by which an image is out of focus) and the position of an image on the imaging element 16 of this kind of monocular 3D image capturing device are different from those of the monocular image capturing device shown in FIG. 33A. That is, in a state shown in FIG. 33B, the blur amount of the image 91b of the subject 91 is less compared to the image 91a of the subject 91 on which pupil division is not performed (FIG. 34A) as shown in FIG. 34B, and the position thereof moves to the lower side of the drawing. In addition, the blur amount of the image 93b of the subject 93 is less and the position thereof moves to the upper side of the drawing. In a state shown in FIG. 33C, the blur amount of the image 91c of the subject 91 is less compared to the image 91a of the subject 91 on which pupil division is not performed (FIG. 34A) as shown in FIG. 34C, and the position thereof moves to the upper side of the drawing. In addition, the blur amount of the image 93c of the subject 93 is less and the position thereof moves to the lower side of the drawing.

If the image shown in FIG. 34B is synthesized with the image shown in FIG. 34C in order to generate a high-resolution planar image in such a monocular 3D image capturing device, a step-shaped pattern is generated because an image formation position is shifted between the image 91b and the image 91c and between the image 93b and the image 93c. That is, when a high-resolution planar image is picked up, light fluxes from the same subject pass through the different positions of the pupil of the pickup lens 12, thus there are problems in that the images of the same subject are formed at different positions of the imaging element 16, and in that a step-shaped pattern is generated due to parallax. The generation of such a pattern is called the generation of spurious resolution in this specification.

JP2009-527007T, JP2009-168995A, JP1998-42314A, JP2008-299184A, and JP2008-187385A do not disclose a configuration which can solve the spurious resolution due to parallax.

Meanwhile, in the configuration disclosed in JP2008-299184A, pixel addition is simply performed on adjacent pixels. Therefore, there is a problem in that the resolution of a focused main subject is deteriorated due to the pixel addition. For example, when two pixels are mixed, resolution is deteriorated to ½.

In addition, since a compound eye method is used in the configuration disclosed in JP2008-187385A, spurious resolution is not generated even though a small diaphragm is used. In addition, the chief aim is not to change the diaphragm.

The present invention has been made in consideration of the above problems occurring in the prior art and an object thereof is to provide an image capturing device and an image capturing method which improve the quality of a planar image while maintaining the parallax of a stereoscopic image.

In order to accomplish the above object, the present invention provides an image capturing device which includes a single optical pickup system and an imaging element that has a first pixel group and a second pixel group respectively performing photoelectric conversion on light fluxes passing through different regions of the single optical pickup system, and which can perform stereoscopic pickup used to acquire a stereoscopic image having a first planar image and a second planar image, respectively generated using the first pixel group and the second pixel group, and plane pickup used to acquire a planar image having the first planar image and the second planar image by imaging a same scene using the first pixel group and the second pixel group, the image capturing device including: light extinction unit that can reduce an amount of light which is incident to the imaging element from the optical pickup system; a diaphragm that is arranged in a light path; subject brightness acquisition unit that acquires subject brightness; and control unit that, in a case of the stereoscopic pickup, controls whether or not to reduce the amount of light which reaches the imaging element using the light extinction unit based on the subject brightness acquired using the subject brightness acquisition unit, and that, in a case of the plane pickup, causes a diaphragm value of the diaphragm to be greater than a diaphragm value in the case of the stereoscopic pickup.

That is, it is controlled whether or not to reduce the amount of light which reaches the imaging element can be controlled based on the subject brightness in the case of the stereoscopic pickup, and the diaphragm value of the diaphragm is caused to be greater than the diaphragm value in the case of the stereoscopic pickup, thus the image formation positions are near between the first and second planar images in the case of the plane pickup. Therefore, quality can be improved by solving the spurious resolution generation of the planar image while maintaining the parallax of the stereoscopic image.

In an embodiment of the present invention, it is preferable that the first pixel group and the second pixel group include light reception elements which are 2-dimensionally arranged, and, it is preferable that, in the imaging element, each pixel of the first pixel group and each pixel of the second pixel group be arranged to be adjacent to each other.

In an embodiment of the present invention, it is preferable that the image capturing device further include an optical member that performs division on the light fluxes passing through the optical pickup system, and it is preferable that the imaging element include a first imaging element having the first pixel group and a second imaging element having the second pixel group, and the first imaging element and the second imaging element respectively receive the light fluxes obtained through pupil division performed using the optical member.

In an embodiment of the present invention, it is preferable that the control unit set the diaphragm to an open state in the case of the stereoscopic pickup, and squeeze the diaphragm compared to the open state in the case of the plane pickup.

In an embodiment of the present invention, it is preferable that the light extinction unit be a neutral density filter which can be inserted in the light path through which the light fluxes incident to the imaging element pass, and the control unit, in the case of the stereoscopic pickup, control whether or not to set the neutral density filter to an insertion state in which the neutral density filter is inserted in the light path based on the subject brightness acquired using the subject brightness acquisition unit.

In an embodiment of the present invention, it is preferable that the control unit, in the case of the stereoscopic pickup, set the neutral density filter to the insertion state when the subject brightness is higher than a threshold, and set the neutral density filter to a non-insertion state when the subject brightness is equal to or lower than the threshold.

In an embodiment of the present invention, it is preferable that the light extinction unit be a light blocking unit which shields a part of an opening of the diaphragm in order to equally divide the opening of the diaphragm viewed in an optical axis direction into at least one side of a horizontal direction and a vertical direction of the imaging element, and it is preferable that the control unit control the light blocking unit, set a light blocking state in which at least a part of the opening of the diaphragm is shielded using the light blocking unit in the case of the stereoscopic pickup, and set a non-light blocking state in which the opening of the diaphragm is not shielded using the light blocking unit in the case of the plane pickup.

In an embodiment of the present invention, it is preferable that the control unit, in the case of the stereoscopic pickup, change a size of the light blocking region of the opening of the diaphragm which is shielded using the light blocking unit based on the subject brightness acquired using the subject brightness acquisition unit.

Meanwhile, the light extinction unit and the diaphragm are not limited to the case in which the light extinction unit and the diaphragm are arranged between the optical pickup system and the imaging element. There may be a case in which the optical pickup system includes a plurality of lenses (a lens group), and at least one side of the light extinction unit and the diaphragm is arranged in the lens group.

In an embodiment of the present invention, it is preferable that the image capturing device further include subject distance acquisition unit that acquires a subject distance, and it is preferable that the control unit, in the case of the plane pickup, control whether or not to set the diaphragm to the open state based on the subject distance acquired using the subject distance acquisition unit.

In an embodiment of the present invention, it is preferable that the control unit, in the case of the plane pickup, set the diaphragm to the open state when the subject distance is greater than a threshold. That is, even in the plane pickup, the shift of image formation between the first and second planar images is small when the subject distance is large. Therefore, diffraction due to the diaphragm can be avoided and a high-quality image can be obtained.

In an embodiment of the present invention, it is preferable that the image capturing device further include focal distance acquisition unit that acquires a focal distance of the optical pickup system, and it is preferable that the control unit, in the case of the plane pickup, control whether or not to set the diaphragm to the open state based on the focal distance acquired using the focal distance acquisition unit.

In an embodiment of the present invention, it is preferable that the control unit, in the case of the plane pickup, set the diaphragm to the open state when the focal distance is greater than a threshold. That is, even in the plane pickup, the shift of image formation between the first and second planar images is small when the focal distance of the optical pickup system is short. Therefore, diffraction due to the diaphragm can be avoided and a high-quality image can be obtained.

In an embodiment of the present invention, it is preferable that the image capturing device further include parallax information acquisition unit that calculates an amount of parallax between the first planar image and the second planar image which are included in the stereoscopic image acquired using the imaging element, and acquires a parallax range which indicates difference between an amount of maximum parallax of a near side and an amount of maximum parallax of a far side of the stereoscopic image, and it is preferable that the control unit, in the case of the plane pickup, control whether or not to set the diaphragm to the open state based on the parallax range acquired using the parallax information acquisition unit. Meanwhile, the "near side" which is referred here indicates a side which is close to the image capturing device. On the other hand, the "far side" is a side which is separated from the image capturing device forward the subject, and indicates a side which is distant from the image capturing device.

In an embodiment of the present invention, it is preferable that, in the case of the plane pickup, the diaphragm be set to the open state when the acquired parallax range is smaller than a threshold, and set the diaphragm value of the diaphragm to a value, which is greater than the diaphragm value in the case of the stereoscopic pickup, when the acquired parallax range is equal to or greater than the threshold.

In an embodiment of the present invention, it is preferable that the image capturing device further include instruction input unit that receives an input of a pickup instruction, and it is preferable that the parallax information acquisition unit calculate the parallax range from the stereoscopic image imaged using the imaging element before the pickup instruction is input to the instruction input unit.

In an embodiment of the present invention, it is preferable that the control unit set the diaphragm to the open state when imaging is performed before the pickup instruction is input.

In an embodiment of the present invention, it is preferable that the control unit, in the case of the plane pickup, change whether or not to perform light extinction using the light extinction unit when the diaphragm is set to the open state based on the subject brightness acquired using the subject brightness acquisition unit.

In an embodiment of the present invention, it is preferable that, in the case of the plane pickup, the first planar image and the second planar image be combined, and that a high-resolution planar image which has higher resolution than the first and second planar images be acquired.

In an embodiment of the present invention, it is preferable that, in the case of the plane pickup, imaging signals of the pixels which are adjacent in the first planar image and the second planar image be added, and that a planar image which has same resolution as the first and second planar images be acquired.

In an embodiment of the present invention, it is preferable that, in the imaging element, the first pixel group and the second pixel group be arranged in a 2-dimensional form in a planar view in a first direction and a second direction which is perpendicular to the first direction, and, when viewed from at least one side direction of the first and second directions, the pixels of the first pixel group and the pixels of the second pixel group, which are separated therefrom and correspond thereto, be overlapped and arranged to be viewed such that parts of light reception regions thereof are overlapped.

In addition, the present invention provides an image capturing method for enabling stereoscopic pickup used to acquire a stereoscopic image having a first planar image and a second planar image, respectively generated using a first pixel group and a second pixel group, and plane pickup used to acquire a planar image having the first planar image and the second planar image by imaging a same scene using the first pixel group and the second pixel group using a single optical pickup system, an imaging element that has a first pixel group and a second pixel group respectively performing photoelectric conversion on light fluxes passing through different regions of the single optical pickup system, light extinction unit that can reduce an amount of light which is incident to the imaging element from the optical pickup system, and a diaphragm that is arranged in a light path, the image capturing method including: acquiring subject brightness; in a case of the stereoscopic pickup, controlling whether or not to reduce the amount of light which reaches the imaging element using the light extinction unit based on the acquired subject brightness; and, in a case of the plane pickup, causing a diaphragm value of the diaphragm to be greater than a diaphragm value in the case of the stereoscopic pickup.

According to the present invention, it is possible to improve the qualities of the planar images while the parallax of the stereoscopic image is maintained.

BRIEF DESCRIPTION OF THE DRAWINGS

FIG. 6 is a flowchart illustrating the flow of an imaging process example according to the first embodiment.

FIG. 8 is a block diagram illustrating the main section of the image capturing device according to the third embodiment.

FIG. 10 is a block diagram illustrating the main section of the image capturing device according to the fourth embodiment.

FIG. 17 is a flowchart illustrating the flow of an example of the imaging process according to the fifth embodiment.

FIGS. 18A and 18B are views illustrating variation in the width of the impermeable region of the liquid crystal shutter.

FIG. 19 is a flowchart illustrating the flow of an imaging process example according to a sixth embodiment.

FIG. 20 is a flowchart illustrating the flow of an imaging process example according to a seventh embodiment.

FIGS. 28A and 28B are schematic views each illustrating the outline of the pixel array in a case in which a whole pixel array is a square array.

FIG. 29 is a view illustrating a state in which two pixels included in the pair pixels are overlapped and arranged using the pixel arrays shown in FIGS. 28A and 28B.

FIG. 33A is an explanatory view illustrating the main section of the imaging system without using pupil division, FIGS. 33B and 33C are explanatory views each illustrating the main section of a 3D monocular imaging system using a pupil division method.

FIGS. 34A to 34C are explanatory views illustrating the problems of the present invention, that is, FIG. 34A is a schematic view illustrating the shape of an image formed using the imaging system without performing pupil division, and FIG. 34B and FIG. 34C are schematic views illustrating the shapes of images formed using the 3D monocular imaging system using the pupil division method.

DESCRIPTION OF THE PREFERRED EMBODIMENTS

Hereinafter, embodiments of the present invention will be described in detail with reference to the accompanying drawings.

Overall Configuration of Image Capturing Device

Figure 1:
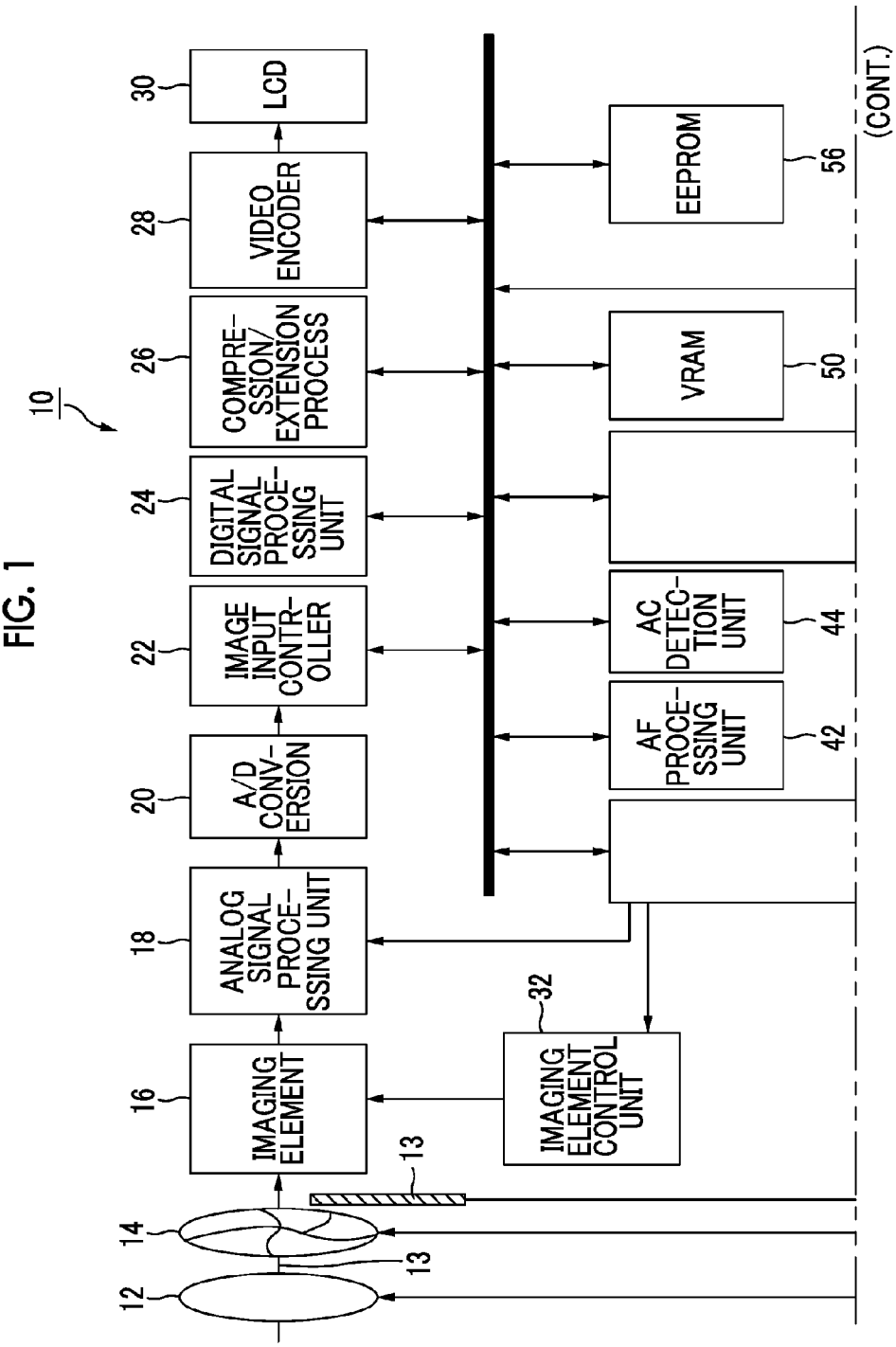
FIG. 1 is a block diagram illustrating an example of the hardware configuration of an image capturing device according to first to fourth embodiments of the present invention.

FIG. 1 is a block diagram illustrating an embodiment of an image capturing device 10 according to the present invention.

The image capturing device 10 records an imaged image in a recording media 54, and the entire operation of the device is integrally controlled by a Central Processing Unit (CPU) 40.

The image capturing device 10 is provided with an operation unit 38 such as a shutter button, a mode dial, a reproduction button, MENU/OK keys, an arrow key, or a BACK key. A signal from the operation unit 38 is input to the CPU 40. The CPU 40 controls each circuit of the image capturing device 10 in response to the input signal. For example, the CPU 40 performs lens drive control, diaphragm drive control, pickup operation control, image process control, image data record/reproduction control, and the display control of a liquid crystal monitor 30 for stereoscopic display.

The shutter button is an operational button that inputs an instruction to start pickup, and includes a two-stage stroke type switch having an S1 switch which is switched on with a half-push, and an S2 switch which is switched on with a full-push. The mode dial is selection unit that selects a 2D (plane) pickup mode, a 3D (stereoscopic) pickup mode, an auto pickup mode, a manual pickup mode, a scene position such as a portrait, a background, or a night view, a macro mode, a moving image mode, and a parallax priority-pickup mode according to the present invention.

The reproduction button is a button which is used to switch to between a reproduction mode which displays a still image or a moving image of the stereoscopic image (3D image) and the planar image (2D image) which is picked up and recorded on the liquid crystal monitor 30. The MENU/OK keys are operation keys which respectively function as a menu button used to perform an instruction to display a menu on the screen of the liquid crystal monitor 30, and an OK button used to indicate confirmation or execution of selected content. Arrow keys are operation units which input instructions of the four directions of up, down, right and left, and function as buttons (cursor movement operation unit) which are used to select an item from the menus on the screen or used to indicate selection of various types of setting items from respective menu items. In addition, the top and bottom keys of the arrow keys function as zoom switches during pickup or reproduction zoom switches during the reproduction mode, the left and right keys function as frame advance (forward direction/reverse direction advance) buttons during the reproduction mode. A BACK key is used to erase a desired target, such as the selected item, to cancel instructed content, or to return to an operation state immediately before the state.

During the pickup mode, an image light which is used to show a subject is formed on the light reception plane of an imaging element 16 which is a solid imaging element through a pickup lens 12 (optical pickup system), including a focal lens and a zoom lens, and through a diaphragm 14. The pickup lens 12 is driven using a lens drive unit 36 which is controlled by the CPU 40, and performs focus control and zoom control.

The diaphragm 14 is arranged in a light path 13 through which light fluxes incident to the imaging element 16 pass, and includes, for example, five diaphragm blades. The diaphragm 14 is driven using a diaphragm drive unit 34 which is controlled by the CPU 40, and diaphragm control is performed thereon in six stages by 1AV, for example, a diaphragm value of F1.4 to F11. Meanwhile, FIG. 1 illustrates a case in which the diaphragm 14 is arranged between the pickup lens 12 and the imaging element 16. However, the present invention is not limited to the case. There are cases in which the pickup lens 12 includes a plurality of lenses (or a plurality of lens groups) and the diaphragm 14 is arranged in the pickup lens 12.

An ND filter 15 (Neutral Density filter) is a device that reduces the amount of light which is incident to the imaging element 16, and can be inserted in the light path 13 through which the light fluxes which are incident to the imaging element 16 pass. Meanwhile, FIG. 1 illustrates a case in which the ND filter 15 is arranged between the pickup lens 12 and the imaging element 16. However, the present invention is not limited to such a case. There are cases in which the pickup lens 12 includes a plurality of lenses (or a plurality of lens groups) and the ND filter 15 is arranged in the pickup lens 12.

The ND filter 15 has an insertion state in which the ND filter 15 is inserted in the light path 13 using a filter swapping drive unit 33 and a non-insertion state in which the ND filter 15 is shifted from the light path 13. The number of ND filters 15 is not particularly limited. The ND filter 15 may include a plurality of (for example, five) filters.

The CPU 40 controls a charge storage time (shutter speed) in the imaging element 16 or the reading of an image signal in the imaging element 16 through an imaging element control unit 32. In addition, the CPU 40 switches the insertion state and the non-insertion state of the ND filter 15 through the filter swapping drive unit 33. In addition, the CPU 40 controls the diaphragm 14 through the diaphragm drive unit 34.

Example of Configuration of Monocular 3D Imaging Element

Figure 2A:
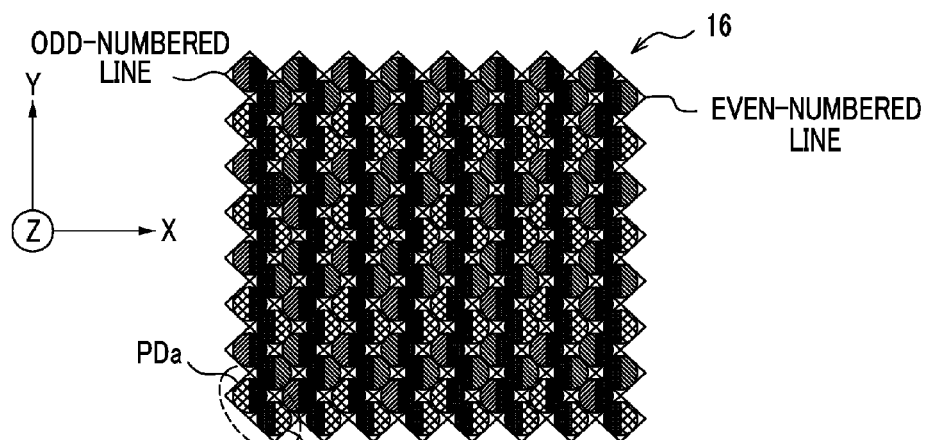
FIGS. 2A to 2C are views illustrating an example of the configuration of an imaging element.
Figure 2B:
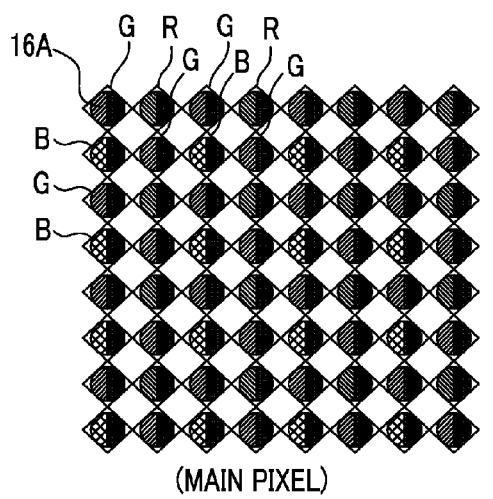
Figure 2C:
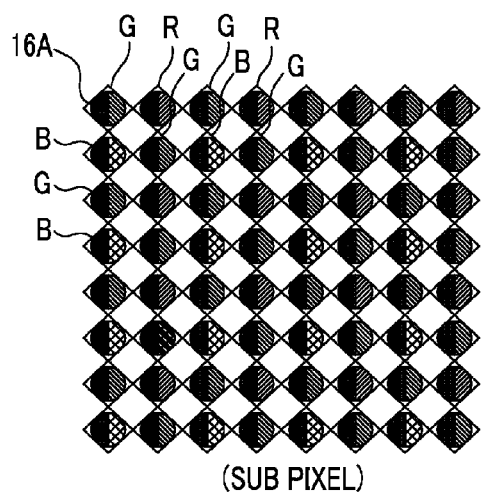

FIGS. 2A to 2C are views illustrating an example of the configuration of the imaging element 16.

The imaging element 16 includes imaging pixels in odd-numbered lines (hereinafter, referred to as "main pixels") and imaging pixels in even-numbered lines (hereinafter, referred to as "sub pixels") which are arranged in matrix, and it is possible to independently read image signals corresponding to two planes obtained through photoelectric conversion performed on each of the main and sub pixels.

As shown in FIGS. 2A to 2C, in the odd-numbered lines (1, 3, 5, . . . ) of the imaging element 16, among the pixels which respectively include R (red), G (green), and B (blue) color filters, pixel array lines GRGR . . . and pixel array lines BGBG . . . are alternately provided. On the other hand, in the pixels of the even-numbered lines (2, 4, 6, . . . ), the pixel array lines GRGR . . . and the pixel array lines BGBG . . . are alternately provided like the odd-numbered lines. Further, with respect to the pixels of the even-numbered lines, pixels are arranged to be shifted in the line direction by half the array pitch. That is, the pixel array of the imaging element 16 is a honeycomb array.

Figure 3:
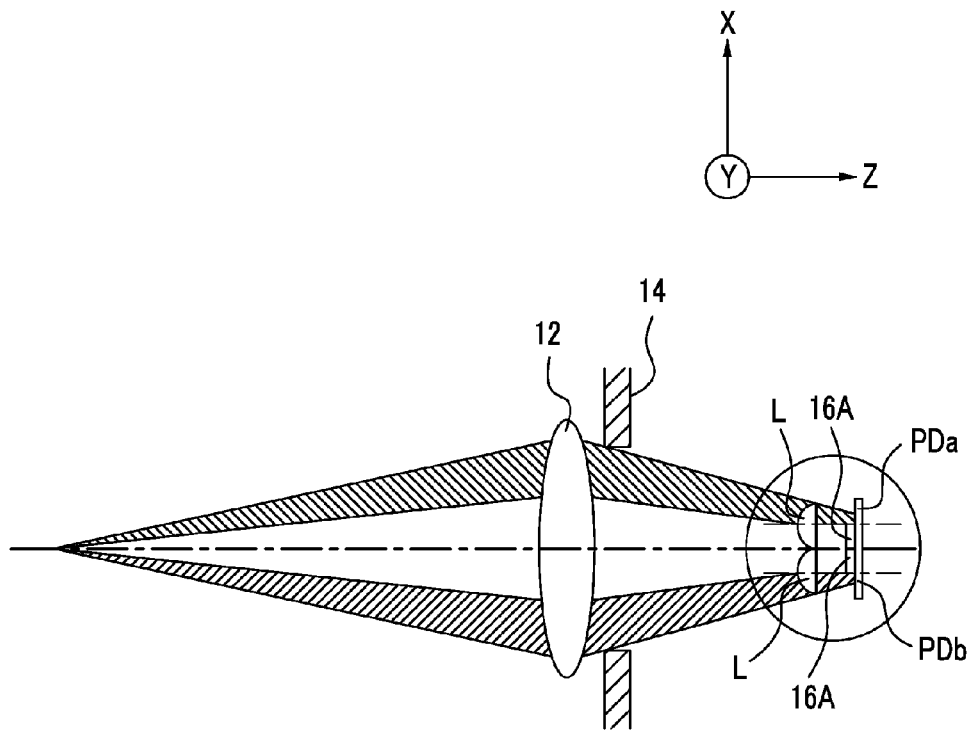
FIG. 3 is a view illustrating an imaging pixel.
Figure 4A:
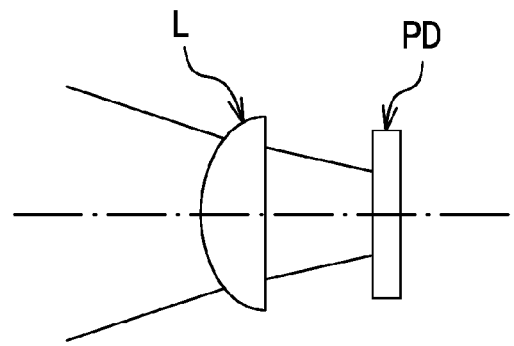
FIGS. 4A and 4B are enlarged views illustrating the main section of FIG. 3.
Figure 4B:
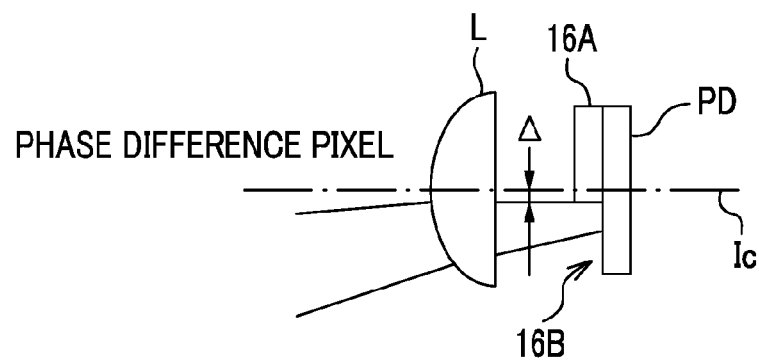

FIG. 3 is a view illustrating the pickup lens 12, the diaphragm 14, and the single main pixel PDa and the single sub pixel PDb of the imaging element 16, and FIGS. 4A and 4B are enlarged views illustrating the main section of FIG. 3.

As shown in FIG. 4A, light fluxes which pass through an exit pupil are incident to the normal pixel (photodiode PD) of the imaging element through a micro lens L without limitation.

In contrast, a light blocking member 16A is formed on the main pixel PDa and the sub pixel PDb of the imaging element 16, thus the right or left half of the light reception planes of the main pixel PDa and the sub pixel PDb is shaded due to the light blocking member 16A That is, the light blocking member 16A has a function as a pupil division member. As shown in FIG. 4A, a main pixel PDa group and a sub pixel PDb group respectively include light reception elements PDa and PDb which are 2-dimensionally arranged. In the imaging element 16, the main pixel PDa and the sub pixel PDb are arranged to be adjacent to each other.

Also, in the imaging element 16 which is configured as described above, the main pixel PDa and the sub pixel PDb are configured so as to have different regions (the right half and the left half) in which light fluxes are restricted using the light blocking member 16A However, the present invention is not limited thereto. The light blocking member 16A may not be provided and the micro lens L and the photodiodes PDs (PDa and PDb) may be relatively shifted in the right and left directions, thus light fluxes which are incident to the photodiode PD may be restricted due to the shifted directions. In addition, a single micro lens is provided for two pixels (the main pixel and the sub pixel), thus light fluxes which are incident to each of the pixels may be restricted.

Returning to FIG. 1, signal charge stored in the imaging element 16 is read as a voltage signal according to the signal charge in response to a read signal which is applied from the imaging element control unit 32. The voltage signal which is read from the imaging element 16 is applied to an analog signal processing unit 18. Here, the sampling of the R, G, and B signals of each of the pixels is held, the signals are amplified using gain (corresponding to ISO sensitivity) designated using the CPU 40, and then the resulting signals are applied to an A/D converter 20. The A/D converter 20 converts the sequentially input R, G, and B signals into digital R, G, B signals, and outputs the resulting signals to an image input controller 22.

A digital signal processing unit 24 performs an offset process, a gain control process including white balance correction and sensitivity correction, a gamma correction process, a synchronization process, a YC process, and a predetermined signal process, such as contrast emphasis or outline correction, on the digital image signals which are input through the image input controller 22.

In addition, an EEPROM 56 is a nonvolatile memory which stores a camera control program, defect information of the imaging element 16, various types of parameters or tables used for an image process, and program lines.

Here, as shown in FIGS. 2B and 2C, main image data which is read from the main pixels of the odd-numbered lines of the imaging element 16 is processed as the planar image of the left viewpoint (hereinafter, referred to as "left image"), and sub image data which is read from the sub pixels of the even-numbered line is processed as the planar image of a right viewpoint (hereinafter, referred to as "right image").

The left image and the right image, which are processed using the digital signal processing unit 24, are input to a VRAM 50. The VRAM 50 includes an A region and a B region each which stores 3D image data indicative of a 3D image of 1 frame. The 3D image data indicative of a 3D image of 1 frame is alternately written in the A region and the B region of the VRAM 50. In the A region and the B region of the VRAM 50, the written 3D image data is read from a region other than the region in a side in which the 3D image data is written. The 3D image data, which is read from the VRAM 50, is encoded in a video encoder 28 and output to a liquid crystal monitor (LCD) 30 for stereoscopic display which is provided on the rear plane of a camera, thus a 3D subject image is displayed on the display screen of the liquid crystal monitor 30.

The liquid crystal monitor 30 is stereoscopic display unit which can display the stereoscopic image (the left image and the right image) as directional images, each having predetermined directivity, using parallax barriers. However, the present invention is not limited thereto. The left image and the right image can be individually seen by wearing glasses using a lenticular lens or dedicated glasses such as polarized glasses or liquid crystal shutter glasses.

In addition, if the first stage push (half-push) of the shutter button of the operation unit 38 is performed, the imaging element 16 starts an AF operation and an AE operation, and performs control in order to move a focal lens in the pickup lens 12 to a focused position through the lens drive unit 36. In addition, during the half-push of the shutter button, the image data which is output from the A/D converter 20 is loaded to an AE detection unit 44.

The AE detection unit 44 integrates the G signals of the whole screen or integrates the G signals which are differently weighted between the central portion and the peripheral portion of the screen, and outputs an integrated value to the CPU 40.

An AF processing unit 42 is a section which performs a contrast AF process or a phase AF process. When the contrast AF process is performed, the AF processing unit 42 extracts the high-frequency components of the image data in the predetermined focus region of at least one of the left image data and the right image data, and calculates an AF evaluation value indicative of a focusing state in such a way as to integrate the high-frequency components. The AF control is performed by controlling the focal lens in the pickup lens 12 in order to cause the AF evaluation value to be the maximum value. In addition, when the AF phase difference process is performed, the AF processing unit 42 detects the phase difference of the image data corresponding to the main pixel and the sub pixel in the predetermined focus region of the left image data and the right image data, and obtains the amount of defocusing based on information indicative of the phase difference. The AF control is performed by controlling the focal lens in the pickup lens 12 in order to cause the amount of defocusing to be 0. When the AF control is being performed, the subject distance of the focused subject is calculated.

If the AE operation and the AF operation are terminated and the second-stage push (full-push) of the shutter button is performed, data for two pieces of images of the left image and the right image, which correspond to the main pixel and the sub pixel output from the A/D converter 20 in response to the second-stage push, is input to a memory (SDRAM) 48 from the image input controller 22, and temporarily stored.

The data for two pieces of images, which is temporarily stored in the memory 48, is appropriately read using the digital signal processing unit 24. Here, a predetermined signal process, including a generation process (YC process) of the brightness data and the color difference data of the image data, is performed. The image data (YC data) on which the YC process is performed is stored in the memory 48 again. Subsequently, two pieces of YC data are respectively output to a compression/extension processing unit 26, and a predetermined compression process, such as Joint Photographic Experts Group (JPEG), is performed thereon. Thereafter, the resulting data is stored in the memory 48 again.

A Multi-Picture file (an MP file: a file in the form in which a plurality of images are connected) is generated based on the two pieces of YC data (compression data) in the memory 48. The MP file is read using a media I/F 52 and stored in a recording media 54.

Subsequently, the present invention will be divided into first to eighth embodiments and described below.

First Embodiment

Figure 5:
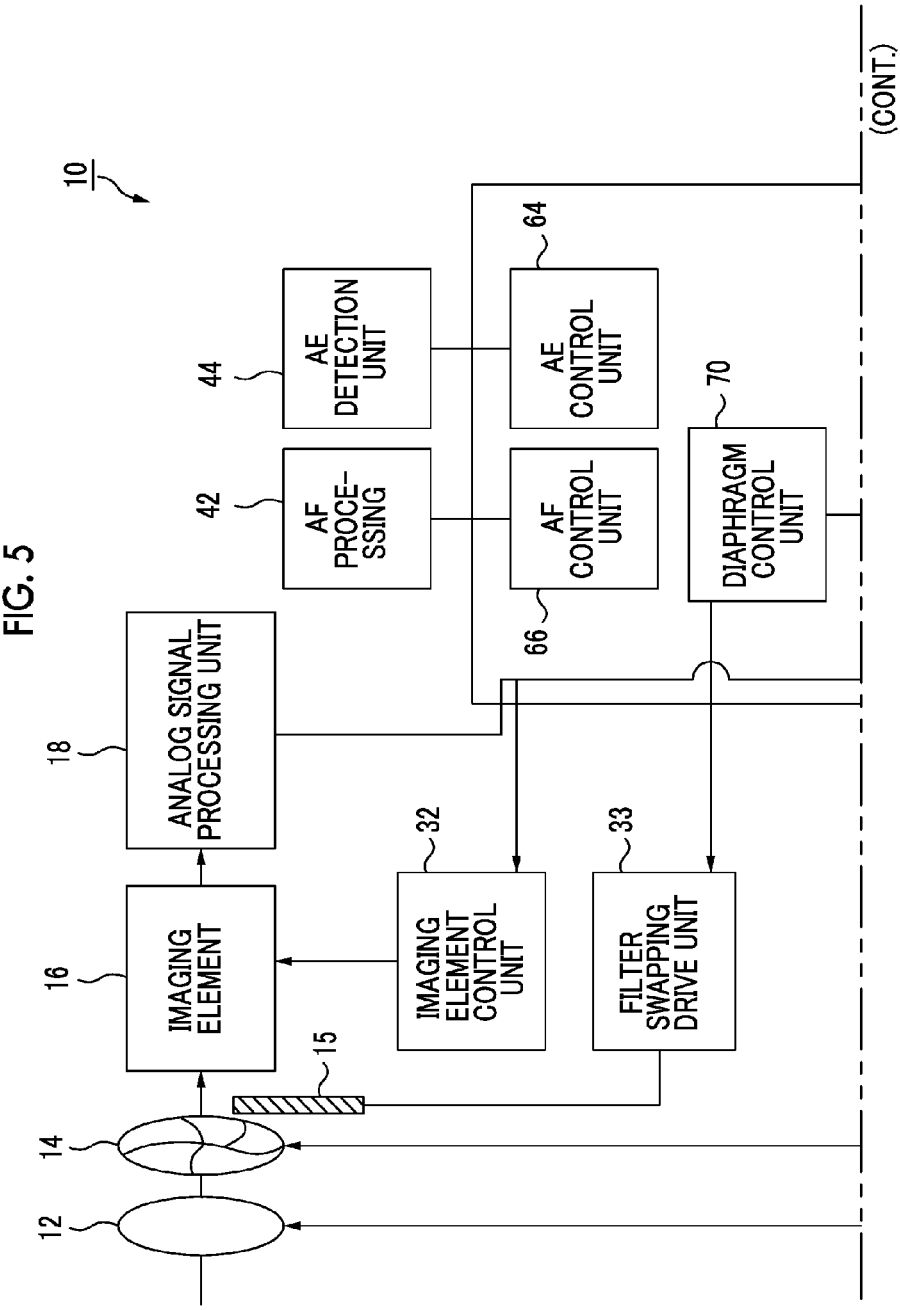
FIG. 5 is a block diagram illustrating the main section of the image capturing device according to the first embodiment.

FIG. 5 is a block diagram illustrating the details of the main section of the image capturing device 10. Meanwhile, in FIG. 5, the same reference numerals are used for the components shown in FIG. 1, and the descriptions of the units which are previously described are omitted below.

In an image capturing device 10 according to the embodiment, a CPU 40 includes a pickup mode setting control unit 62, an AE control unit 64, an AF control unit 66, a pickup execution control unit 68, and a diaphragm control unit 70.

The pickup mode setting control unit 62 receives pickup mode setting operation using the operation unit 38, and stores the received pickup mode in the memory 48. The pickup mode includes at least 3D pickup mode and 2D pickup mode. In addition, the 2D pickup mode includes high-resolution 2D pickup mode in which a high-resolution plane (2D) image is generated and low-resolution 2D pickup mode in which a low-resolution plane (2D) image is generated. Hereinafter, in order to briefly describe the present invention, it is assumed that the 2D pickup mode is the high-resolution 2D pickup mode.

The AE control unit 64 performs AE control under the control of the diaphragm control unit 70 which will be described later, calculates an EV value (subject brightness) based on the integrated value which is output from the AE detection unit 44, determines the diaphragm value of the diaphragm 14 based on the EV value, whether or not the ND filter 15 is inserted (insertion state/non-insertion state), and the shutter speed of the imaging element 16 under the control of the diaphragm control unit 70, controls the diaphragm 14 through the diaphragm drive unit 34 based on the determined diaphragm value, switches the insertion state/non-insertion state of the ND filter 15 through the filter swapping drive unit 33 based on the determination of whether or not the ND filter 15 is inserted, and controls the charge storage time (exposure time) in the imaging element 16 through the imaging element control unit 32 based on the determined shutter speed.

The AF control unit 66 performs a contrast AF process or an AF phase difference process by controlling the AF processing unit 42, and acquires the subject distance of the focused subject from the AF processing unit 42 while the AF control is being performed.

The pickup execution control unit 68 controls charge storage and charge (pixel signal) reading in the imaging element 16 through the imaging element control unit 32, and acquires the left image including the pixel signal of the main pixel group and the right image including the pixel signal of the sub pixel group.

In the case of 3D pickup mode, the pickup execution control unit 68 images a subject using the imaging element 16, acquires a 3D image (stereoscopic image) including a set of the left image and the right image, and records the 3D image in the recording media 54 through the media I/F 52. In addition, in the case of 2D pickup mode (in this example, the high-resolution 2D pickup mode), the pickup execution control unit 68 images the subject using the imaging element 16, synthesizes a high-resolution 2D image including the left image and the right image, and records the high-resolution 2D image in the recording media 54 through the media I/F 52. That is, in the image capturing device 10, both the 3D pickup and the 2D pickup are performed at the same scene, thus both the 3D image and the 2D image which are obtained by radiating the same scene can be obtained.

The resolution of the 3D image is the same as those of the respective viewpoint images (the left image and the right image), and the resolution of the high-resolution 2D image is higher than those of the respective viewpoint images (the left image and the right image) (for example, two times higher).

The diaphragm control unit 70 switches the diaphragm value (F value) of the diaphragm 14 using the diaphragm drive unit 34 based on the instruction of the pickup execution control unit 68. In addition, the diaphragm control unit 70 switches the insertion state and the non-insertion state of the ND filter 15 using the filter swapping drive unit 33 based on the instruction of the pickup execution control unit 68. The insertion state is a state in which the ND filter 15 is inserted on the light path between the pickup lens 12 and the imaging element 16, and the non-insertion state is a state in which the ND filter 15 is shifted from the light path between the pickup lens 12 and the imaging element 16. Meanwhile, the number of ND filters 15 may be plural. When the number of ND filters 15 is plural, the number of ND filters 15 which are inserted is controlled.

In the case of 3D pickup, the diaphragm control unit 70 causes the diaphragm control unit 70 to be an open state (the diaphragm value is the minimum value), and switches over the insertion state, in which the ND filter 15 is inserted in the light path 13, and the non-insertion state using the AE control unit 64 based on the acquired subject brightness.

In addition, in the case of 2D pickup, the diaphragm control unit 70 according to the embodiment causes the diaphragm value of the diaphragm 14 to be greater than the diaphragm value in the case of 3D pickup, and sets the ND filter 15 to the non-insertion state.

FIG. 6 is a flowchart illustrating the flow of an example of the imaging process according to the first embodiment. The process is performed using the CPU 40 according to a program.

In Step S2, the AE control unit 64 performs the AE process. In the AE process, the subject brightness (the EV value) is calculated.

In Step S4, the AF control unit 66 performs the AF (Auto Focus) process. In the AF process, the subject distance of the focused subject is acquired.

In Step S6, it is determined whether the pickup mode is the 3D pickup mode or the 2D pickup mode. In the case of 3D pickup mode, the process proceeds to Step S8. In the case of 2D pickup mode, the process proceeds to Step S14.

In the case of 3D pickup mode, it is determined whether or not the subject brightness which is acquired using the AE control unit 64 is greater than a threshold Tev in Step S8.

When the subject brightness is greater than the threshold Tev (when it is bright), the diaphragm control unit 70 sets the diaphragm 14 to the open state using the diaphragm drive unit 34, and sets the ND filter 15 to the insertion state using the filter swapping drive unit 33 in Step S10.

When the subject brightness is equal to or less than the threshold Tev (when it is dark), the diaphragm control unit 70 sets the open state, in which the diaphragm 14 is open, using the diaphragm drive unit 34, and sets the ND filter 15 to the non-insertion state using the filter swapping drive unit 33 in Step S12.

In the case of 2D pickup mode, the diaphragm control unit 70 sets the diaphragm value (the F value) of the diaphragm 14 to a value which is equal to or greater than a prescribed value through the diaphragm drive unit 34, and sets the ND filter 15 to the non-insertion state using the filter swapping drive unit 33 in Step S14.

Here, the prescribed value of the diaphragm value is a diaphragm value which causes spurious resolution attributable to parallax to be included in a permitted range by causing the image formation positions of the same subject to be closer compared to the 3D pickup in the left image and the right image. Meanwhile, the prescribed value differs depending on a subject distance, a focal distance, a stereoscopic visual environment (the size of the display screen, the resolution of the display screen, or an observation distance), or the stereoscopic fusion limit of a user. The prescribed value is a value which causes the diaphragm value of the diaphragm 14 to be greater compared to the case of the 3D pickup.

The diaphragm control unit 70 squeezes the opening of the diaphragm 14, for example, by one or more stages. The diaphragm control unit 70 sets the diaphragm value which is greater by one or more stages than during pickup in the SN mode (opening) such that, for example, the diaphragm value is set to a value which is equal to or greater than F4 when the opening is F2.8, and the diaphragm value is set to a value which is equal to or greater than F8 when the opening is F5.6. When the subject brightness is high (bright), it is preferable to squeeze the diaphragm by two or more stages.

In Step S16, the pickup execution control unit 68 controls the exposure of the imaging element 16 through the imaging element control unit 32.

In Step S18, the pickup execution control unit 68 controls the reading of the pixel signal (charge) from the main pixel and the sub pixel of the imaging element 16 through the imaging element control unit 32. The read signal is converted from an analog signal into a digital signal using the A/D converter 20.

In Step S20, the predetermined digital signal process is performed on the left image and the right image using the digital signal processing unit 24. In the 2D pickup mode, a high-resolution 2D image is composed by synthesizing the left image and the right image.

In Step S22, image compression is performed using the compression/extension processing unit 26.

In Step S24, the stereoscopic image or the high-resolution 2D image is recorded in the recording media 54 using the media I/F 52.

According to the first embodiment, in the case of 2D pickup, squeezing is necessarily performed using the diaphragm 14 (diaphragm). That is, when the 3D pickup and the 2D pickup are performed on the same scene using the diaphragm control unit 70, the diaphragm state of the diaphragm control unit 70 is switched to a diaphragm state which is appropriate to each of the 3D pickup and the 2D pickup even using the same subject brightness. In the related art, light fluxes from the same subject pass through different pupil positions of the pickup lens 12 and the images of the same subject are formed on different positions of the imaging element 16, thus spurious resolution occurs in a high-resolution 2D image. However, in this embodiment, the light fluxes are squeezed using the diaphragm 14 (diaphragm) in the case of 2D pickup, and image formation positions approach between the left image and the right image, thus the spurious resolution is solved. In addition, in the case of 3D pickup, it is controlled whether or not to set the ND filter 15 to the insertion state based on the subject brightness while the diaphragm 14 is open, thus brightness can be adjusted while maintaining the parallax of the stereoscopic image.

Meanwhile, in the case of 3D pickup, whether to insert the ND filter 15 or to squeeze the diaphragm 14 may be configured to switched by performing setting input of the operation unit 38.

Second Embodiment

Subsequently, an image capturing device according to a second embodiment will be described with reference to FIG. 5. Meanwhile, hereinafter, units which are different from those in the first embodiment will be mainly described, and the descriptions of the units which are previously described in the first embodiment are omitted.

In the case of 2D pickup, the diaphragm control unit 70 according to the embodiment controls whether or not to set the ND filter 15 to the insertion state based on the subject distance of a main subject (focused subject) which is acquired using the AF control unit 66. For example, in the case of 2D pickup, when the subject distance of the focused main subject is greater than the threshold Ts (when the main subject is far), the diaphragm 14 is set to the open state (the diaphragm value is the minimum value). When the subject distance of the focused main subject is equal to or less than the threshold Ts (the main subject is close), the diaphragm value of the diaphragm 14 is widened to the prescribed value and the ND filter 15 is set to the non-insertion state.

Figure 7:
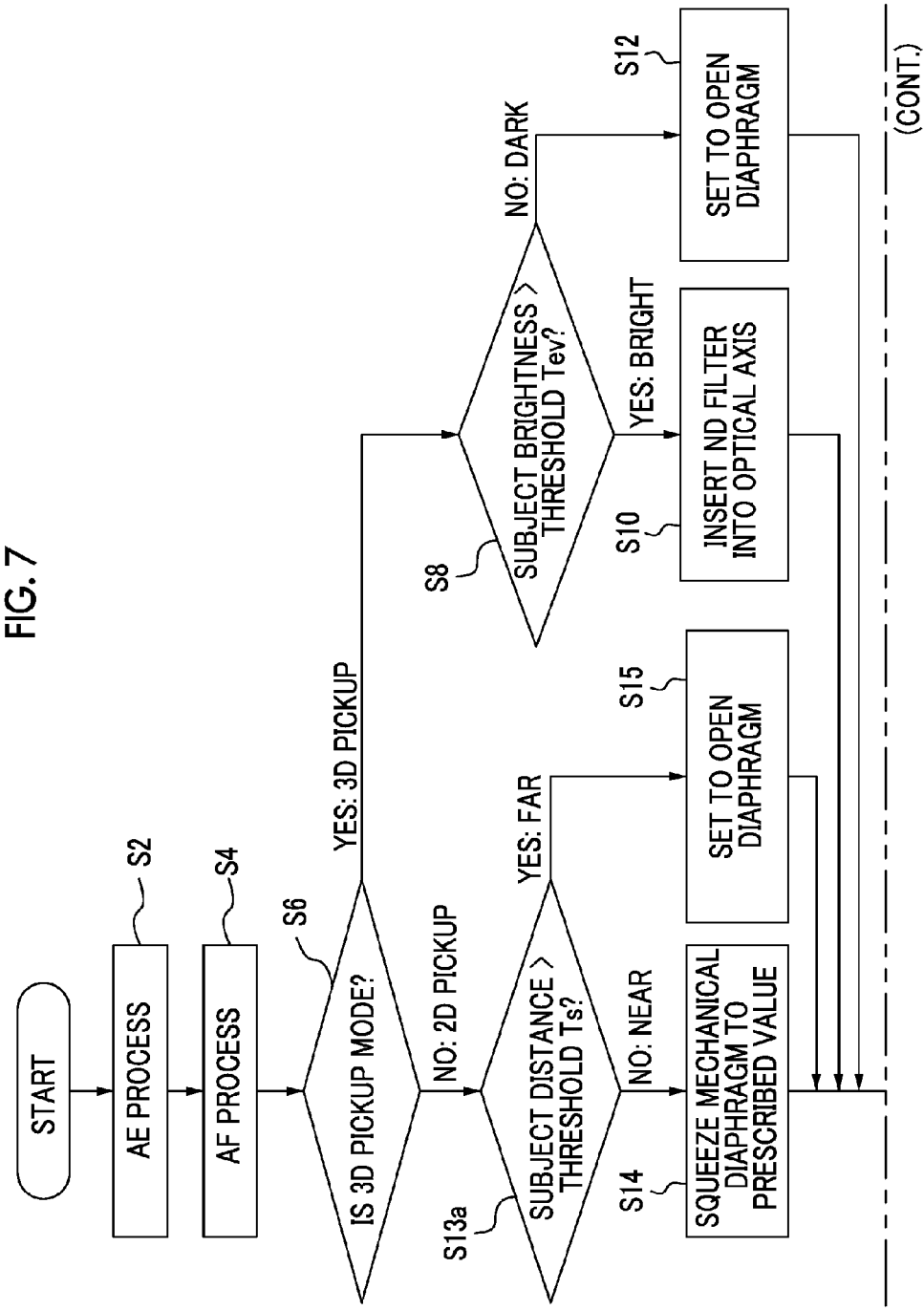
FIG. 7 is a flowchart illustrating the flow of an imaging process example according to the second embodiment.

FIG. 7 is a flowchart illustrating the flow of the imaging process according to the second embodiment.

Steps S2 to S12 are the same as in the first embodiment.

In the case of 2D pickup mode, the diaphragm control unit 70 determines whether or not the subject distance of the main subject (focused subject) which is acquired using the AF processing unit 42 is greater than the threshold Ts in Step S13a.

When the subject distance is equal to or less than the threshold Ts (when the main subject is close), the process proceeds to Step S14. When the subject distance is greater than the threshold Ts (when the main subject is far), the process proceeds to Step S15

Step S14 is the same as in the first embodiment. That is, the diaphragm control unit 70 sets the diaphragm value (the F value) of the diaphragm 14 to a value which is equal to or greater than the prescribed value using the diaphragm drive unit 34, and sets the ND filter 15 to the non-insertion state using the filter swapping drive unit 33.

In Step S15, the diaphragm control unit 70 sets the diaphragm 14 to the open state using the diaphragm drive unit 34, and switches over whether or not to set the ND filter 15 to the insertion state using the filter swapping drive unit 33 based on the subject brightness.

Steps S16 to S24 are the same as in the first embodiment.

As described above, in this embodiment, when the subject distance of the focused subject is large (the subject is far), a shift in image formation between the left image and the right image decreases, thus the diaphragm 14 is set to the open state (the diaphragm value is the minimum value) in the 2D pickup. When the diaphragm is small, image quality is deteriorated due to diffraction. However, the ND filter 15 is inserted and the ND filter 15 is set to the open state (the diaphragm value is the minimum value), thus diffraction due to the machine diaphragm is avoided, thereby preventing the image quality from being deteriorated. In addition, pickup in which the depth of field is uniformly maintained can be performed. Meanwhile, when the subject distance is small, the influence of the above-described spurious resolution increases, thus the diaphragm 14 may be squeezed while diffraction is permitted.

Meanwhile, although the case in which the subject distance is acquired in association with the AF control using the AF control unit 66 is described as an example, the present invention is not particularly limited to the case. For example, the subject distance may be directly detected using a distance sensor.

Third Embodiment

Subsequently, an image capturing device according to a third embodiment will be described with reference to FIG. 8. Meanwhile, hereinafter, units which are shown in FIGS. 5 and 6 and are different from those in the first embodiment will be mainly described, and the descriptions of the units which are previously described in the first embodiment are omitted.

FIG. 8 is a block diagram illustrating the main section of the image capturing device 10 according to the third embodiment. Meanwhile, in FIG. 7, the same reference numerals are used for the components which are shown in FIGS. 1 and 5.

The pickup lens 12 includes a zoom lens, and the focal distance acquisition unit 72 acquires the focal distance of the pickup lens 12.

In the case of 2D pickup, the diaphragm control unit 70 according to the embodiment controls whether or not to set the ND filter 15 to the insertion state based on the focal distance of the pickup lens 12 which is acquired using the focal distance acquisition unit 72. For example, in the case of 2D pickup, when the focal distance is greater than the threshold Tz (the focal distance is long), the diaphragm value of the diaphragm 14 is increased to the prescribed value and the ND filter 15 is set to the non-insertion state. When the focal distance is equal to or less than the threshold Tz (the focal distance is short), the diaphragm 14 is set to the open state (the diaphragm value is the minimum value).

Figure 9:
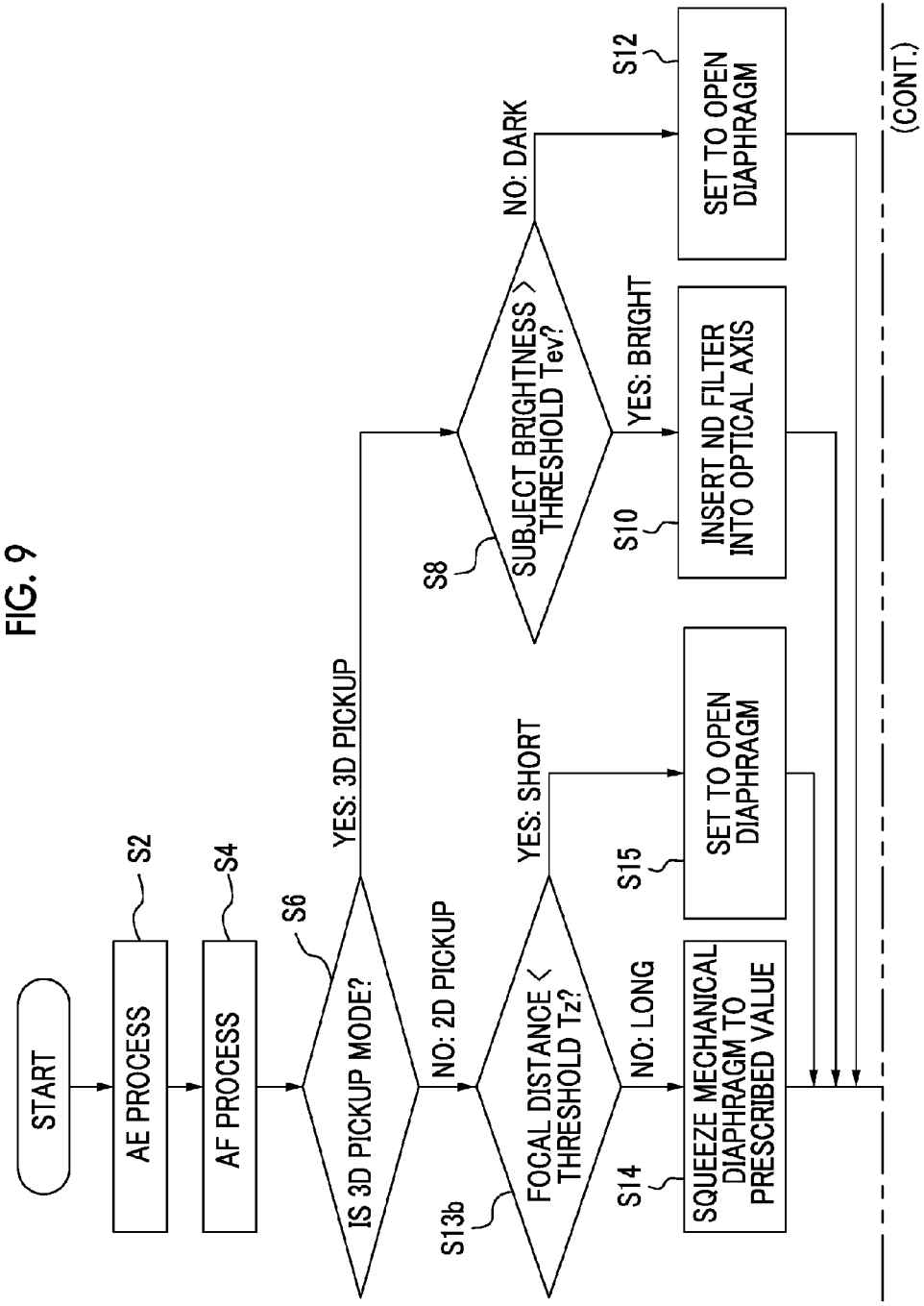
FIG. 9 is a flowchart illustrating the flow of an imaging process example according to the third embodiment.

FIG. 9 is a flowchart illustrating the flow of the imaging process according to the third embodiment.

Steps S2 to S12 are the same as in the first embodiment.

In the case of 2D pickup mode, it is determined whether or not the focal distance of the pickup lens 12 acquired using the focal distance acquisition unit 72 is greater than the threshold Tz in Step S13b.

When the focal distance is greater than the threshold Tz (when the focal distance is long), the process proceeds to Step S14. When the focal distance is equal to or less than the threshold Tz (when the focal distance is short), the process proceeds to Step S15.

Steps S14 to S24 are the same as in the first embodiment.

In this embodiment, when the focal distance of the pickup lens 12 is short, a shift in image formation between the left image and the right image decreases, thus the diaphragm 14 is set to the open state (the diaphragm value is the minimum value) even in the 2D pickup, thereby performing light extinction using the ND filter 15. Therefore, deterioration at image quality due to diffraction can be prevented.

Meanwhile, a focal distance acquisition aspect is not particularly limited. The movement of the zoom lens of the pickup lens 12 may be used to directly detect the focal distance, the focal distance may be obtained by observing the drive signal of the lens drive unit 36 used to drive the zoom lens, and the focal distance may be obtained using the image process.

Fourth Embodiment

Subsequently, an image capturing device according to a fourth embodiment will be described with reference to FIG. 10. Meanwhile, hereinafter, only units which are different from those in the second embodiment will be mainly described, and the descriptions of the units which are previously described are omitted.

FIG. 10 is a block diagram illustrating the main section of the image capturing device 10 according to the fourth embodiment. Meanwhile, in FIG. 10, the same reference numerals are used for the components which are shown in FIGS. 1 and 5.

The parallax information acquisition unit 74 acquires parallax information which is related to the parallax between the planar images (viewpoint images) of multiple viewpoints included in a 3D image based on the 3D image which is acquired by imaging using the imaging element 16. The parallax information includes information such as a parallax map (parallax distribution information) and a parallax range which is acquired from the parallax map. The parallax range indicates the difference between the amount of maximum parallax of the near side and the amount of maximum parallax of the far side of the 3D image obtained using the imaging element 16.

The parallax information acquisition unit 74 in this example detects a corresponding point at which the feature of the left image (a first 2D image) of the acquired 3D image coincides with the feature the right image (a second planar image), calculates the amount of parallax between the left image and the right image at each detected corresponding point, and creates a parallax map which is indicative of the distribution of the amount of parallax. In addition, the parallax information acquisition unit 74 in this example calculates the difference (the parallax range) between the amount of maximum parallax of the near side and the mount of maximum parallax of the far side from the created parallax map.

In the case of 2D pickup, the diaphragm control unit 70 in this example controls whether or not to open the diaphragm 14 based on the subject distance of the main subject (focused subject) which is acquired using the AF control unit 66 and the parallax range which is acquired using the parallax information acquisition unit 74. Meanwhile, the present invention is not limited to the case in which the opening/non-opening of the diaphragm 14 is switched over based on both the subject distance and the parallax range, and there is a case in which the opening/non-opening of the diaphragm 14 is switched over based on only the parallax range.

For example, in the case of 2D pickup, when the parallax range is smaller than a threshold $T_R$ (when it is determined that the parallax range is small), the diaphragm 14 is set to the open state (the diaphragm value is the minimum value). When the parallax range is equal to or greater than the threshold $T_R$ (when it is determined that the parallax range is large), the diaphragm value of the diaphragm 14 is increased to the prescribed value.

Figure 11:
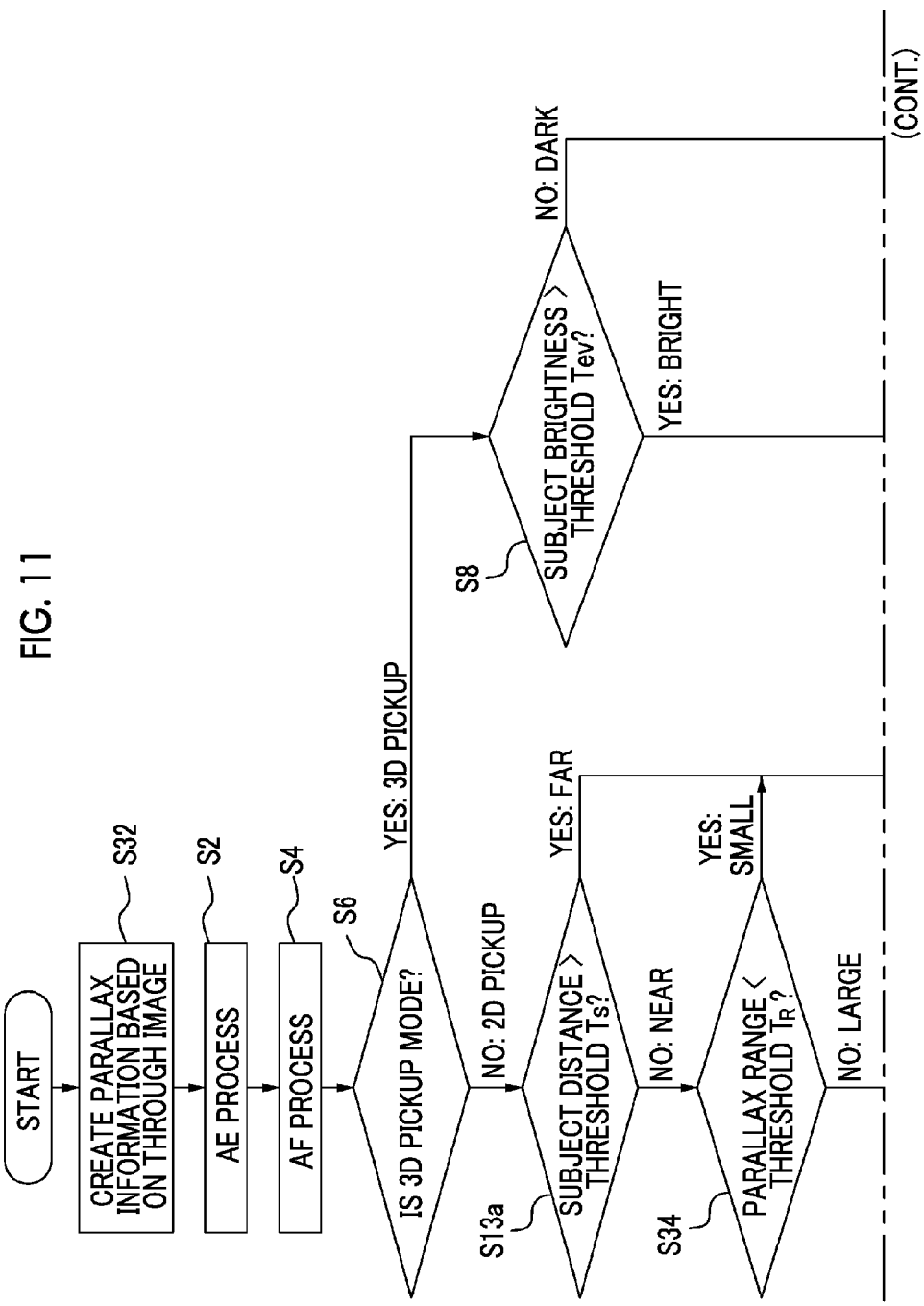
FIG. 11 is a flowchart illustrating the flow of an imaging process example according to the fourth embodiment.

FIG. 11 is a flowchart illustrating the flow of an imaging process according to the fourth embodiment.

In Step S32, the parallax information acquisition unit 74 creates the parallax information including the parallax map and the parallax range from the 2D images of multiple viewpoints included in the 3D image which is obtained by imaging using the imaging element 16. In this example, the parallax range is calculated from a through image (a live view image) which is imaged as a stereoscopic image which is obtained before the pickup instruction is input using the operation unit 38 (for example, using the shutter button). Meanwhile, when the through image is imaged, the diaphragm control unit 70 sets the diaphragm 14 to the open state. Therefore, the parallax information can be securely acquired. In addition, the resolution of the through image may be lower than the stereoscopic image (recording image) which is recorded in the recording media 54. Therefore, the processing load of the image capturing device 10 can be reduced.

Steps S2 to S12 and S13*a* are the same as in the second embodiment.

In Step S13*a*, when the subject distance is equal to or less than the threshold Ts (when the main subject is close) in the 2D pickup mode, the process proceeds to Step S34. When the subject distance is greater than the threshold Ts (when the main subject is far), the process proceeds to Step S15.

In Step S34, when the parallax range is compared with the threshold $T_R$ and the parallax range is smaller than the threshold $T_R$ (when it is determined that the parallax range is small), the diaphragm 14 is set to the open state (the diaphragm value is the minimum value) in Step S15. When the parallax range is equal to or greater than the threshold $T_R$ (when it is determined that the parallax range is large), the diaphragm control unit 70 sets the diaphragm value (the F value) of the diaphragm 14 to a value which is equal to or greater than the prescribed value using the diaphragm drive unit 34 in Step S14. That is, the diaphragm 14 is squeezed using 3D pickup of the same subject brightness.

Meanwhile, steps S15 to S24 are the same as in the second embodiment.

Fifth Embodiment

Subsequently, an image capturing device according to a fifth embodiment will be described with reference to FIGS. 12 to 18B. Meanwhile, hereinafter, the descriptions of the units which are previously described are omitted.

Figure 12:
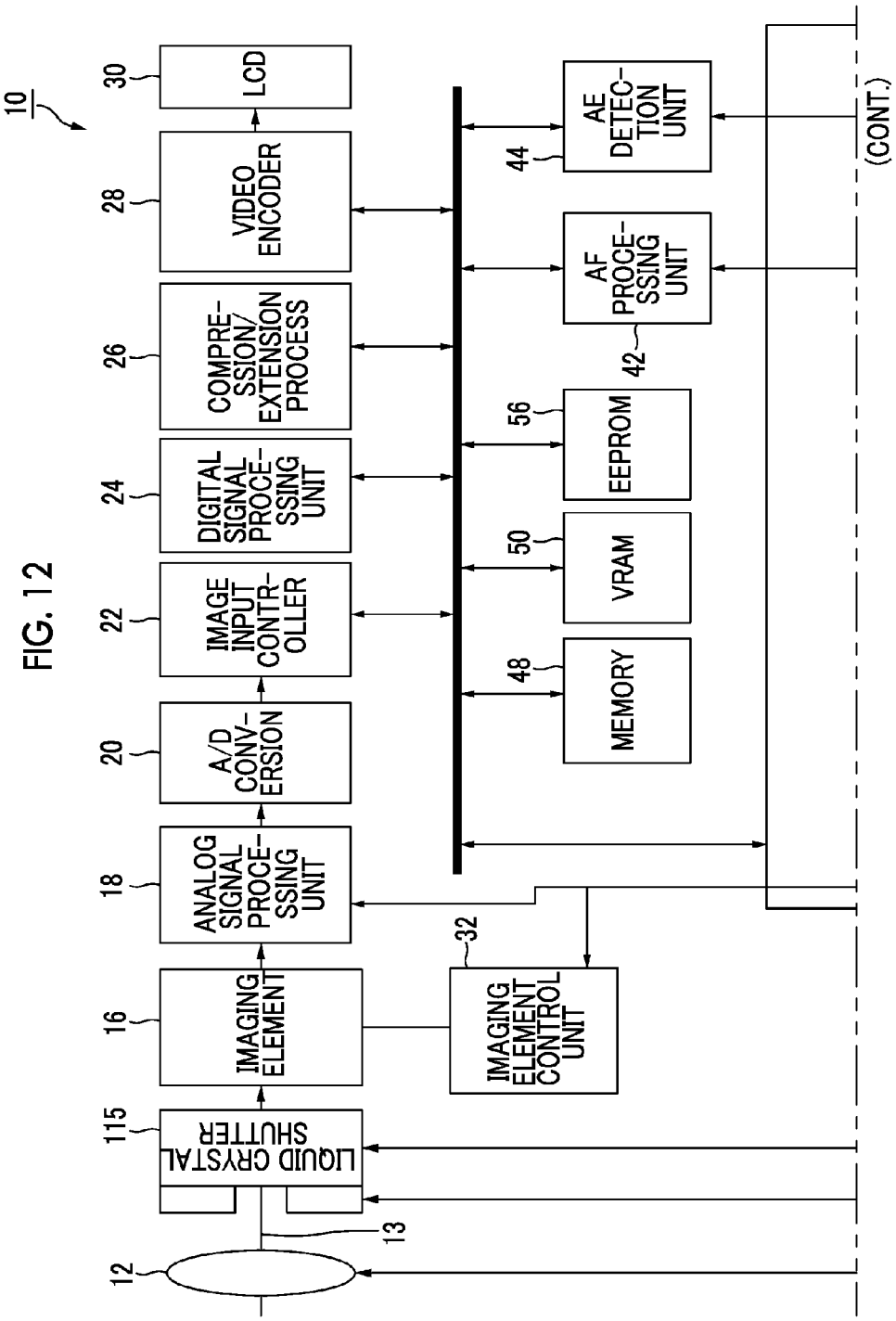
FIG. 12 is a block diagram illustrating an image capturing device according to the fifth embodiment.

FIG. 12 is a block diagram illustrating an image capturing device 10 according to the fifth embodiment. Meanwhile, the same reference numerals are used for the same components which are shown in FIG. 1.

In this embodiment, as show in FIG. 13, a liquid crystal shutter 115 which will be described later is arranged at the rear portion of the diaphragm 14. Therefore, the imaged image signal corresponding to a subject light image, which is incident to the light reception plane of the imaging element 16 through the pickup lens 12, the diaphragm 14, and the liquid crystal shutter 115 in this order, is converted into digital data using the A/D converter 20 shown in FIG. 12.

The liquid crystal shutter 115 performs light transmission and interception in such a way as to cause the array of liquid crystal molecules to be changed by applying or removing a voltage to the liquid crystal molecules. When viewed from the optical axis direction K (13 in FIG. 12), the size of the liquid crystal layer of the liquid crystal shutter 115 may be enough to cover the opening 14*a* when the diaphragm 14 is maximally open.

The liquid crystal shutter 115 can form a transmission region, through which light passing through the diaphragm 14 transmits, and an impermeable region, which does not transmit light passing through the diaphragm 14, at arbitrary positions of the liquid crystal layer.

Figure 13:
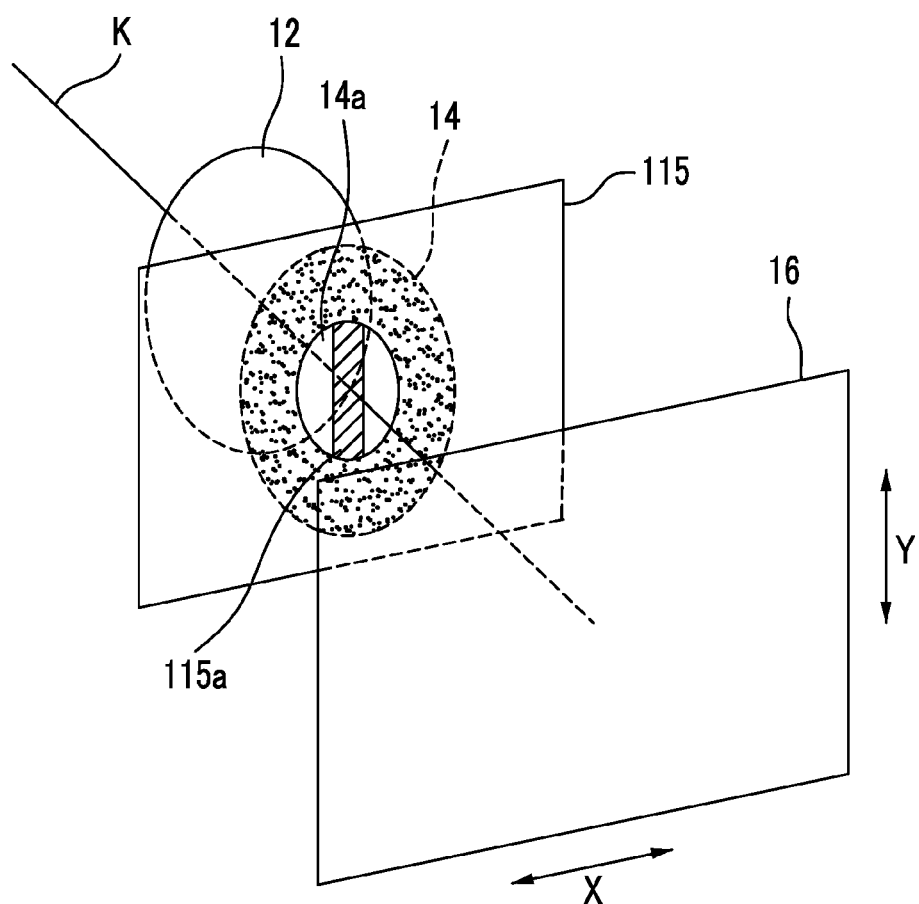
FIG. 13 is a perspective view illustrating a pickup lens, a diaphragm, a liquid crystal shutter, and an imaging element of the image capturing device, which are viewed from a slant.

Since the liquid crystal shutter 115 and the diaphragm 14 are arranged to be adjacent to each other (ideally, come into contact), a part of the opening 14*a* (a region which has almost the same area as the impermeable region 115*a*) is in a state of being completely shielded due to an impermeable region 115*a* which is formed in the liquid crystal shutter 115 as shown in FIG. 13.

A liquid crystal shutter drive unit 131 is connected to the CPU 40. The liquid crystal shutter drive unit 131 controls the drive of the liquid crystal shutter 115 according to the instruction from the CPU 40.

During the 3D pickup mode, in the image capturing device 10 according to the embodiment, the impermeable region 115*a*, which is used to shield a part of the opening 14*a*, is formed in the liquid crystal shutter 115 in order for the liquid crystal shutter drive unit 131 to equally divide the opening 14*a*, which is viewed in the optical axis direction, in the horizontal direction X under the control of the CPU 40.

Here, the sensitivity properties of the incidence angles (the sensitivity properties of incident angles of light which is incident to the pixels) of one side pixel and the other side pixel which are included in the pair pixels will be described in detail.

Figure 14:
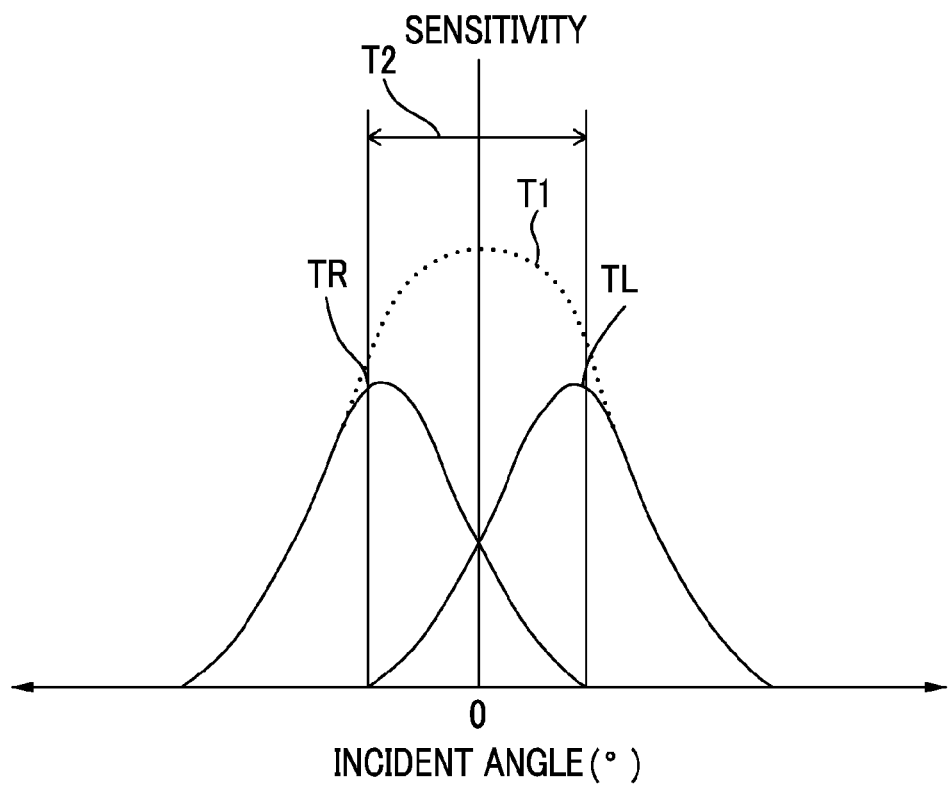
FIG. 14 is a view illustrating the sensitivity properties of the incidence angles of the pair pixels of the imaging element.

FIG. 14 is a view illustrating the sensitivity properties of the incidence angles of two pixels included in the pair pixels of the imaging element 16. In FIG. 14, reference symbol TL indicates the sensitivity property of the incidence angle of a main pixel PDa group (hereinafter, referred to as an "A group"), and reference symbol TR indicates the sensitivity property of the incidence angle of a sub pixel PDb group (hereinafter, referred to as a "B group"). Reference symbol T1 indicates the sensitivity property of the incident angle of a virtual pixel in which the center of the micro lens L coincides with the center of the light blocking member opening 16B, for example, in the phase difference pixel shown in FIG. 4B.

In FIG. 14, a horizontal axis indicates an incident angle and a vertical axis indicates sensitivity. It is assumed that the incident angle is 0 degrees when light is perpendicularly incident to the center of the micro lens L on the upper side of the pixel and the incident angle increases as the ray which is incident to the corresponding center inclines toward the horizontal direction (the pupil division direction of the pair pixels). In detail, if the ray, which is incident to the center of the micro lens L, inclines toward the right side in the horizontal direction, a right-side numerical value in the horizontal axis in FIG. 14 increases. If the corresponding ray inclines toward the left side in the horizontal direction, a left-side numerical value in the horizontal axis in FIG. 14 increases.

As shown in FIG. 14, the shapes of the sensitivity properties of the incidence angles of the two pixels included in the pair pixels of the imaging element 16 are approximately the same, and the peak positions of the respective sensitivities are separated by an equivalent distance from the vertical axis. That is, the relationship of the sensitivity properties of the incidence angles of the two pixels included in the pair pixels is an axial symmetry with respect to the vertical axis (the axis of sensitivity when the incident angle is 0 degrees). In addition, the sensitivity properties of the incidence angles of the two pixels included in the pair pixels are that an incident angle range which has the sensitivity of one side pixel and an incident angle range which has the sensitivity of the other side pixel are overlapped (a range shown using the reference symbol T2 in FIG. 14).

A range, which is surrounded by the waveform TR shown in FIG. 14 and the horizontal axis, corresponds to the amount of light which passes through the first pupil region of the optical pickup system, a range, which is surrounded by the waveform TL and the horizontal axis, corresponds to the amount of light which passes through the second pupil region of the optical pickup system, and a range, which is surrounded by the waveform T1 and the horizontal axis, corresponds to the amount of light which passes through the third pupil region which includes the first pupil region and the second pupil region of the optical pickup system. That is, pupil division is performed on the two pixels included in the pair pixels in order to receive light which passes through each of the different pupil regions of the optical pickup system. Thereafter, pupil division is performed on the pupil regions through which light received using the respective two pixels included in the pair pixels passes in order to have the overlap of each other in the vicinity of the optical axis.

Figure 15:
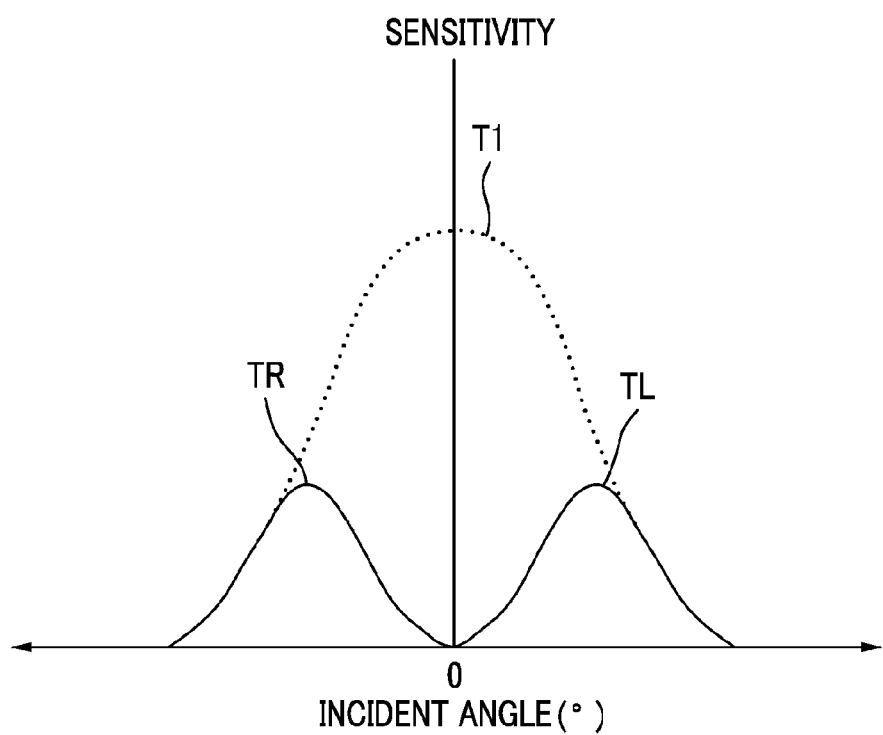
FIG. 15 is a view illustrating properties obtained when the sensitivity properties of the incidence angles of the pair pixels of the imaging element are completely separated.

In order to obtain excellent parallax using the imaged image signal of the A group and the imaged image signal of the B group, it preferable to set the overlap range T2 shown in FIG. 14 to 0 and to completely separate the sensitivity properties of the incidence angles in the one side pixel and the other side pixel of the pair pixels. However, in order to set the overlap range T2 to 0, it is necessary to increase the distance of the interval of the light blocking member openings (an interval between 133a and 133b in FIG. 26 which will be described later) between the two pixels included in the pair pixels in the horizontal direction X. In order to implement this, it is necessary to narrow the light blocking member opening 16B (light blocking member openings 133a and 133b in FIG. 26). As a result, the sensitivity properties TR and TL of the incident angles of the pair pixels, which are obtained when the overlap range T2 is set to 0, are as shown in FIG. 15, and the sensitivities of the pair pixels are deteriorated compared to the case shown in FIG. 14.

That is, there are problems in that it is difficult to obtain excellent parallax if sensitivity is increased in the imaging element 16 according to this embodiment, and in that sensitivity is deteriorated if excellent parallax is obtained.

Here, the image capturing device 10 according to this embodiment restricts light which is incident to the imaging element 16 in order to obtain excellent parallax even when the imaging element 16 has the sensitivity properties of the incidence angles shown in FIG. 14 in which sensitivity is prior to parallax and even when the liquid crystal shutter 115 which is provided between the imaging element 16 and the diaphragm 14 has the sensitivity properties of the incidence angles shown in FIG. 14.

Figure 16:
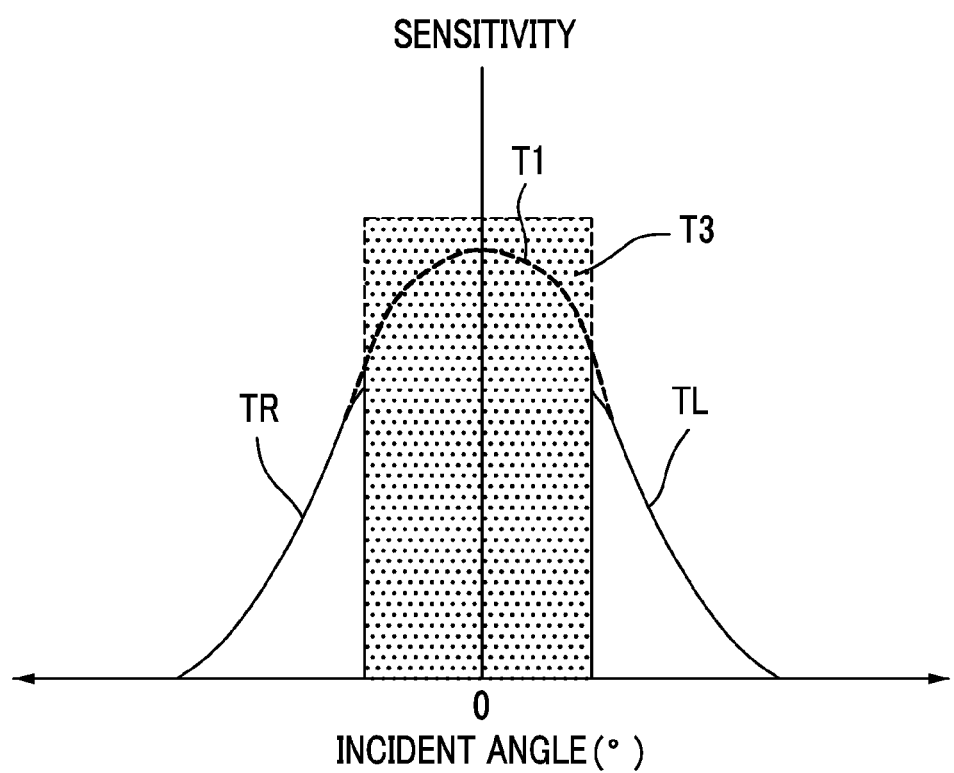
FIG. 16 is a view illustrating the variation in the sensitivity properties of the incidence angles of the pair pixels of the imaging element due to an impermeable region installed in the liquid crystal shutter.

When the impermeable region 115a (the light blocking region) is formed, the sensitivity properties TR and TL of the incident angles of the pair pixels are as shown in FIG. 16.

In FIG. 16, a region which is indicated using a reference symbol T3 is an incident angle range in which it is difficult to obtain sensitivity due to the impermeable region 115a. If the width of the incident angle range in the horizontal axis is the same as the width of the overlap range T2 in the horizontal axis direction shown in FIG. 14, the sensitivity properties of the incidence angles of the pair pixels can be completely separated by removing the overlap range T2. Therefore, in order to obtain the range T3, the width of the impermeable region 115a in the horizontal direction X is set.

As described above, the sensitivity of each pixel can be higher compared to the example shown in FIG. 15 and the sensitivity properties of the incident angles of the A group and the B group can be completely separated by forming the impermeable region 115a. However, the degree of the separation is higher than that of the case shown in FIG. 15. Therefore, stereoscopic imaging in which excellent parallax is compatible with high sensitivity can be implement.

Description will be made by returning to FIG. 12. In the case of 3D pickup, the diaphragm control unit 70 according to this embodiment controls the liquid crystal shutter 115 through the liquid crystal shutter drive unit 131, and sets a part (a central portion) of the opening 14a of the diaphragm 14 to a light blocking state (non-transmission state) which is shielded using the liquid crystal shutter 115. In addition, in the case of 3D pickup, the diaphragm control unit 70 controls the liquid crystal shutter 115 through the liquid crystal shutter drive unit 131, and controls the size (width) of the light blocking region (the impermeable region) of the opening 14a of the diaphragm 14 based on the subject brightness which is acquired using the AE control unit 64. In addition, in the case of 3D pickup, the diaphragm control unit 70 in this example controls the diaphragm 14 through the diaphragm drive unit 34, and sets the diaphragm 14 to the open state (the diaphragm value is the minimum value).

In addition, in the case of 2D pickup, the diaphragm control unit 70 according to this embodiment controls the liquid crystal shutter 115 through the liquid crystal shutter drive unit 131, and sets the opening 14a of the diaphragm 14 to a non-light blocking state (transmission state), which is not shielded, using the liquid crystal shutter 115. In addition, the diaphragm control unit 70 controls the diaphragm 14 through the diaphragm drive unit 34 in the case of 2D pickup, and causes the diaphragm value of the diaphragm 14 to be greater than a diaphragm value obtained in the case of 3D pickup.

FIG. 17 is a flowchart illustrating the flow of an imaging process example performed using the image capturing device 10 shown in FIG. 12. This process is performed according to a program using the CPU 40. Meanwhile, description will be made while it is assumed that the whole plane of the liquid crystal shutter 115 is in the transmission state before an operation starts.

Steps S2 to S6 and S14 are the same as in the first embodiment.

In the case of 3D pickup mode, after Step S6 is performed, the CPU 40 forms the impermeable region 115a in the liquid crystal shutter 115 through the liquid crystal shutter drive unit 131 in Step S42. The width of the impermeable region 115a in the horizontal direction X is set to a width based on the subject brightness acquired in Step S2.

Steps S16 to S24 are the same as in the first embodiment.

In the case of 2D pickup mode, the CPU 40 performs the imaging based on the determined F value, the shutter speed, and the focal position using the imaging element 16 while the whole plane of the liquid crystal shutter 115 is set to the non-light blocking state (transmission state) in steps S16 to S24. That is, in the case of 2D mode (plane pickup) in which a 2D image is recorded by imaging once, the liquid crystal shutter drive unit 131 performs imaging without forming the impermeable region 115a in the liquid crystal shutter 115.

Meanwhile, the overlap range T2 shown in FIG. 14 is obtained when the subject brightness has an arbitrary value. If the subject brightness varies, the optimal value of the amount of light which is incident to the imaging element 16 varies. Here, it is preferable that the liquid crystal shutter drive unit 131 change the width of the impermeable region 115a in the horizontal direction X which is formed in the liquid crystal shutter 115 based on the subject brightness.

For example, when the subject brightness is low, the width of the impermeable region 115a in the horizontal direction X is small as shown in FIG. 18A. When the subject brightness is high, the width L of the impermeable region 115a in the horizontal direction X is large as shown in FIG. 18B. That is, the liquid crystal shutter drive unit 131 widens the width L of the impermeable region 115a in the horizontal direction X as the subject brightness higher.

An image which normally has excellent brightness can be obtained regardless of the subject brightness by performing operation as described above.

Meanwhile, the width L of the impermeable region 115a in the horizontal direction X which is formed in the liquid crystal shutter 115 in the case of 3D pickup mode may be changed based on information other than the subject brightness. For example, the width of the impermeable region 115a may be determined based on the pickup distance (subject distance). In addition, when the pickup lens 12 is capable of varying the focal distance, the width of the impermeable region 115a may be determined based on the focal distance.

When an infinite distant view of a landscape image is picked up, it is difficult to separate a sensitivity property from the pair pixels. When a near view image is picked up, it is easy to separate a sensitivity property from the pair pixels. Therefore, when a pickup distance is close, it is effective that the width of the impermeable region 115a is narrowed prior to sensitivity. Meanwhile, when the pickup distance far, it is effective that the width of the impermeable region 115a is widened prior to parallax. From the above, it is preferable that the liquid crystal shutter drive unit 131 increase the width of the impermeable region 115a as the pickup distance is far.

In addition, when the focal distance is short, it is difficult to separate a sensitivity property from the pair pixels. When the focal distance is long, it is easy to separate a sensitivity property from the pair pixels. Therefore, when the focal distance is long, it is effective that the width of the impermeable region 115a is narrowed prior to sensitivity. Meanwhile, when the focal distance is short, it is effective that the width of the impermeable region 115a is widened prior to parallax. From the above, it is preferable that the liquid crystal shutter drive unit 131 increase the width of the impermeable region 115a as the focal distance is short.

In addition, the width of the impermeable region 115a in the horizontal direction X may be determined based on a pickup scene.

Since high sensitivity is required in a dark scene (a scene in which the brightness of a subject is equal to or less than a threshold value) such as a night view, priority is given to sensitivity (the width of the impermeable region 115a is narrowed), and priority is given to parallax (the width of the impermeable region 115a is widened) in other scenes, thus optimal image quality can be obtained according to a picked up scene.

In addition, in this embodiment, it is preferable that the diaphragm 14 be set to the open state in the case of 3D pickup. When the diaphragm 14 is squeezed and the diaphragm value is large in the case of 3D pickup, the width L of the impermeable region 115a in the horizontal direction X may be reduced. That is, the liquid crystal shutter drive unit 131 narrows the width L of the impermeable region 115a in the horizontal direction X as the diaphragm value is large. Even in this case, the width L of the impermeable region 115a in the horizontal direction X is increased as the subject brightness is high.

Meanwhile, in the case of the dark scene, it is preferable to aim at sensitivity improvement by setting the width of the impermeable region 115a to 0.

The width of the impermeable region 115a in the horizontal direction X may be determined based on an individual subject distance, and may be determined by taking into consideration any one of the pickup distance, the focal distance, and the picked up scene or the combination thereof. The subject brightness may be determined based on the pickup scene.

For example, after the width of the impermeable region 115a is set in order for the overlap range T3 to disappear based on the pickup distance or the focal distance, the width of the impermeable region 115a may be adjusted based on the subject brightness. In addition, the width of the impermeable region 115a may be stored for each combination of the subject brightness and the pickup distance or the focal distance, and the width may be set based on the combination when the combination is determined.

Figure 21:
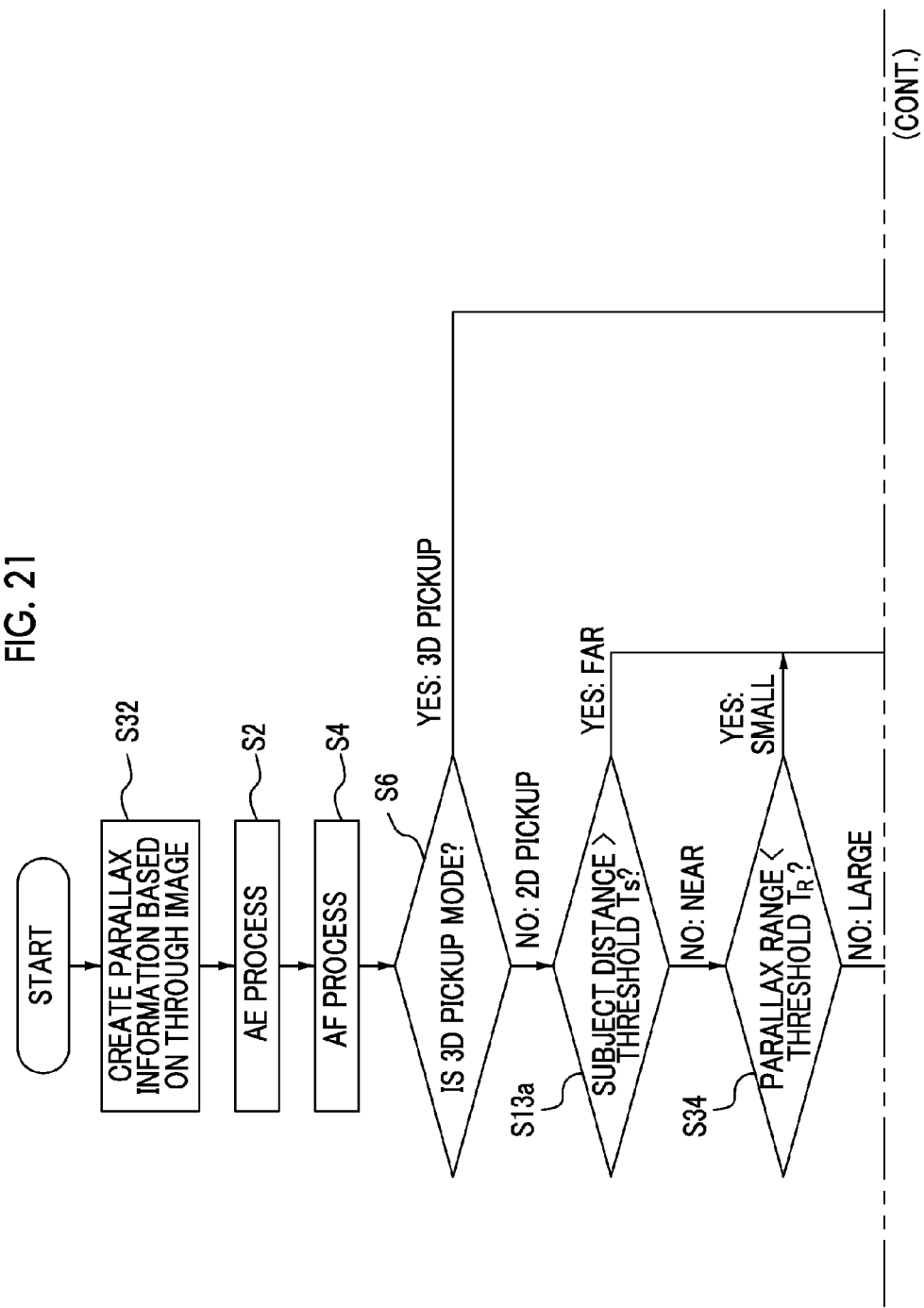
FIG. 21 is a flowchart illustrating the flow of an imaging process example according to an eighth embodiment.

Meanwhile, a process in the case of 2D pickup may be performed as described in the second embodiment to fourth embodiment. FIG. 19 illustrates the flow of an example of a pickup process according to a sixth embodiment in which the same process as that of the second embodiment is performed in the case of 2D pickup (in particular, steps S13a to S15). FIG. 20 illustrates the flow of an example of a pickup process according to a seventh embodiment in which the same process as that of the third embodiment is performed in the case of 2D pickup (in particular, steps S13b to S15). FIG. 21 illustrates the flow of an example of a pickup process according to an eight embodiment in which the same process as that of the fourth embodiment is performed in the case of 2D pickup (in particular, steps S13a, S34, S14, and S15). In the sixth to eight embodiments, the same process is performed in Step S42 as that of the fifth embodiment.

Pickup Mode Setting Process

Figure 22:
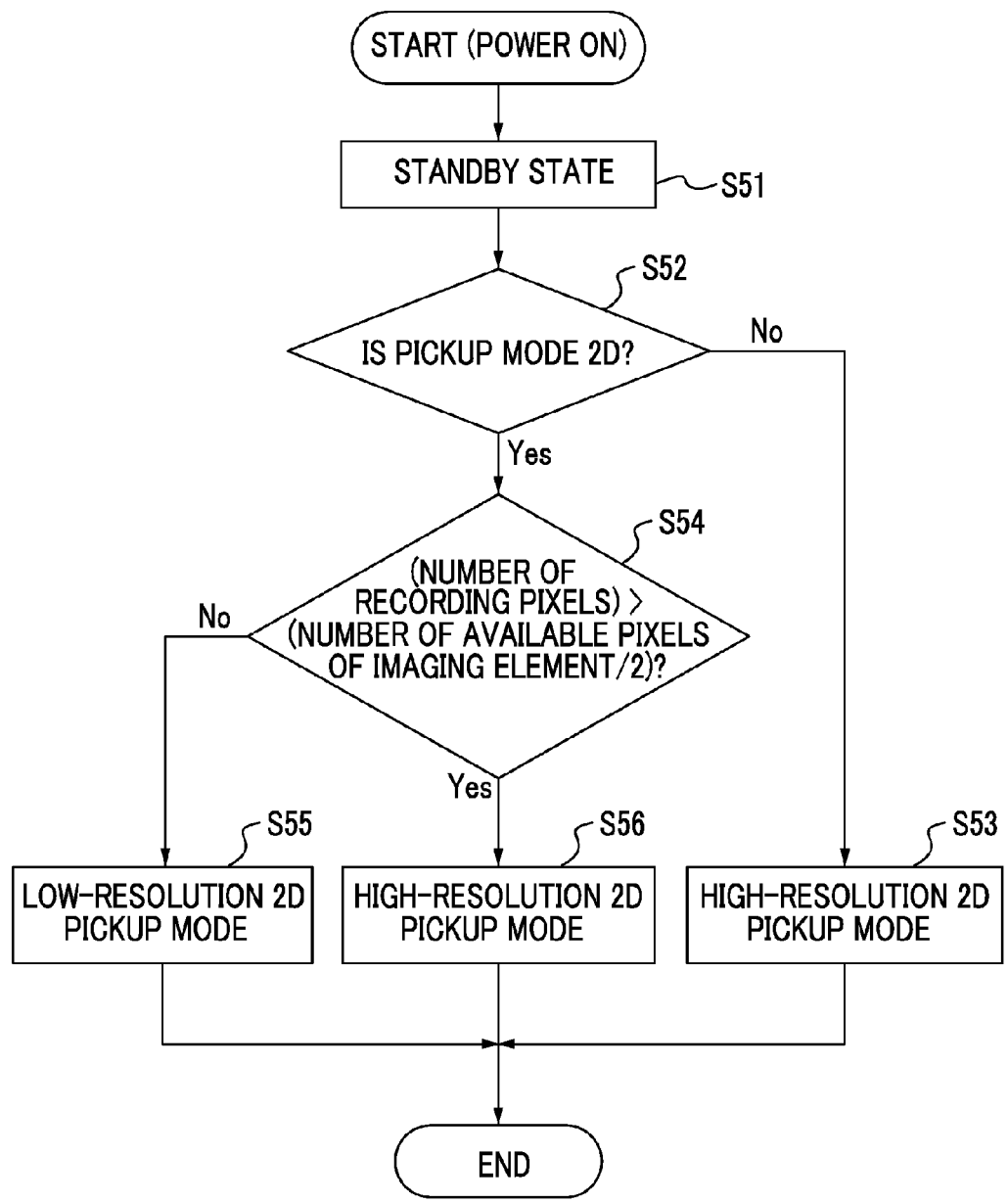
FIG. 22 is a flowchart illustrating the flow of a pickup mode setting process.

FIG. 22 is a flowchart illustrating the flow of a common pickup mode setting process in the first to eighth embodiments. This process is performed using the pickup mode setting control unit 62.

If power is turned on, the image capturing device 10 is at a standby state in Step S51. At the standby state, a selection instruction operation is received using the operation unit 38.

If the selection instruction operation is received, it is determined whether the selected pickup mode is the 2D pickup mode or the 3D pickup mode in Step S52.

When the pickup mode which is indicated to be selected is the 3D pickup mode, the 3D pickup mode is set in Step S53.

When the selected pickup mode is the 2D pickup mode, it is determined whether or not the number of record pixels is greater than (the number of available pixels of the imaging element 16/2) in Step S54. When the number of record pixels is greater, the high-resolution 2D pickup mode is set in Step S56. Otherwise, the low-resolution (pixel addition) 2D pickup mode is set in Step S55. In the pixel addition 2D pickup mode, the resolution of a 2D image to be recorded is set to, for example, a half of high-resolution 2D pickup mode.

In the 3D pickup mode, a normal Bayer process is performed on each of the left image and the right image.

In the pixel addition 2D pickup mode process, the occurrence of pattern noise attributable to parallax is suppressed by performing an averaging process on all the pixels.

This example includes the high-resolution 2D pickup mode in which a high-resolution plane (2D) image is generated, the low-resolution (pixel addition) 2D pickup mode in which a pixel addition plane (2D) image having lower resolution than the high-resolution planar image is generated, and 3D pickup mode in which a 3D image (stereoscopic image) is generated. When the high-resolution 2D pickup mode is set, the high-resolution planar image is generated.

The present invention is not particularly limited to the case shown in FIG. 22. The present invention includes 2D image pickup mode in which a high-resolution planar image is generated and 3D pickup mode in which a 3D image is generated. When the 2D pickup mode is set, a high-resolution planar image may be generated.

Figure 23:
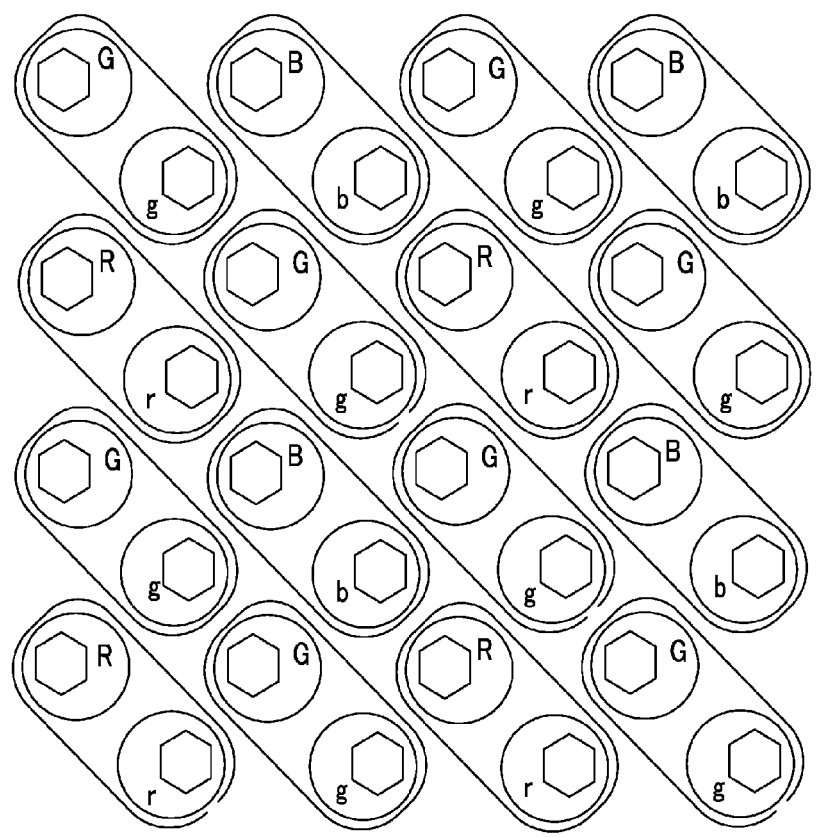
FIG. 23 is an explanatory view illustrating a case in which a single planar image is generated by performing pixel addition based on planar images of multiple viewpoints.
Figure 24:
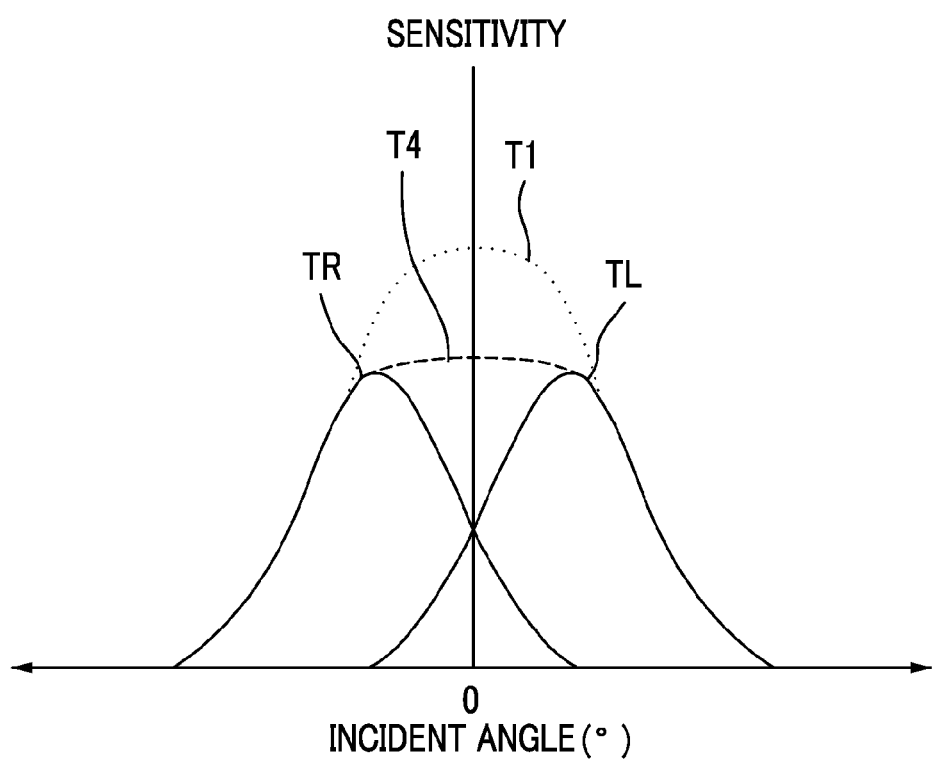
FIG. 24 is a view illustrating the sensitivity properties of the incidence angles obtained after the pixel addition is performed on the pair pixels of the imaging element.

FIG. 23 is an explanatory view illustrating a case in which a low-resolution (pixel addition) 2D image is imaged using the imaging element 16. In the case of pixel addition 2D pickup mode, the pixel addition is performed on the imaging signals of two pixels which have the same color and are included in a pair of the A group and the B group, and the resulting signals are output from the imaging element 16.

The pixel addition is performed on the signal charges of the pair pixels (signal charges are added), shown using an ellipse in FIG. 23, using the imaging element 16, the signal charges are converted into imaging signals, and the resulting signals are output, thus the imaging signals corresponding to the added imaging singles of the pair pixels can be obtained as many as the total number of the pair, and 2D imaged image data can be obtained by processing the imaged image signal which is a set of the imaging signals.

Otherwise, 2D imaged image data can be obtained by reading the imaged image signals of all the pixels of the A group, reading the imaged image signals of all the pixels of the B group, performing pixel addition (addition of the imaging signals) on the imaging signals obtained from the pair pixels using the digital signal processing unit 24 (image processing unit), and processing the imaged image signals obtained after performing the pixel addition.

With respect to the imaged image signal of the A group and the imaged image signal of the B group, the positions of the left and right blurred images are shifted in the A group and the B group. Therefore, if these are displayed as a 2D image as it is, spurious resolution (a double image) is generated. However, if the pixel addition (which includes a case in which addition is performed in the state of the signal charge in the imaging element 16 and a case in which addition is performed in the state of the imaging single in the digital signal processing unit 24 (image processing unit)) is performed as in the embodiment, the blurred portions are synthesized by performing addition, and an image in which the pixels are not distinguished between the A group and the B group is generated, thus a high-quality 2D image can be acquired.

In addition, in the case of low-resolution 2D pickup mode, since the whole plane of the liquid crystal shutter 115 is the transmission region, the sensitivity properties of the incident angles, which are obtained after the pixel addition is performed on the pair pixels, become as shown using reference symbol T4 in FIG. 13, thus a high-quality 2D image can be acquired while defocusing images are not separated.

Variation in Imaging Element

Subsequently, the various types of variation in the imaging element 16 will be described.

First, the imaging element 16 shown in FIGS. 2A to 2C will be additionally described.

Figure 25:
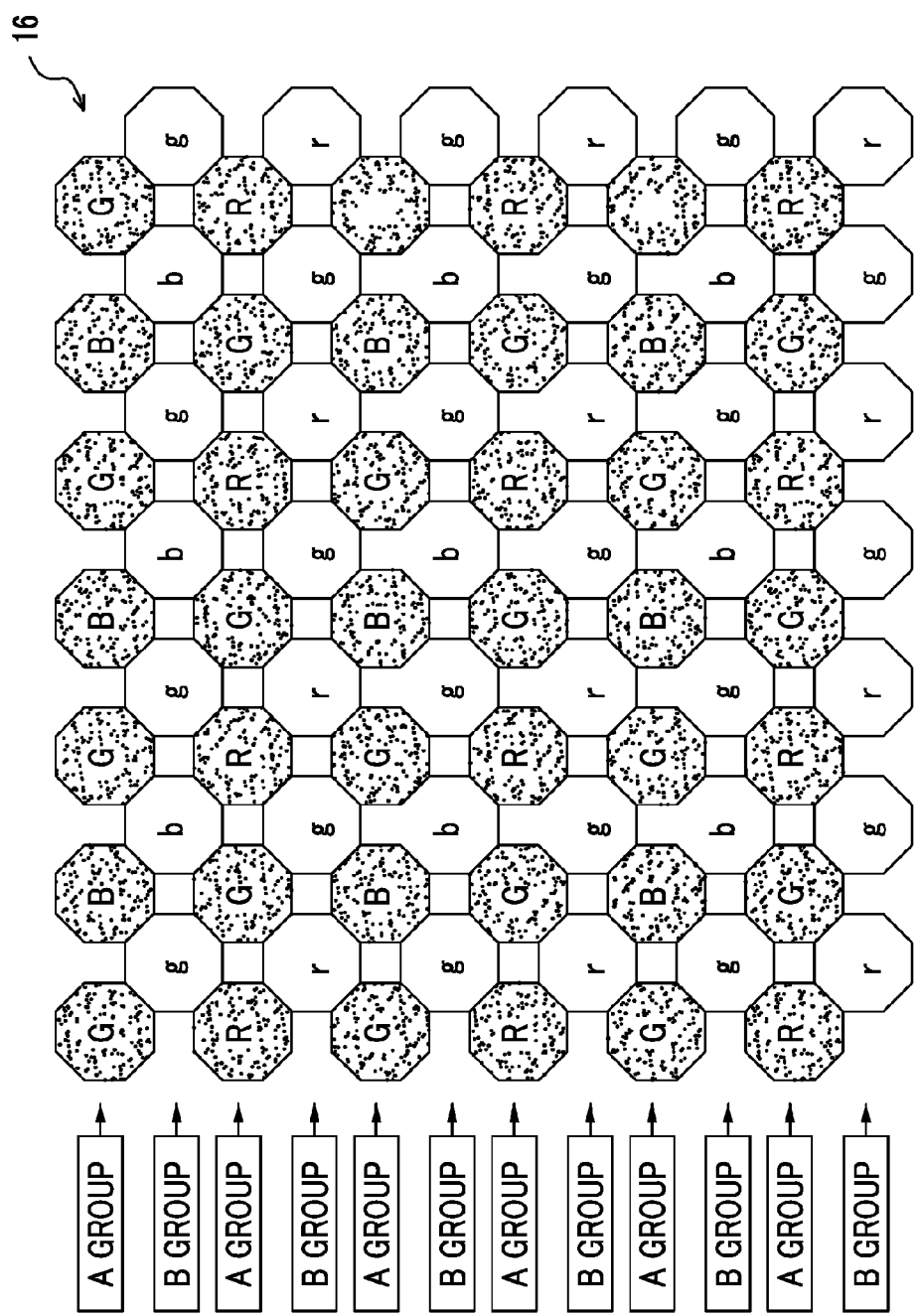
FIG. 25 is a view illustrating only a color filter array which is an example of the imaging element.

FIG. 25 is a view illustrating only a color filter array overlapped with each of the pixels PDa and PDb shown in FIG. 2A. Reference symbols "R", "r", "G", "g", "B", and "b" shown in FIG. 25 indicate the colors of color filters (R and r=red, G and g=green, and B and b=blue). There is not the distinction between the colors of R and r, and it is the same as between G and g and between B and b. In the imaging element 16, Bayer RGB color filter array is placed on the upper sides of all the main pixels PDa (hereinafter, referred to as "A group") in the odd-numbered pixel rows, and Bayer rgb color filter array is placed on the upper sides of all the sub pixels PDb (hereinafter, referred to as "B group") in the even-numbered pixel rows. In the imaging element 16 shown in FIG. 25, each of the pixels of the A group and each of the pixels of the B group, which are mixed and provided on the average on the same plane, are provided to be one-to-one correspondence. Therefore, the number of pixels of the A group is the same as the number of pixels of the B group. The micro lens is laminated on each of the color filters (on the upper side of each pixel 133), and the light blocking member opening (16B in FIG. 4B) is provided on the upper portion of the light reception plane (the bottom of the color filter) of each pixel 133. However, the micro lens and the light blocking member opening are not shown in FIG. 25.

Figure 26:
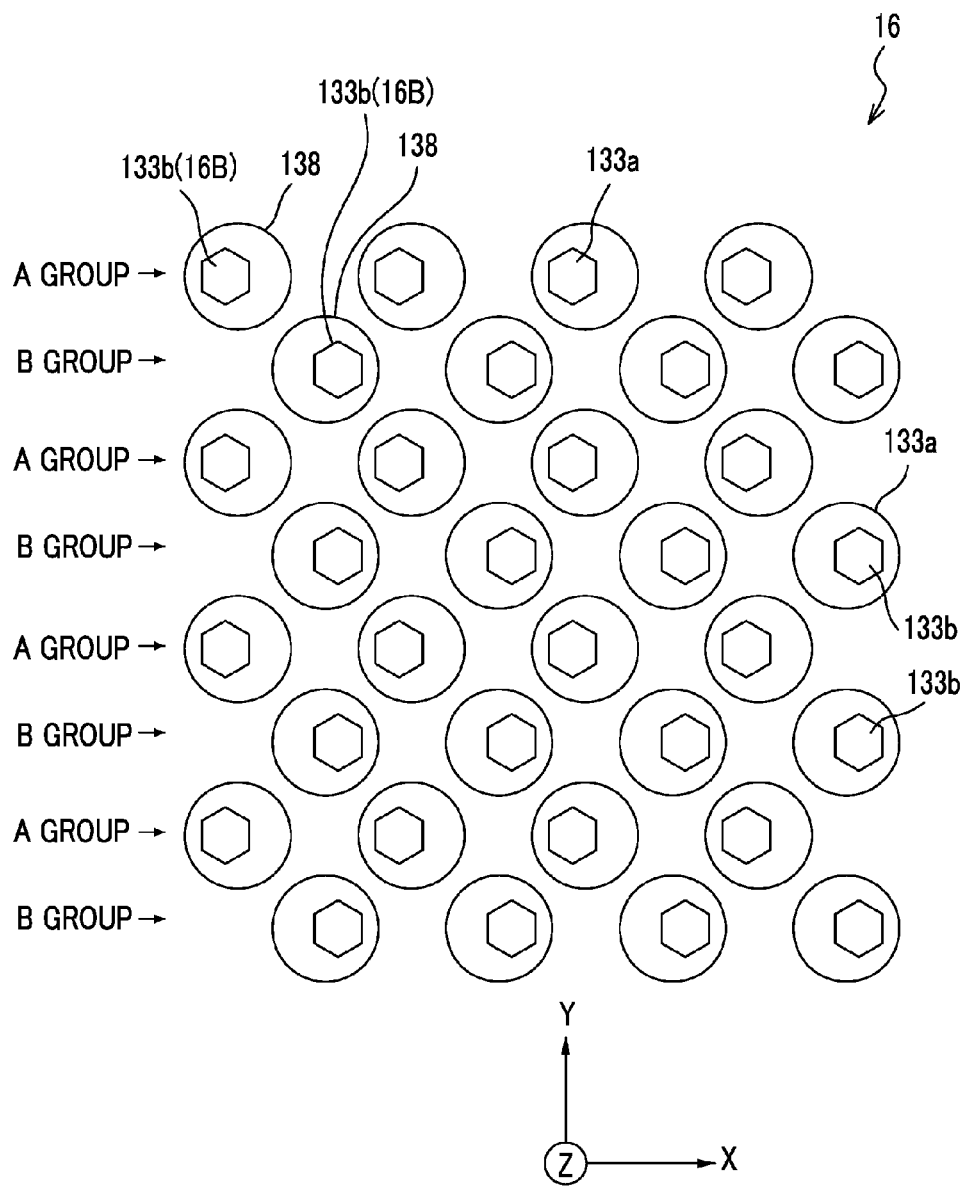
FIG. 26 is a view illustrating the positional relationship between a micro lens and a light blocking member opening which are provided on the upper side of each pixel.

FIG. 26 is a view illustrating the positional relationship between the micro lens (circle) 138 and the light blocking member opening which are placed on the upper side of each pixel. In each pixel of the A group, with respect to the micro lens 138 (L in FIG. 4B), the light blocking member opening 133a (16B in FIG. 4B) is provided to be deviated on the left side of the center of the micro lens (when the imaging element 16 is viewed from the subject side). In addition, in each pixel of the B group, with respect to the micro lens 138, the light blocking member opening 133b is provided to be deviated on the right side of the center of the micro lens.

Since the A group and the B group are shifted from each other in the vertical direction Y and the horizontal direction X by half of pixel pitch, the pixels of the same color (R and r, G and g, and B and b) are arranged to be obliquely adjacent. When two pixels of the same color which are obliquely nearest-adjacent are included in pair pixels, the light blocking member opening 133a of one side of the pair pixels is deviated on the left side, and the light blocking member opening 133b of the other side is deviated on the right side. As described above, in the pixel of one side and the pixel of the other side which are included in the pair pixels, the light blocking member openings are shifted to the opposite directions from each other with respect to the center of the micro lens 138, thus the incident angles of light, which is incident through the optical pickup system from the same subject, is restricted to be opposite directions from each other. As a result, when a subject is picked up using the imaging element 16, the imaged image signal of the A group which is received through the light blocking member opening 133a corresponds to the subject viewed using a right eye and the imaged image signal of the B group which is received through the light blocking member opening 133b corresponds to the subject viewed using a left eye, thus parallax is generated between the imaged image signal of the A group and the imaged image signal of the B group.

The portions of the subject which are focused using the pixel of the A group and the pixel of the B group are set to a focusing state at the same position, and images are formed on the pixel of the A group and the pixel of the B group, respectively. With respect to the portion of the subject which is not set to the focusing state, the blurred images are created at positions which are shifted to the left and the right in the pixel of the A group (right eye image) and the pixel of the B group (left eye image). The blurred images are changed into the amount of shift (parallax) of the left and the right based on the difference in subject distances with respect to a focusing distance. Therefore, if the imaged image signal of the A group and the imaged image signal of the B group are set to left and right imaged image signals, respectively, a stereoscopic image can be imaged using a single optical pickup system and a single imaging element.

When a stereoscopic image is regenerated, the digital signal processing unit 24 (the image processing unit) in FIG. 12 generates a right eye-imaged image data from the imaged image signal of the A group and displays the right eye-imaged image data on the LCD 30 (display unit) while storing the right eye-imaged image data in the recording media 54 (the memory card). In addition, the digital signal processing unit 24 generates a left eye-imaged image data from the imaged image signal of the B group and displays the left eye-imaged image data on the LCD 30 (display unit) while storing the left eye-imaged image data in the recording media 54 (the memory card).

In addition, in the imaging element 16 according to the embodiment, the color filter array shown in FIG. 25 is used. Therefore, the color array of a 2D imaged image signal, obtained after pixel addition is performed on the imaged image signal of the A group and the imaged image signal of the B group, becomes Bayer array, thus an image processing technology for existing Bayer array can be used, and the image processing becomes easy.

In the embodiment described with reference to FIG. 25, the pixel array (so called a honeycomb pixel array) is configured in such a way that the pixels in the odd-numbered rows are shifted from the pixels in the even-numbered rows by half of pixel pitch. However, the pixel array may be a square array.

Figure 27:
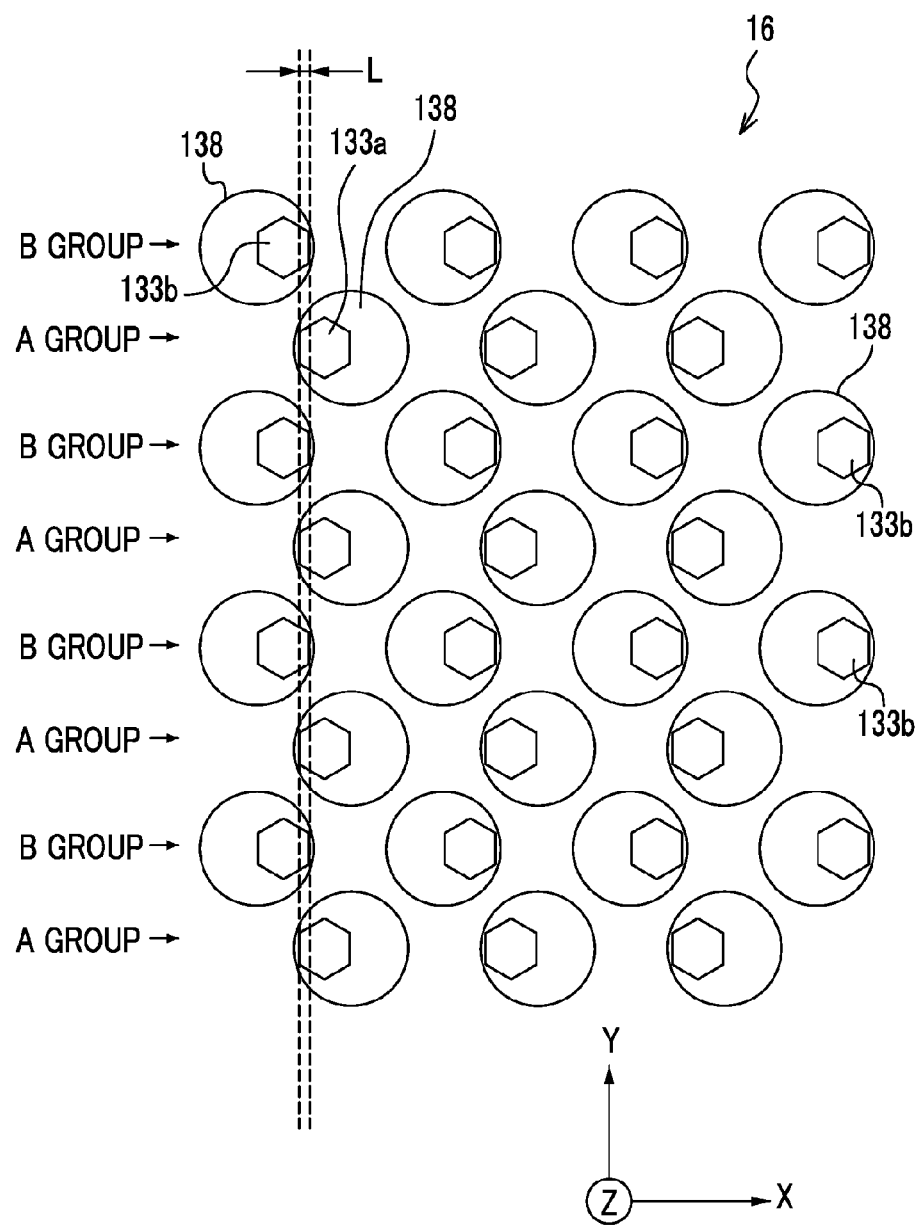
FIG. 27 is a view illustrating a shape in which the two pixels included in the pair pixels are overlapped and arranged in the pixel array shown in FIG. 25.

FIG. 27 illustrates the imaging element 16 having a pixel array in which the light reception regions of the pixels of the A group and the B group are overlapped in order to further decrease double image generation (spurious resolution generation) in the planar image on which pixel addition is performed. In the imaging element 16, the A group (the first pixel group) and the B group (the second pixel group) are arranged in 2-dimensional form in a planar view in the X direction and the Y direction which is perpendicular to the X direction, and the pixels of the A group and the pixels of the B group are arranged in order to form the light reception regions 133a and 133b in zigzags and to overlap with each other in the Y direction.

Figures 28A, 28B:
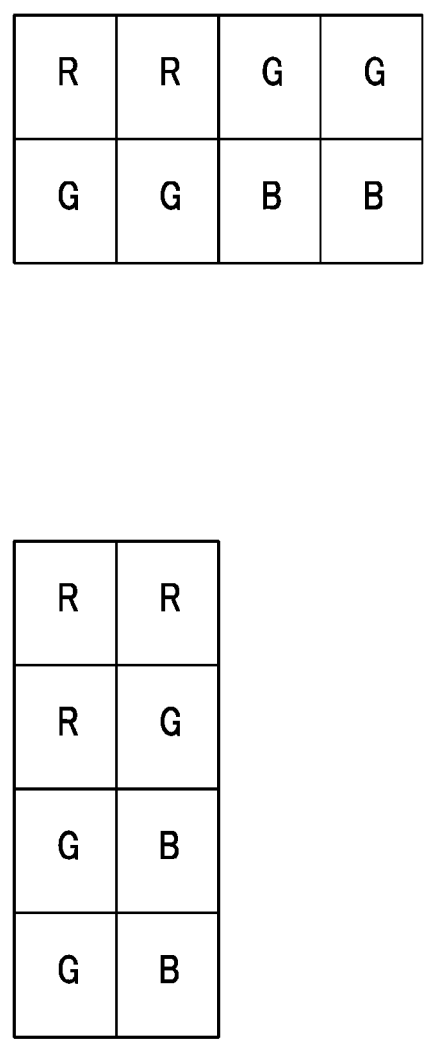

A square array in which a part of the array is schematically shown in FIG. 28A or 28B may be used. In detail, a double square array, in which both the pixel array (the main pixel array) as the whole even-numbered columns and the pixel array (the sub pixel array) as the whole odd-numbered columns are the square arrays, is used. In FIGS. 28A and 28B, R, G, and B are imaging pixels which have red, green, and blue filters, respectively. The pixel pair is configured with two pixels (that is, adjacent same color pixels) R-R, G-G, and B-B which be adjacent to each other. The pixel of the left image is configured using the pixel signal of the one side of the pixel pair, and the pixel of the right image is configured using the pixel signal of the other side of the pixel pair.

FIG. 29 illustrates a case in which the light reception regions of the pixels of the A group and the B group are overlapped in the imaging element 16 having the square array. Like the case shown in FIG. 27, in the case shown in FIG. 29, the A group and the B group are arranged in 2-dimensional form in a planar view in the X direction and the Y direction which is perpendicular to the X direction, and the pixels of the A group and the pixels of the B group are arranged in order to form the light reception regions 133a and 133b in zigzags and to overlap with each other in the Y direction.

In addition, in the above-described embodiment, the two imaged image signals in which parallax exists can be obtained by performing pupil division on the pair pixels in such a way as to mutually deviate the light blocking member openings of the pair pixels in the opposite directions, that is, in the left and right directions as shown in FIG. 26. However, pupil division can be implemented while the light blocking member openings are not deviated. For example, the light blocking member openings of the pair pixels are open in the whole planes of the light reception planes of the respective pixels. Further, a single elliptical micro lens may be mounted on the pair pixels, and incident light having different incident angles from the same subject (light which passes through different pupil regions of the optical pickup system) may be incident to the respective pair pixels.

In addition, the direction in which the light blocking region (the impermeable region) which is formed in the liquid crystal shutter 115 is formed may be differentiated based on the lateral pickup and the longitudinal pickup.

Figure 30:
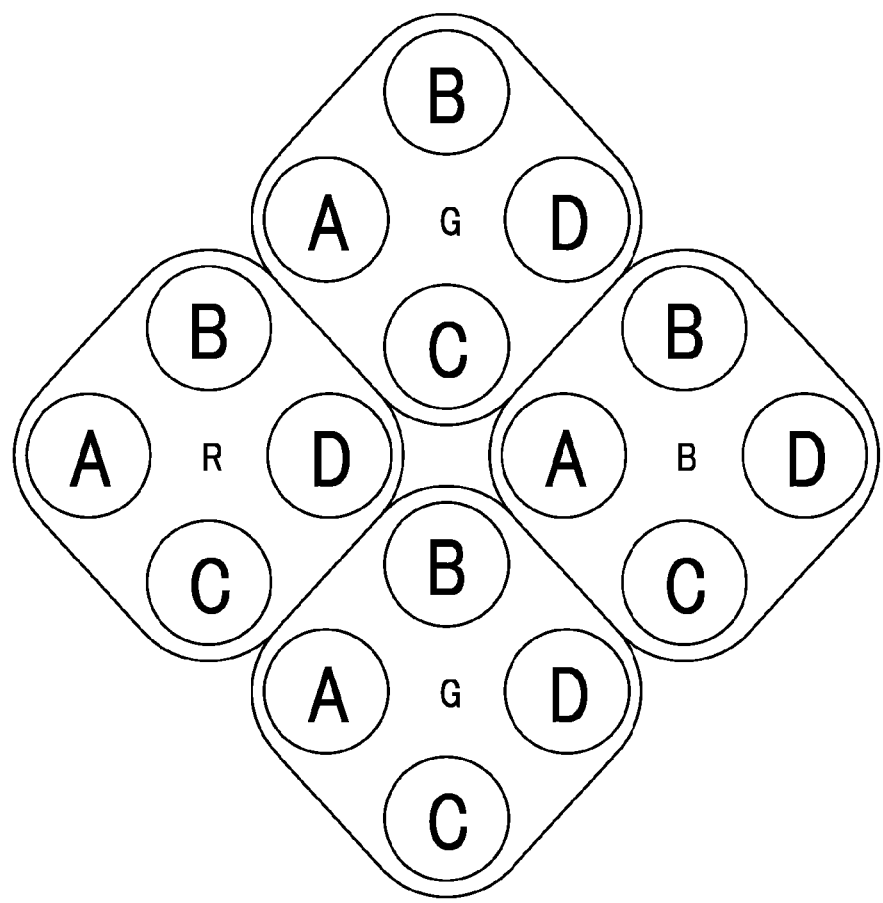
FIG. 30 is a view illustrating a pixel array corresponding to an example of the imaging element which can simultaneously perform lateral pickup and longitudinal pickup.
Figure 31A:
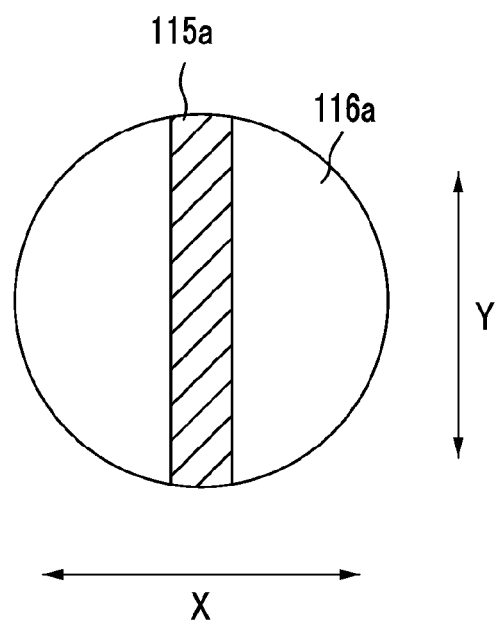
FIG. 31A is a view illustrating a basic shape of the light blocking region of the liquid crystal shutter.
Figure 31B:
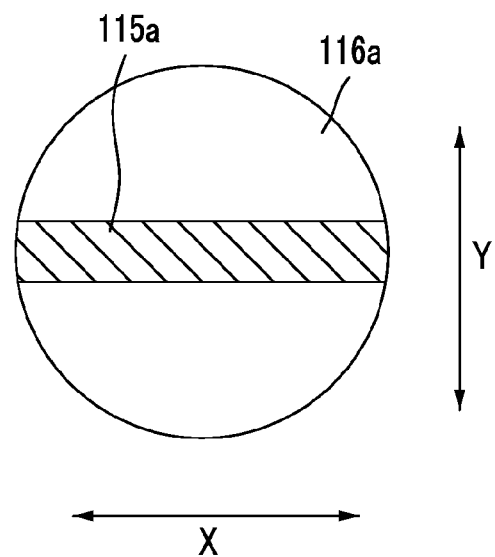
FIG. 31B is a view illustrating a modification example of the liquid crystal shutter.
Figure 32:
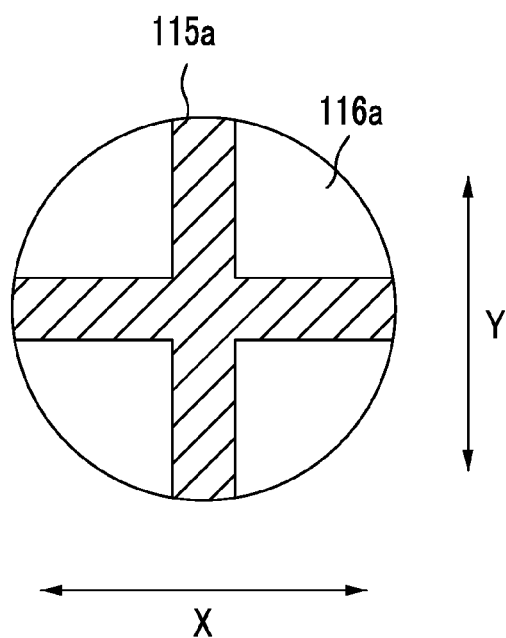
FIG. 32 is a view illustrating another modification example of the light blocking region of the liquid crystal shutter.
Figure 33A:
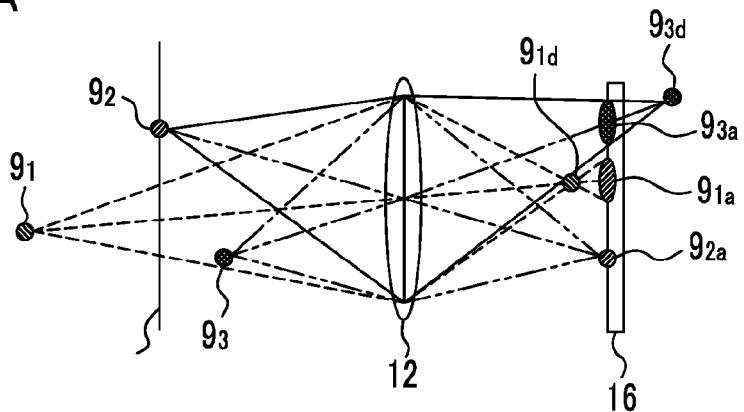
FIGS. 33A to 33C are explanatory views illustrating the problems of the present invention, that is.
Figure 33B:
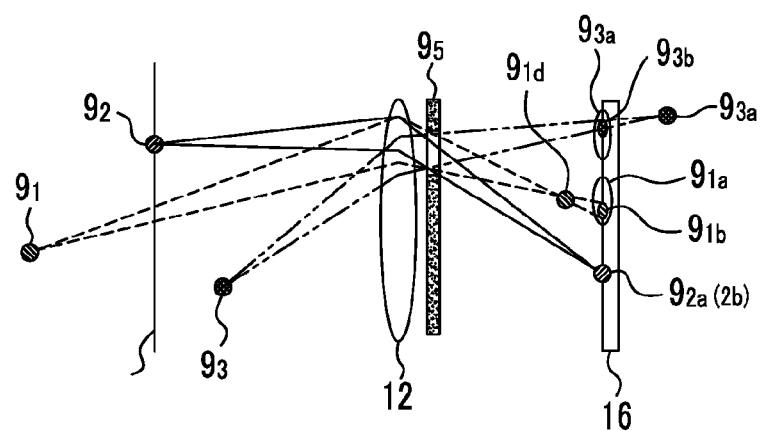
Figure 33C:
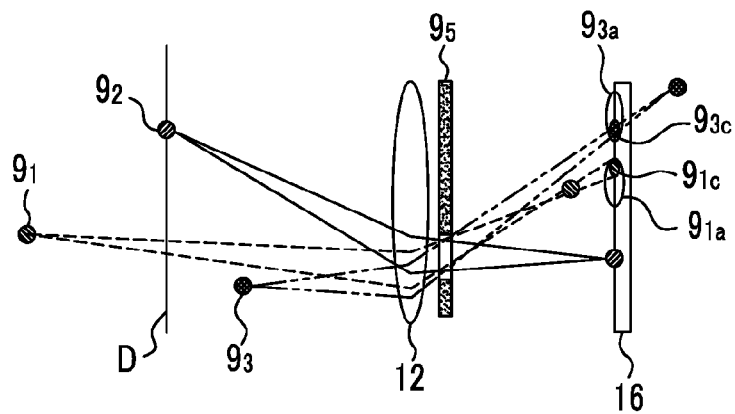

For example, the impermeable region 115a may be formed in the liquid crystal shutter 115 as shown in FIG. 31A in the case of the lateral pickup and the impermeable region 115a may be formed in the liquid crystal shutter 115 as shown in FIG. 31B in the case of the longitudinal pickup using the imaging element 16 in which a part of the pixel array is shown in FIG. 30. In addition, the impermeable region 115a may be formed in the liquid crystal shutter 115 as shown in FIG. 32.

Meanwhile, in the present invention, the pupil division method is not particularly limited to the aspect in which the light blocking member 16A for pupil division shown in FIGS. 3 to 4B is used. For example, an aspect in which pupil division is performed based on the arrangement or shape of at least one of the micro lens L and the photodiode PD may be used, and an aspect in which pupil division is performed using the mechanical diaphragm 14 may be used. The other aspects may be used.

In addition, the imaging element 16 is not particularly limited to a CCD imaging element. For example, the imaging element 16 may be a CMOS imaging element.

In addition, in the above-described embodiments, the prescribed value which is used for determination is calculated using the CPU 40 based on calculation conditions, for example, a monitor size (the size of a display screen), monitor resolution (the resolution of the display screen), an observation distance (a distance to view the display screen), and the stereoscopic fusion limit of a user (there are individual differences). The setting of these calculation conditions may include both user setting and automatic setting. In the case of the user setting, a setting operation is performed using the operation unit 38, and the content of the setting is stored in the EEPROM 56. Information about the monitor size and the monitor resolution (the resolution of the display screen) may be automatically acquired from a monitor (the LCD 30 in FIG. 1) or the like. In addition, a standard condition may be applied to a calculation condition on which the user setting is not performed (or a calculation condition which cannot be automatically acquired).

Figure 35:
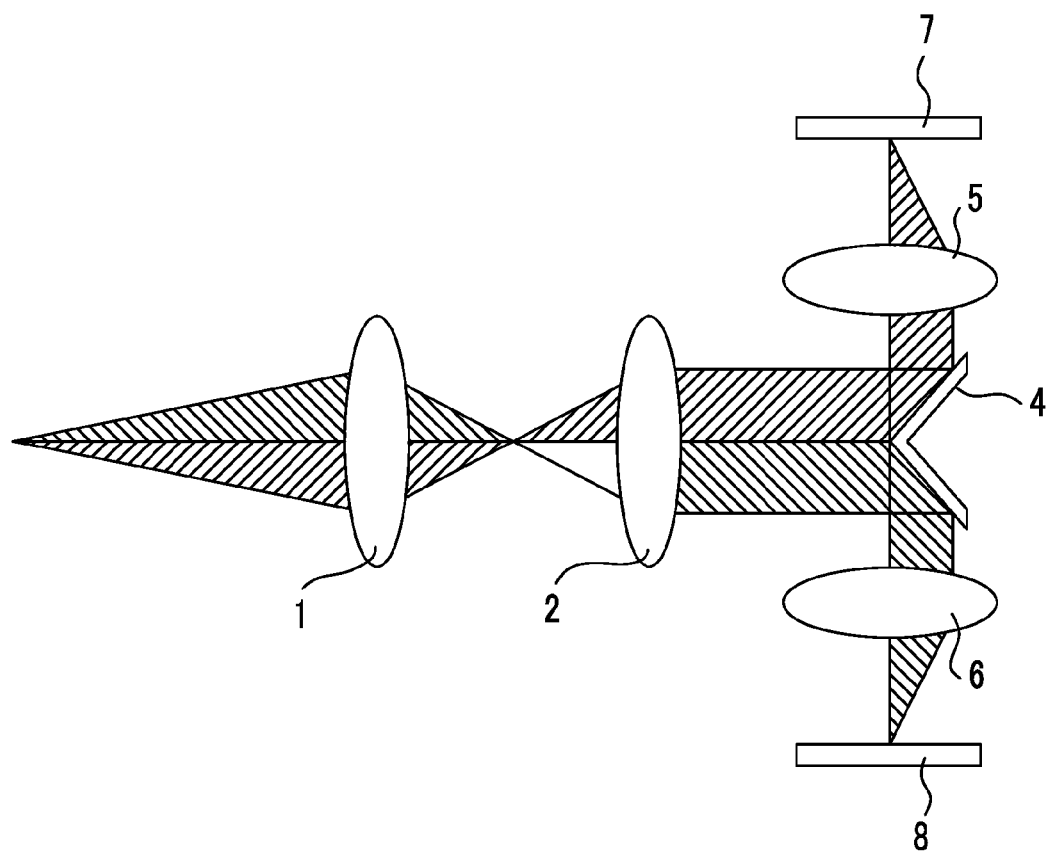
FIG. 35 is an explanatory view illustrating another example of pupil division.

In addition, pupil division is not particularly limited to the case in which the imaging element 16 (the structure in which main pixels and sub pixels are arranged to approach each other) is used as shown in FIGS. 2A to 4B. For example, as shown in FIG. 35, pupil division may be performed on light flux, which passes through different regions, that is, the left and right regions of a main lens 1 and a relay lens 2, using a mirror 4, and images may be formed on imaging elements 7 and 8 through respective image formation lenses 5 and 6. That is, an image capturing device, which includes the first imaging element 7 having a first pixel group and the second imaging element 8 having a second pixel group, which respectively receive light fluxes on which pupil division is performed using an optical member (mirror 4), may be used. The present invention can be applied to the configuration shown in FIG. 35.

In addition, although the imaging element 16 which uses a charge coupled element (CCD) as a signal read circuit has been described, the present invention can be applied to an imaging element which uses a CMOS-type transistor circuit as the signal read circuit.

The present invention is not limited to the examples described in the present specification or the examples shown in the drawings, and various types of changes or improvements may be performed on designs in the range without departing from the gist of the present invention.

In the present specification, the present invention has been described through division into various types of embodiments in order to facilitate understanding of the invention. However, the present invention is not particularly limited to a case in which the embodiments are individually implemented, and includes a case in which the plurality of embodiments are combined and implemented.

What is claimed is:

1. An image capturing device which includes a single optical pickup system and an imaging element that has a first pixel group and a second pixel group respectively performing photoelectric conversion on light fluxes passing through different regions of the single optical pickup system, and which performs stereoscopic pickup used to acquire a stereoscopic image having a first planar image and a second planar image, respectively generated using the first pixel group and the second pixel group, and plane pickup used to acquire a planar image having the first planar image and the second planar image by imaging a same scene using the first pixel group and the second pixel group, the image capturing device comprising:
    light extinction unit that is capable of reducing an amount of light which is incident to the imaging element from the optical pickup system;
    a diaphragm that is arranged in a light path;
    subject brightness acquisition unit that acquires subject brightness; and
    control unit that, in a case of the stereoscopic pickup, controls whether or not to reduce the amount of light which reaches the imaging element using the light extinction unit based on the subject brightness acquired using the subject brightness acquisition unit, and that, in a case of the plane pickup, causes a diaphragm value of the diaphragm to be greater than a diaphragm value in the case of the stereoscopic pickup.

2. The image capturing device according to claim 1,
    wherein the first pixel group and the second pixel group include light reception elements which are 2-dimensionally arranged, and
    wherein, in the imaging element, each pixel of the first pixel group and each pixel of the second pixel group are arranged to be adjacent to each other.

3. The image capturing device according to claim 1, further comprising:
    an optical member that performs division on the light fluxes passing through the optical pickup system,
    wherein the imaging element includes a first imaging element having the first pixel group and a second imaging element having the second pixel group, the first imaging element and the second imaging element respectively receiving the light fluxes obtained through pupil division performed using the optical member.

4. The image capturing device according to claim 1,
    wherein the control unit sets the diaphragm to an open state in the case of the stereoscopic pickup, and squeezes the diaphragm compared to the open state in the case of the plane pickup.

5. The image capturing device according to claim 1,
    wherein the light extinction unit is a neutral density filter which is capable to be inserted in the light path through which the light fluxes incident to the imaging element pass, and
    wherein the control unit, in the case of the stereoscopic pickup, controls whether or not to set the neutral density filter to an insertion state in which the neutral density filter is inserted in the light path based on the subject brightness acquired using the subject brightness acquisition unit.

6. The image capturing device according to claim 5,
    wherein the control unit, in the case of the stereoscopic pickup, sets the neutral density filter to the insertion state when the subject brightness is higher than a threshold, and sets the neutral density filter to a non-insertion state when the subject brightness is equal to or lower than the threshold.

7. The image capturing device according to claim 1,
    wherein the light extinction unit is a light blocking unit which shields a part of an opening of the diaphragm in order to equally divide the opening of the diaphragm viewed in an optical axis direction into at least one side of a horizontal direction and a vertical direction of the imaging element, and
    wherein the control unit controls the light blocking unit, and sets a light blocking state in which at least a part of the opening of the diaphragm is shielded using the light blocking unit in the case of the stereoscopic pickup, and sets a non-light blocking state in which the opening of the diaphragm is not shielded using the light blocking unit in the case of the plane pickup.

8. The image capturing device according to claim 7,
    wherein the control unit, in the case of the stereoscopic pickup, changes a size of the light blocking region of the opening of the diaphragm which is shielded using the light blocking unit based on the subject brightness acquired using the subject brightness acquisition unit.

9. The image capturing device according to claim 1, further comprising:
subject distance acquisition unit that acquires a subject distance,
wherein the control unit, in the case of the plane pickup, controls whether or not to set the diaphragm to the open state based on the subject distance acquired using the subject distance acquisition unit.

10. The image capturing device according to claim 9,
wherein the control unit, in the case of the plane pickup, sets the diaphragm to the open state when the subject distance is greater than a threshold.

11. The image capturing device according to claim 1, further comprising:
focal distance acquisition unit that acquires a focal distance of the optical pickup system,
wherein the control unit, in the case of the plane pickup, controls whether or not to set the diaphragm to the open state based on the focal distance acquired using the focal distance acquisition unit.

12. The image capturing device according to claim 11,
wherein the control unit, in the case of the plane pickup, sets the diaphragm to the open state when the focal distance is greater than a threshold.

13. The image capturing device according to claim 1, further comprising:
parallax information acquisition unit that calculates an amount of parallax between the first planar image and the second planar image which are included in the stereoscopic image acquired using the imaging element, and acquires a parallax range which indicates a difference between an amount of maximum parallax of a near side and an amount of maximum parallax of a far side of the stereoscopic image,
wherein the control unit, in the case of the plane pickup, controls whether or not to set the diaphragm to the open state based on the parallax range acquired using the parallax information acquisition unit.

14. The image capturing device according to claim 13,
wherein, in the case of the plane pickup, the diaphragm is set to the open state when the acquired parallax range is smaller than a threshold, and sets the diaphragm value of the diaphragm to a value, which is greater than the diaphragm value in the case of the stereoscopic pickup, when the acquired parallax range is equal to or greater than the threshold.

15. The image capturing device according to claim 13, further comprising:
instruction input unit that receives an input of a pickup instruction,
wherein the parallax information acquisition unit calculates the parallax range from the stereoscopic image imaged using the imaging element before the pickup instruction is input to the instruction input unit.

16. The image capturing device according to claim 15,
wherein the control unit sets the diaphragm to the open state when imaging is performed before the pickup instruction is input.

17. The image capturing device according to claim 1,
wherein the control unit, in the case of the plane pickup, changes whether or not to perform light extinction using the light extinction unit when the diaphragm is set to the open state based on the subject brightness acquired using the subject brightness acquisition unit.

18. The image capturing device according to claim 1,
wherein, in the case of the plane pickup, the first planar image and the second planar image are combined, and a high-resolution planar image which has higher resolution than the first and second planar images is acquired.

19. The image capturing device according to claim 1,
wherein, in the case of the plane pickup, imaging signals of the pixels which are adjacent in the first planar image and the second planar image are added, and a planar image which has same resolution as the first and second planar images is acquired.

20. The image capturing device according to claim 19,
wherein, in the imaging element, the first pixel group and the second pixel group are arranged in a 2-dimensional form in a planar view in a first direction and a second direction which is perpendicular to the first direction, and, when viewed from at least one side direction of the first and second directions, the pixels of the first pixel group and the pixels of the second pixel group, which are separated therefrom and correspond thereto, are overlapped and arranged to be viewed such that parts of light reception regions thereof are overlapped.

21. An image capturing method using the image capturing device according to claim 1 for enabling stereoscopic pickup used to acquire a stereoscopic image having a first planar image and a second planar image, respectively generated using a first pixel group and a second pixel group, and plane pickup used to acquire a planar image having the first planar image and the second planar image by imaging a same scene using the first pixel group and the second pixel group using a single optical pickup system, an imaging element that has a first pixel group and a second pixel group respectively performing photoelectric conversion on light fluxes passing through different regions of the single optical pickup system, light extinction unit that is capable of reducing an amount of light which is incident to the imaging element from the optical pickup system, and a diaphragm that is arranged in a light path, the image capturing method comprising:
acquiring subject brightness;
in a case of the stereoscopic pickup, controlling whether or not to reduce the amount of light which reaches the imaging element using the light extinction unit based on the acquired subject brightness; and
in a case of the plane pickup, causing a diaphragm value of the diaphragm to be greater than a diaphragm value in the case of the stereoscopic pickup.

22. The image capturing method according to claim 21, further comprising:
setting the diaphragm to an open state in the case of the stereoscopic pickup; and
squeezing the diaphragm compared to the open state in the case of the plane pickup.

23. The image capturing method according to claim 21, further comprising:
when the light extinction unit is a neutral density filter which is capable to be inserted in the light path through which the light fluxes incident to the imaging element pass and in the case of the stereoscopic pickup, controlling whether or not to set the neutral density filter to an insertion state in which the neutral density filter is inserted in the light path based on the acquired subject brightness.

24. The image capturing method according to claim 23, further comprising:
in the case of the stereoscopic pickup, setting the neutral density filter to the insertion state when the subject brightness is higher than a threshold, and setting the neutral density filter to a non-insertion state when the subject brightness is equal to or lower than the threshold.

25. The image capturing method according to claim 21, further comprising:

when the light extinction unit is a light blocking unit which shields a part of an opening of the diaphragm in order to equally divide the opening of the diaphragm viewed in an optical axis direction into at least one side of a horizontal direction and a vertical direction of the imaging element, setting a light blocking state in which at least a part of the opening of the diaphragm is shielded using the light blocking unit in the case of the stereoscopic pickup, and setting a non-light blocking state in which the opening of the diaphragm is not shielded using the light blocking unit in the case of the plane pickup.

26. The image capturing method according to claim 25, further comprising:

in the case of the stereoscopic pickup, changing a size of the light blocking region of the opening of the diaphragm which is shielded using the light blocking unit based on the acquired subject brightness.

27. The image capturing method according to claim 21, further comprising:

acquiring a subject distance; and in the case of the plane pickup, controlling whether or not to set the diaphragm to the open state based on the acquired subject distance.

28. The image capturing method according to claim 27, further comprising:

in the case of the plane pickup, setting the diaphragm to the open state when the subject distance is greater than a threshold.

29. The image capturing method according to claim 21, further comprising:

acquiring a focal distance of the optical pickup system; and in the case of the plane pickup, controlling whether or not to set the diaphragm to the open state based on the acquired focal distance.

30. The image capturing method according to claim 29, further comprising:

in the case of the plane pickup, setting the diaphragm to the open state when the acquired focal distance is greater than a threshold.

31. The image capturing method according to claim 21, further comprising:

calculating an amount of parallax between the first planar image and the second planar image which are included in the stereoscopic image acquired using the imaging element, and acquiring a parallax range which indicates a range between a maximum value of an amount of parallax of a near side and a maximum value of an amount of parallax of a far side; and in the case of the plane pickup, controlling whether or not to set the diaphragm to the open state based on the acquired parallax range.

32. The image capturing device according to claim 31, further comprising:

in the case of the plane pickup, setting the diaphragm to the open state when the acquired parallax range is smaller than a threshold.

33. The image capturing method according to claim 21, further comprising:

in the case of the plane pickup, changing whether or not to perform light extinction using the light extinction unit when the diaphragm is set to the open state based on the acquired subject brightness.

* * * * *